US011456456B2

(12) United States Patent
Durstock et al.

(10) Patent No.: US 11,456,456 B2
(45) Date of Patent: Sep. 27, 2022

(54) BENDABLE, CREASABLE, AND PRINTABLE BATTERIES WITH ENHANCED SAFETY AND HIGH TEMPERATURE STABILITY—METHODS OF FABRICATION, AND METHODS OF USING THE SAME

(71) Applicant: Government of the United States as Represented by the Secretary of the Air Force, Wright-Patterson AFB, OH (US)

(72) Inventors: Michael F Durstock, West Chester, OH (US); Ryan R Kohlmeyer, Dayton, OH (US); Aaron J Blake, Huber Heights, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/310,248

(22) PCT Filed: Jun. 14, 2017

(86) PCT No.: PCT/US2017/037509
§ 371 (c)(1),
(2) Date: Dec. 14, 2018

(87) PCT Pub. No.: WO2017/222895
PCT Pub. Date: Dec. 28, 2017

(65) Prior Publication Data
US 2019/0334168 A1 Oct. 31, 2019

Related U.S. Application Data

(60) Provisional application No. 62/353,918, filed on Jun. 23, 2016.

(51) Int. Cl.
*H01M 4/62* (2006.01)
*H01M 4/525* (2010.01)
(Continued)

(52) U.S. Cl.
CPC ......... *H01M 4/525* (2013.01); *H01M 4/0409* (2013.01); *H01M 4/485* (2013.01);
(Continued)

(58) Field of Classification Search
CPC .... H01M 4/525; H01M 4/62; H01M 10/0568; H01M 10/0569
See application file for complete search history.

(56) References Cited

U.S. PATENT DOCUMENTS 5,695,873 A * 12/1997 Kumar .............. H01M 10/0565
428/325
6,537,334 B1 3/2003 Dupasquier et al.
(Continued)

FOREIGN PATENT DOCUMENTS

CN 104766938 7/2015
JP 2005166331 6/2005
(Continued)

OTHER PUBLICATIONS

Machine Translation of JP 2005166331 (2005) 9 pages total.
(Continued)

*Primary Examiner* — Kenneth J Douyette
(74) *Attorney, Agent, or Firm* — AFMCLO/JAZ; Chastity D.S. Whitaker

(57) ABSTRACT

A composite electrolyte (151). The composite electrolyte (151) including a binder, a solvent, a non-solvent, and a ceramic filler. The non-solvent is configured to cause the binder to self-interact. The composite electrolyte (151) may be cast (138) or printed (144).

7 Claims, 61 Drawing Sheets

(51) Int. Cl.

| | | |
|---|---|---|
| *H01M 4/485* | (2010.01) | |
| *H01M 4/66* | (2006.01) | |
| *H01M 10/056* | (2010.01) | |
| *H01M 50/116* | (2021.01) | |
| *H01M 50/446* | (2021.01) | |
| *H01M 4/04* | (2006.01) | |
| *H01M 4/58* | (2010.01) | |
| *H01M 10/0568* | (2010.01) | |
| *H01M 10/0569* | (2010.01) | |
| *H01M 4/02* | (2006.01) | |

(52) U.S. Cl.
CPC ......... *H01M 4/5825* (2013.01); *H01M 4/622* (2013.01); *H01M 4/623* (2013.01); *H01M 4/624* (2013.01); *H01M 4/625* (2013.01); *H01M 4/66* (2013.01); *H01M 10/056* (2013.01); *H01M 10/0568* (2013.01); *H01M 10/0569* (2013.01); *H01M 50/116* (2021.01); *H01M 50/446* (2021.01); *H01M 2004/027* (2013.01); *H01M 2004/028* (2013.01); *H01M 2220/30* (2013.01); *H01M 2300/0037* (2013.01); *H01M 2300/0065* (2013.01); *H01M 2300/0091* (2013.01)

(56) References Cited

U.S. PATENT DOCUMENTS

| | | | |
|---|---|---|---|
| 6,656,641 B1* | 12/2003 | Kumar | H01M 10/0565 429/305 |
| 7,582,380 B1 | 9/2009 | Dunstan et al. | |
| 8,785,053 B2 | 7/2014 | Wang et al. | |
| 8,956,765 B2 | 2/2015 | Wang et al. | |
| 8,999,550 B2 | 4/2015 | Gruner et al. | |
| 2002/0009651 A1 | 1/2002 | Barker et al. | |
| 2003/0003369 A1 | 1/2003 | Dai | |
| 2004/0241550 A1 | 12/2004 | Wensley et al. | |
| 2005/0132562 A1 | 6/2005 | Saito et al. | |
| 2006/0246355 A1* | 11/2006 | Min | H01M 10/0561 429/322 |
| 2007/0254213 A1 | 11/2007 | Best et al. | |
| 2009/0053607 A1 | 2/2009 | Jeong et al. | |
| 2009/0087728 A1 | 4/2009 | Less et al. | |
| 2009/0152509 A1 | 6/2009 | Choi et al. | |
| 2010/0099026 A1 | 4/2010 | Choi et al. | |
| 2010/0104947 A1 | 4/2010 | Choi et al. | |
| 2011/0111122 A1 | 5/2011 | Mues et al. | |
| 2011/0143185 A1 | 6/2011 | Nishikawa | |
| 2011/0171523 A1 | 7/2011 | Samii et al. | |
| 2013/0108913 A1 | 5/2013 | Barchasz et al. | |
| 2013/0130108 A1 | 5/2013 | Alarco et al. | |
| 2013/0171502 A1 | 7/2013 | Chen et al. | |
| 2013/0189565 A1 | 7/2013 | Lashmore et al. | |
| 2013/0344396 A1 | 12/2013 | Bosnyak et al. | |
| 2014/0017552 A1 | 1/2014 | Wang et al. | |
| 2014/0212748 A1 | 7/2014 | Zhang et al. | |
| 2014/0272504 A1 | 9/2014 | Edington et al. | |
| 2014/0308574 A1 | 10/2014 | Ensling et al. | |
| 2014/0370549 A1 | 12/2014 | Kwon et al. | |
| 2014/0377615 A1 | 12/2014 | Kwon et al. | |
| 2014/0377617 A1 | 12/2014 | Kwon et al. | |
| 2015/0027615 A1 | 1/2015 | Singh et al. | |
| 2015/0147616 A1 | 5/2015 | Wang et al. | |
| 2015/0207143 A1 | 7/2015 | Wu et al. | |
| 2016/0164138 A1 | 6/2016 | Han et al. | |

FOREIGN PATENT DOCUMENTS

| | | |
|---|---|---|
| WO | 0199220 | 12/2001 |
| WO | 2013153261 | 10/2013 |

OTHER PUBLICATIONS

United States Patent and Trademark Office, Non-Final Office Action in U.S. Appl. No. 15/623,044, dated Jan. 14, 2019, 13 pages total.
United States Patent and Trademark Office, Non-Final Office Action in U.S. Appl. No. 15/622,998, dated Sep. 24, 2018, 11 pages total.
S. H. Ng et al., "Single wall carbon nanotube paper as anode for lithium-ion battery," Electrochim. Acta , vol. 51 (2005) 23-28.
S. Y. Chew et al., "Flexible free-standing carbon nanotube films for model lithium-ion batteries," Carbon, vol. 47 (2009) 2976-2983.
L. Hu et al., "Thin, flexible secondary Li-ion paper batteries," ACS Nano, vol. 4 (2010) 5843-5848.
K. Wang et al., "Super-aligned carbon nanotube films as current collectors for lightweight and flexible lithium ion batteries," Adv. Funct. Mater., vol. 23 (2013) 846-853.
Y.-H. Lee et al., "Wearable textile battery rechargeable by solar energy," Nano Lett., vol. 13 (2013) 5753-5761.
Q. Cheng et al., "Folding paper-based lithium-ion batteries for higher areal energy densities," Nano Lett., vol. 13 (2013) 4969-4974.
K.-H. Choi et al., "Heterolayered, one-dimensional nanobuilding block mat batteries," Nano Lett., vol. 14 (2014) 5677-5686.
K. C. Klavetter et al., "A free-standing, flexible lithium-ion anode formed from an air-dried slurry cast of high tap density $SnO_2$, CMC polymer binder and Super-P Li," J. Mater. Chem. A., vol. 2 (2014) 14459-14467.
J. W. Hu et al., "Folding insensitive, high energy density lithium-ion battery featuring carbon nanotube current collectors," Carbon, vol. 87 (2015) 292-298.
M.-H. Park et al., "Flexible high-energy Li-ion batteries with fast-charging capability," Nano Lett., vol. 14 (2014) 4083-4089.
M. KOO et al., "Bendable inorganic thin-film battery for fully flexible electronic systems," Nano Lett., vol. 12 (2012) 4810-4816.
W. Weng et al., "A gum-like lithium-ion battery based on a novel arched structure," Adv. Mater., vol. 27 (2015) 1363-1369.
J.-J. Woo et al., "A high performance separator with improved thermal stability for Li-ion batteries," J. Mater. Chem. A., vol. 1 (2013) 8538-8540.
J.-J. Woo et al., "Separator/electrode assembly based on thermally stable polymer for safe lithium-ion batteries," Adv. Energy Mater., vol. 4 (2014) 1301208, 4 pages total.
N. Singh et al., "Paintable battery," Scientific Reports., vol. 2 (2012) 481, 5 pages total.
X. Fang et al., "Free-standing $LiNi0.5Mn1.5O4$/carbon nanofiber network film as lightweight and high-power cathode for lithium ion batteries," ACS Nano., vol. 8 (2014) 4876-4882.
Z. Cao et al., "Fragmented carbon nanotube macrofilms as adhesive conductors for lithium-ion batteries," ACS Nano., vol. 8 (2014) 3049-3059.
J. Xi et al, "PVDF-PEO/ZSM-5 based composite microporous polymer electrolyte with novel pore configuration and ionic conductivity," Solid State Ionics, vol. 177 (2006) 709-713.
F. Boudin et al., "Microporous PVdF gel for lithium-ion batteries," J. Power Sources., vol. 81 (1999) 804-807.
S.-H. Kim et al., "Mechanically compliant and lithium dendrite growth-suppressing composite polymer electrolytes for flexible lithium-ion batteries," J. Mater. Chem. A., vol. 1 (2013) 4949-4955.
Y. S. Zhu et al., "Natural macromolecular based carboxymethyl cellulose as a gel polymer electrolyte with adjustable porosity for lithium ion batteries," J. Power Sources., vol. 288 (2015) 368-375.
Z. Chen et al., "Lightweight and flexible graphene foam composites for high-performance electromagnetic interference shielding," Adv. Mater., vol. 25 (2013) 1296-1300.
H. Xie et al., "PVDF-HFP composite polymer electrolyte with excellent electrochemical properties for Li-ion batteries," J. Solid State Electrochem., vol. 12 (2008) 1497-1502.
V. Aravindan et al., "Nanoparticulate $AlO(OH)n$ filled polyvinylidenefluoride-co-hexafluoropropylene based microporous membranes for lithium ion batteries," J. Renew. Sustain. Energy, vol. 1 (2009) 023108, 12 pages total.
S.-H. Kim et al., "Printable solid-state lithium-ion batteries: a new route toward shape-conformable power sources with aesthetic versatility for flexible electronics," Nano Lett., vol. 15 (2015) 5168-5177.

(56) References Cited

OTHER PUBLICATIONS

Z. Wu et al, "Depolarized and fully active cathode based on Li(Ni0.5Co0.2Mn0.3)O2 embedded in carbon nanotube network for advanced batteries," Nano Lett., vol. 14 (2014) 4700-4706.
K. Sun et al, "3D printing of interdigitated Li-ion microbattery architectures," Adv. Mater., vol. 25 (2013) 4539-4543.
S. Luo et al., "Binder-free LiCoO2/Carbon nanotube cathodes for high-performance lithium ion batteries," Adv. Mater., vol. 24 (2012) 2294-2298.
Z. Wang et al., "Flexible freestanding Cladophora nanocellulose paper based Si anodes for lithium-ion batteries," J. Mater. Chem. A., vol. 3 (2015) 14109-14115.
J. Zhang et al., "Challenges and opportunities in Li-Air batteries," 3d China-US Electric Vehicle and Battery Technology Workshop, Beijing, China, Mar. 14-15, 2011, 19 pages total.
Machine Translation, CN Application No. 107866938, Published Jul. 8, 2015, 24 pages total.
International Search Authority, Partial International Search Report and Written Opinion in International Application No. PCT/US2017/037509, dated Aug. 22, 2017, 14 pages total.
United States Patent and Trademark Office, Final Office Action in U.S. Appl. No. 15/623,044, dated Aug. 28, 2019, 20 pages total.
United States Patent and Trademark Office, Final Office Action in U.S. Appl. No. 15/622,998, dated Feb. 8, 2019, 12 pages total.
United States Patent and Trademark Office, Office Action in U.S. Appl. No. 15/623,044, dated Dec. 20, 2019, 16 pages total.
United States Patent and Trademark Office, Office Action in U.S. Appl. No. 16/899,257, dated Oct. 15, 2021, 22 pages total.

\* cited by examiner

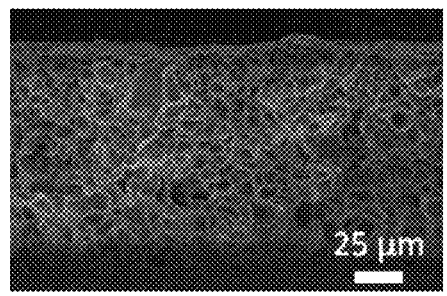 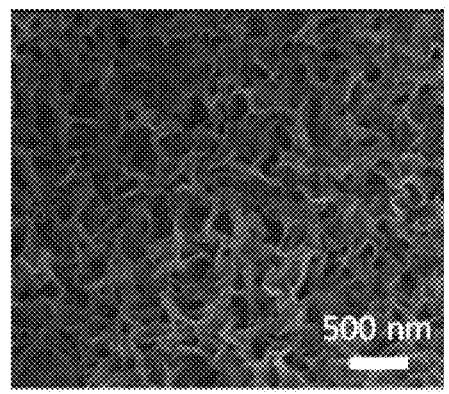
FIG. 65A         FIG. 65B
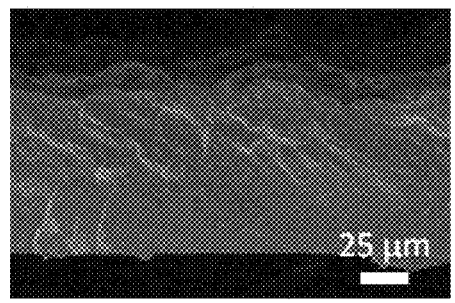 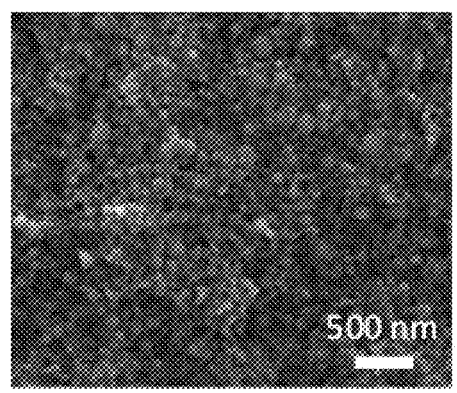
FIG. 65C         FIG. 65D
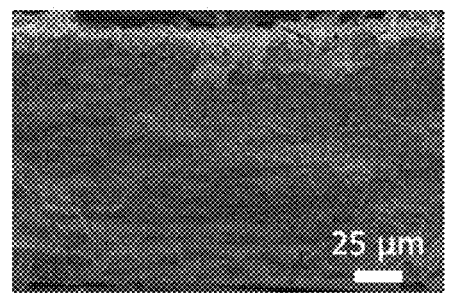 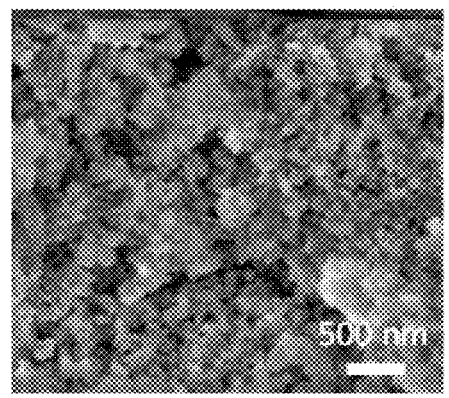
FIG. 65E         FIG. 65F

BENDABLE, CREASABLE, AND PRINTABLE BATTERIES WITH ENHANCED SAFETY AND HIGH TEMPERATURE STABILITY—METHODS OF FABRICATION, AND METHODS OF USING THE SAME

This application claims the benefit of and priority to prior filed, co-pending International Application No. PCT/US17/37509, filed on Jun. 14, 2017, which claims priority to Provisional Application Ser. No. 62/353,918, filed Jun. 23, 2016. This application is also related to U.S. application Ser. No. 15/622,998 and U.S. application Ser. No. 15/623,044, both of which are filed on Jun. 14, 2017. The disclosure of each of these applications is expressly incorporated herein by reference, each in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to batteries and, more particularly, to flexible, creasable, printable, high temperature batteries, components of the same, and methods of preparing components of the same.

BACKGROUND OF THE INVENTION

Flexible energy storage is a widely recognized necessity to powering the next generation of portable and flexible electronic devices, such as sensors, smart skins for human performance monitoring, radio frequency ID tags, and wearable electronics. Conventional batteries based on metal foil current collectors ("CCs") are too rigid and incompatible to sustain operation with repeated flexing and folding. The metal foil CC contributes to a significant proportion of a conventional battery's total weight (anywhere from 15% to 80%), which reduces overall energy density and performance, and is prone to corrosion.

To overcome these difficulties, alternative designs and substrate materials have been proposed, including carbon nanotubes ("CNTs"), graphene, textiles, and paper. These materials are flexible, light weight, have high mechanical strength, are generally chemically-stable, and some have good electrical conductivity. While promising progress is being made, the development of a flexible, bendable, and creasable device that maintains high performance, even when exposed to harsh environmental and mechanical conditions, is still a significant challenge.

There have been two conventional approaches to creating flexible batteries: (1) fabricating the battery components to be thin or (2) building free-standing, composite electrodes by growing, functionalizing, or embedding active material into a flexible, conductive scaffold. The first approach is limited because merely reducing the thickness of conventional battery components also reduces power capacity and capability. The second approach is advantageous in that the rigid, metal foil substrate may, in some circumstances, be altogether removed. For example, FIG. 1A illustrates a full-cell 50 having electrode having CCs 52, 58, each with an electrode material 54, 56 applied thereon, and an ion permeable membrane 60 between the respective CCs 52, 58 and electrode materials 54, 56. The full-cell 50 may then, optionally, be encapsulated in a flexible barrier 62, such as SURLYN (E. I. du Pont de Nemours and Co., Wilmington, Del.) or an aluminum-polymer pouch.

The electrode material 56, shown in greater detail in FIG. 1B, is conventionally comprised of a conductive additive 64 (such as carbon black, graphite, carbon nanofibers ("CNFs"), or carbon nanotubes ("CNTs")), an active material 66 (such as $LiFePO_4$, $LiCoO_2$, $LiMn_2O_4$, $LiNiMnCoO_2$, $Li_4Ti_5O_{12}$, graphite, silicon, or CNFs for lithium ion batteries), and polyvinylidene fluoride ("PVDF") as a binder 68. The CC 52 is generally non-porous (or only slightly porous). The illustrated CC 52 is constructed from aluminum or copper.

There has been some steady progress in the fabrication of composite electrodes using a variety of methods, such as vacuum filtration, hot pressing, drop casting, doctor blading, electrospinning, or freeze-drying; however, most are manufactured by batch processes that often limit deposition to two-dimensional substrates. Additionally, materials fabricated by such methods are often inherently brittle, presumptively due to a lack of binder and higher active material loading (often greater than 90 wt %), which leads to limited utility in flexible or stretchable applications.

Another difficulty associated with conventional batteries is directed to form: specifically, cylindrical or prismatic. One proposed solution has been to adopt unique spatial arrangements of rigid battery packs to enable some deformation without performance loss. However, the range of motion of these devices is restricted, and the conventional metal foil CCs are susceptible to crack formation and damage.

Further, conventional polyolefin separators require multiple processing steps (i.e., melt extrusion and stretching) for proper functionality. Such processing renders these conventional polyolefin separators unsuitable for batteries prepared exclusively with additive manufacturing.

An alternative approach is to build printable energy storage solutions. Printing capabilities could greatly simplify the manufacturing process for conventional batteries (for example, lithium ion batteries) and may enable direct integration of a power source into its corresponding device during the fabrication process. Direct write manufacturing techniques are an effective method to creating complex, multifunctional structures. And, unlike most printing techniques commonly adopted for batteries (such as stencil printing, screen printing, and spray printing), solution cast-direct write printing does not require masking, material removal, or processes to aerosolize or otherwise reduce particle size of solids in the ink. If composite electrode materials could retain suitable rheological properties, then these printing techniques (filamentary, ink jet, or aerosol jet printing) could be used. Such template-free printing techniques offer an economical, scalable approach to rapid prototyping of battery electrodes and architectures that can be patterned to fit a specific application or even directly printed on a device. Printing offers the utilization of confined or nonplanar substrates as power sources.

Beyond ease of fabrication, there is an increasing demand for secondary energy storage devices operable in high temperature environments (ranging from 60° C. to 300° C.) for applications in grid storage, automotive, aviation, medical and oil industries. For example, power sources are needed for high temperature electronics operated near engines (where temperatures can reach 150° C.,) for medical devices that can withstand a 120° C. autoclave, and for energy storage for desert photovoltaic devices (where battery temperatures can reach temperatures in excess of 60° C.). Lithium-thionyl chloride batteries are typically used for high temperature application today (operational temperature range of −60° C. to 150° C.); however, lithium-thionyl chloride batters are not rechargeable and thionyl chloride is both toxic and reactive with water. Conventional, rechargeable Li-ion batteries have the potential to meet the needs of these applications due to their high energy density, high operating voltage, and long lifetime, but several of the components of these conventional Li-ion batteries are not suited for the aforementioned, thermally-demanding conditions that often lead to accelerated cell failure. Conventional Li-ion batteries have been used in some harsh, thermal environments applications, such as solar grid storage or electric vehicles, but such applications require thermal management systems to prevent the battery from overheating. The thermal management systems not only take up unnecessary space, but are expensive and account for 8% to 12% of the total battery cost.

Despite such efforts to compensate for overheating, components of conventional Li-ion batteries are generally unable to achieve stable, long-term, high temperature (greater than 50° C.) operation. Organic electrolytes are limited to temperatures not exceeding 50° C. due to decomposition of the lithium hexafluoro-phosphate ("LiPF$_6$") salt. Many of the carbonates used in common liquid electrolyte blends, such as dimethyl carbonate ("DMC"), diethyl carbonate ("DEC"), and ethylmethyl carbonate ("EMC"), have low boiling points (less than 130° C.) and flash points (about room temperature). Therefore flammability and high internal cell pressure, especially at elevated temperature, are a concern with these carbonates. Conventional polyolefin separators typically possess a thermal shutdown temperature (less than 120° C.) due to thermally induced shrinkage or melting to close pores and the cell will not function above this temperature. If a temperature of the polyolefin separator reaches higher temperatures (e.g., greater than 200° C.), or the flammable polyolefin structure catches fire, catastrophic shrinkage ensues, which brings the electrodes into contact and initiates thermal runaway. Large shrinkage of commercial polyolefin separators can be explained by shape recovery behavior resulting from the stretching during manufacturing to generate desired porosity for ion transport.

Therefore, there remains a need for improved methods and designs of flexible, creasable, printable battery components and composite devices, or components or devices having combinations of such improved features. Moreover, there is a further need for such components and composite devices to be operational, safely, at high temperatures.

SUMMARY OF THE INVENTION

The present invention overcomes the foregoing problems and other shortcomings, drawbacks, and challenges of conventional batteries by offering flexible, creasable, printable, batteries and components batteries, or combinations thereof. Additionally, the batteries and components of batteries as described herein are operable at a wide range of temperatures with enhanced safety properties. While the invention will be described in connection with certain embodiments, it will be understood that the invention is not limited to these embodiments. To the contrary, this invention includes all alternatives, modifications, and equivalents as may be included within the spirit and scope of the present invention.

According to an embodiment of the present invention, a composite electrolyte includes a binder, a solvent, a non-solvent, and a ceramic filler. The non-solvent is configured to cause the binder to self-interact. The composite electrolyte may be cast or printed.

Other embodiments of the present invention include a battery having a cathode, an anode, a separator, and an electrolyte. The separator is a composite electrolyte having a binder, a solvent, a non-solvent, and a ceramic filler. The non-solvent is configured to cause the binder to self-interact.

For still other embodiments of the present invention, a method of fabricating a composite electrolyte includes preparing a suspension having an active material, a binder, a solvent, a non-solvent, and a ceramic filler. The non-solvent is configured to cause the binder to self-interact. The suspension is cast or printed and then dried.

Still other embodiments of the present invention include a high-temperature composite electrolyte that includes a PVDF binder, an NMP solvent, a glycerol non-solvent, and $Al_2O_3$ ceramic filler. The glycerol non-solvent is configured to cause the PVDF binder to self-interact.

Yet other embodiments of the present invention include a high-temperature, creasable electrode that includes a porous substrate and an active coating. The active coating includes an active material, a conductive additive, a binder, and an organic solvent. The active material is selected from the group consisting of $LiFePO_4$, $Li_4Ti_5O_{12}$, $LiCoO_2$, $LiMn_2O_4$, $LiFePO_4$, $LiNiMnCoO_2$ and silicon, the conductive additive is a low surface area carbon or a metallic filler, and the binder is selected from the group consisting of PVDF, PVDF-HFP, PTFE, CMC, or SBR.

In accordance with other embodiments of the present invention, a high-temperature electrolyte includes a thermally stable salt and a solvent having a boiling point greater than 200° C.

According to embodiments of the present invention, a high-temperature battery includes a cathode, an anode, a separator, and an electrolyte. The cathode includes a porous substrate and an active coating. The active coating includes an active material, a conductive additive, a binder, and an organic solvent. The active material is selected from the group consisting of $LiFePO_4$, $Li_4Ti_5O_{12}$, $LiCoO_2$, $LiMn_2O_4$, $LiFePO_4$, $LiNiMnCoO_2$ and silicon, the conductive additive is a low surface area carbon or a metallic filler, and the binder is selected from the group consisting of PVDF, PVDF-HFP, PTFE, CMC, or SBR. The separator includes a PVDF binder, an NMP solvent, a glycerol non-solvent, and $Al_2O_3$ ceramic filler. The glycerol non-solvent is configured to cause the PVDF binder to self-interact. The electrolyte includes a thermally stable salt and a solvent having a boiling point greater than 200° C.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 36A-37B are enlargements of enclosed portions illustrated, respectively, in FIGS. 36 and 37.

FIGS. 65A, 65C, and 65E scanning electron microscopy images of electrolytes prepared in accordance with embodiments of the present invention, the images acquired after cryo-fracturing the electrolytes.

FIGS. 65B, 65D, and 65F are enlargements of portions of FIGS. 65A, 65C, and 65E, respectively.

FIGS. 95A and 9B illustrate two dry, conventional CELGARD 2325 separators and a dry CPE-PI separator, according to an embodiment of the present invention, before and after exposing each separator to a flame.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

With reference now to the figures, materials, composites, methods for processing, and methods for fabricating flexible battery components and flexible batteries according to the various embodiments of the present invention are described.

Figure 1A:
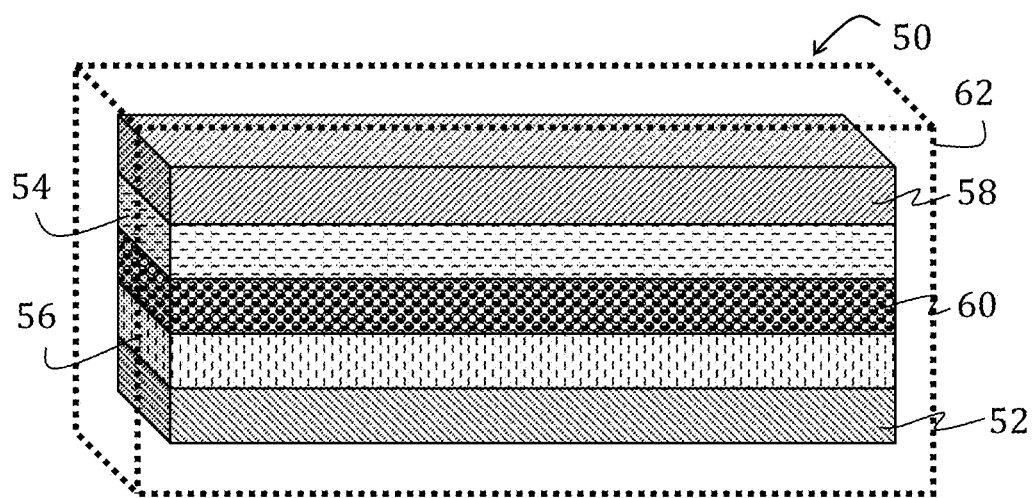
FIG. 1A is a schematic illustration of a conventional electrode according to the prior art.
Figure 1B:
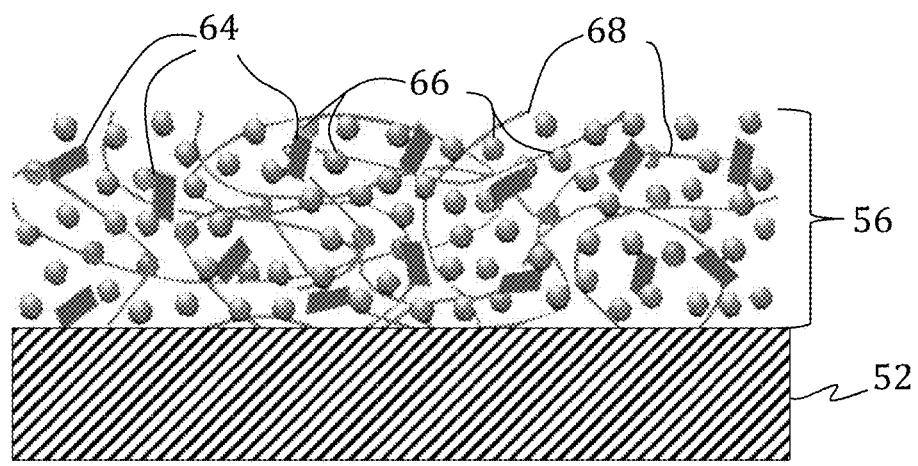
FIG. 1B is an enlargement of a portion of the conventional electrode of FIG. 1A.
Figure 2:
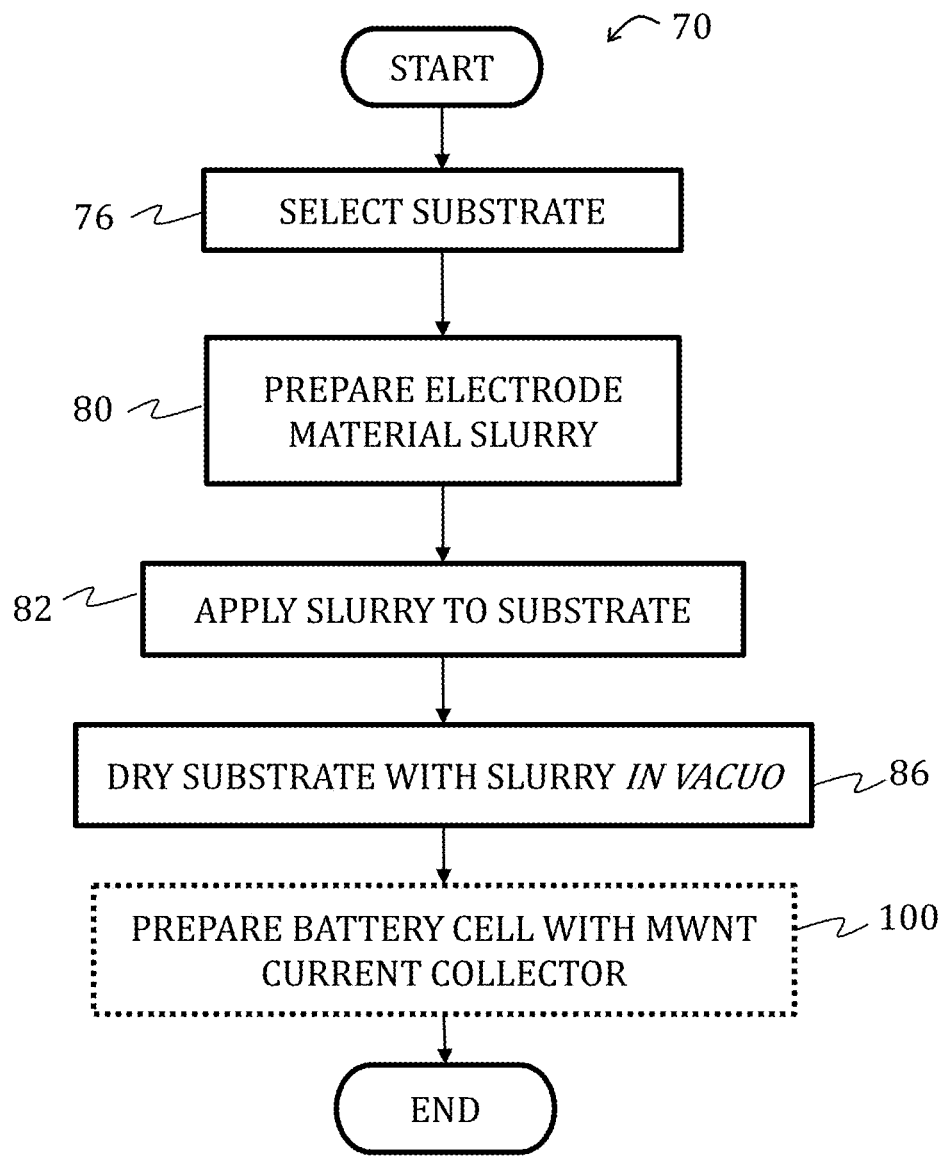
FIG. 2 is a flowchart illustrating a method of preparing an electrode according to an embodiment of the present invention.
Figure 3:
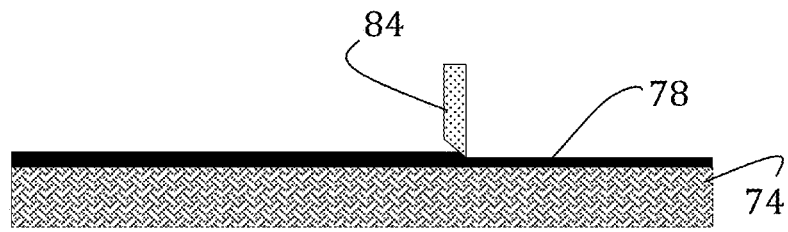
FIG. 3 is a side elevational view of a doctor blade process used in the method of FIG. 2.
Figure 4:
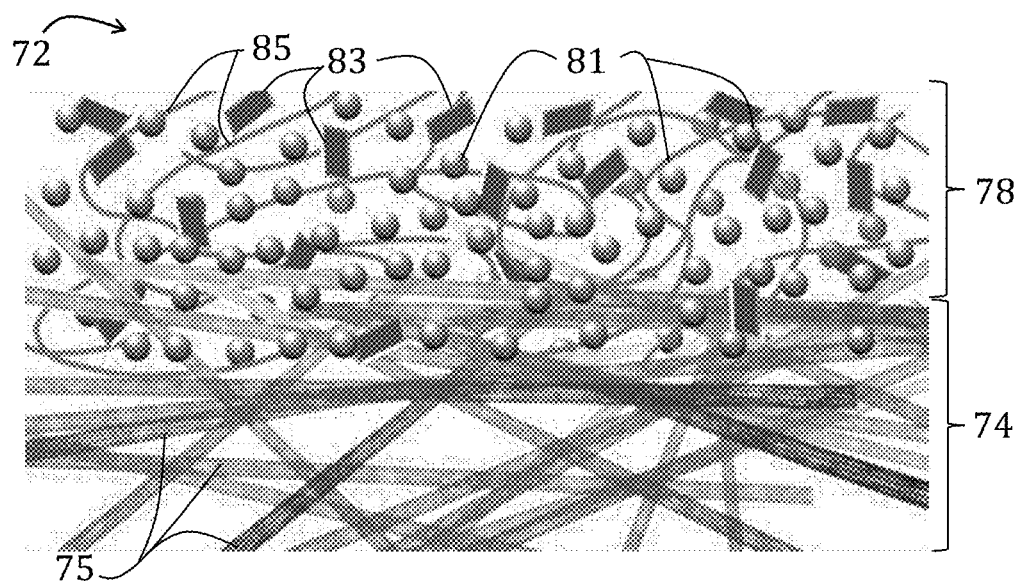
FIG. 4 is an enlarged, schematic illustration of an electrode prepared in accordance with the method of FIG. 2.

With particular reference to FIGS. 2-4, a flowchart 70 illustrating a method of preparing an electrode 72 in accordance with an embodiment of the present invention is shown. At start, a porous substrate 74 is selected (Block 74), which may comprise any porous material, such as nonwovens (for example, the illustrated substrate 74 includes multi-walled CNTs 75 ("MWNTs")), graphene, textiles, paper, metal meshes, or arrays of metallic nanowires (for example, silver or nickel). A commercially-available nonwoven mat suitable for use herein may include MIRALON (Nanocomp Technologies, Inc., Merrimack, N.H.).

A suitable electrode material slurry 78 may then be prepared for application to the porous substrate 74 (Block 80). According to the illustrated embodiment of the present invention, the slurry 78 comprises an active material 81 (here, the active material 81 is a lithium-based nanoparticle; however, other active materials 81 for other applications would be understood by those of ordinary skill in the art having the benefit of the disclosure herein), a conductive additive 83, a binder 85 (for example, a polymer), and an electrolyte (not shown). For purposes of illustration herein, lithium ion cathodes may be prepared from a slurry 78 that includes lithium iron phosphate ($LiFePO_4$) active material with a conductive additive and a binder in an organic solvent; anodes may be prepared via a slurry 78 that includes lithium titanate ($Li_4Ti_5O_{12}$) active material with a conductive additive and a binder in an organic solvent. Other appropriate active materials may include, for example, lithium cobalt oxide ($LiCoO_2$), lithium manganese oxide ($LiMn_2O_4$), ($LiFePO_4$), lithium nickel manganese oxide ($LiNiMnCoO_2$), graphite, silicon, and so forth.

Conductive additives 83 of the slurry 78 facilitate electronic transport and should, therefore, be conductive. Exemplary conductive additives 83 may include, for example, any carbon-based materials (for example, carbon black or graphite) or metallic fillers (for example, Al, Cu, Ag, or Ni) having high conductivity and configured to provide a percolative network. For the particular embodiments of the present invention here described, suitable conductive additives may include graphite, carbon black, CNTs, CNFs, and so forth.

The binder 83 of the slurry 78 may be any chemical system configured to provide adhesion, mechanical support, and flexibility. Appropriate examples of the binder 83 may include PVDF, polyvinylidene fluoride-co-hexafluoropropylene ("PVDF-HFP"), polytetrafluoroethylene ("PTFE"), styrene-butadiene rubber ("SBR"), carboxymethyl cellulose ("CMC"), and so forth.

Suitable organic solvents of the slurry 78 may include N-methyl-2-pyrrolidone ("NMP"), dimethylformamide ("DMF"), acetone, dimethylacetamide (DMAc), tetramethyl urea, dimethyl sulfoxide ("DMSO"), triethyl phosphate, and mixtures thereof.

Generally, the slurry 78 is prepared with a ratio of active material/conductive additive/binder, suitable ratios may be, for example, 93/4/3 or 70/20/10. However, the amounts of active material 81 may range from 70 wt % to 99 wt %, the amounts of conductive additive 83 may range from 0.5 wt % to 20 wt %, and the amounts of binder 85 may range from 0.5 wt % to 10 wt %. According to yet other embodiments, the amounts of active material 81 may range from 70 wt % to 99 wt %, the amounts of conductive additive 83 may range from 1 wt % to 20 wt %, and the amounts of binder 85 may range from 0 wt % to 10 wt %.

The slurry 78 may then be applied to the porous substrate 74 (Block 82). As illustrated in FIG. 3, the application method includes a doctor blade 84 (however, other methods may be appropriate, including slot-die coating, touch on screen, and stencil printing) to yield a thickness ranging from 20 µm to 200 µm, or, more particularly, from 50 µm to 60 µm. The electrode material slurry 78 and the substrate 74 are then dried in vacuo (Block 86) to yield the electrode 72.

The electrolyte is not specifically shown in FIG. 4, but would fill spaces between each the active material 81, the conductive additive 83, and the binder 85 and spaces, voids, and pores of the porous substrate 74. The electrolyte may include any appropriate electrolyte, which would readily be determined by one having ordinary skill in the art, but could, for purposes of the various illustrated embodiments, include $LiPF_6$ in a carbonate or a carbonate mixture. The carbonate may be, for example, ethylene carbonate ("EC"), DEC, DMC, EMC, or propylene carbonate ("PC").

Figure 5:
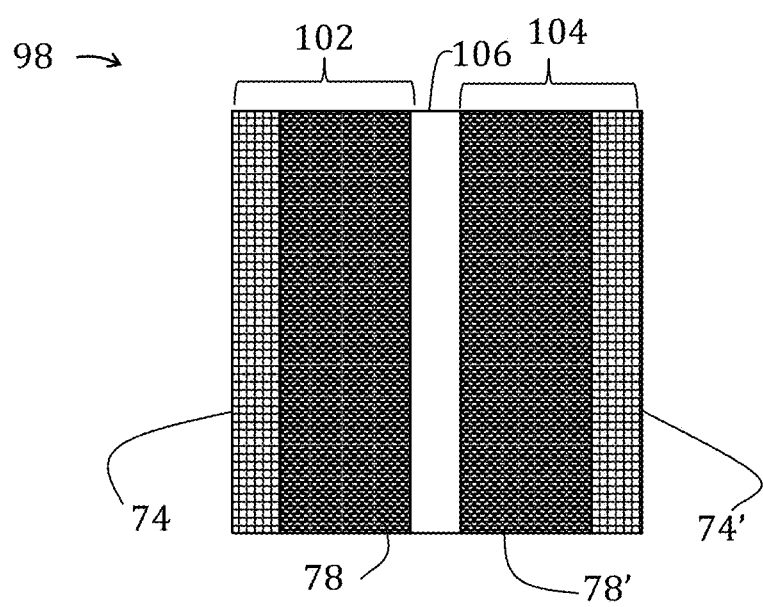
FIG. 5 is a cross-sectional view of a battery cell having a multi-walled carbon nanotube electrode prepared in accordance with an embodiment of the present invention.

Referring now to FIG. 2, with reference to FIG. 5, the electrode 72 (FIG. 4) may optionally be used in preparing a battery cell 98 (Block 100). The battery cell 98 may include a first electrode (hereafter, an anode 102) and a second electrode (hereafter, a cathode 104), with at least one of the anode 102 and cathode 104 being prepared in accordance with an embodiment of the present invention. As specifically illustrated, the anode 102 and cathode 104 each includes MWNT as the porous substrate 74, 74' with the dried slurry 78, 78' thereon and a separator 106 positioned therebetween The conductive additive 120 facilitates electronic transport and should, therefore, be conductive. Exemplary conductive additives may include, for example, any carbon-based material or metallic filler (for example, Al, Cu, Ag, and Ni) having high conductivity and configured to provide a percolative network. For purposes of illustration herein, the conductive additive 120 includes CNFs, providing high conductivity (greater than 1000 S/cm), a large aspect ratio (50 nm to 150 nm diameter with lengths of up to 100 µm), and large tensile strength (greater than 2 GPa). The conductive additive 120, particularly CNFs, may further aid in establishing a porous scaffolding that promotes ion diffusion. An amount of the conductive additive may range from 10 wt % to 40 wt %.

While a composition of the binder 122 may vary, as would be known by those of ordinary skill in the art, the binder 122 may generally include any chemical system configurable to provide adhesion, mechanical support, and flexibility. According to particular exemplary embodiments of the present invention, as described herein, the binder 122 may include those described above with reference to the electrode 72 (FIG. 4) and, more specifically, PVDF. An amount of the binder 122 may range from 10 wt % to 50 wt %.

TABLE 1

|  | Active material | Conductive additive | Binder | Solvent | Optional Non-solvent |
|---|---|---|---|---|---|
| Anode | $Li_4Ti_5O_{12}$ | CNF | PVDF | NMP | Glycerol |
|  | Graphite | Graphite | PVDF-HFP | DMF | Water |
|  | CNF | Carbon black | PTFE | DMAc | EtOH |
|  | Silicon | Metallic fillers | PEO | Tetramethyl urea | MetOH |
| Cathode | $LiFePO_4$ | (Al, Cu, Ag, Ni, | PMMA | DMSO | Ethylene glycol |
|  | $LiCoO_2$ | etc.) | PAN | Triethyl phosphate | Diethylene glycol |
|  | $LiMn_2O_4$ |  |  |  | Triethylene glycol |
|  | $LiNiMnCoO_2$ |  |  |  | Hexane |
|  |  |  |  |  | Heptane | such that the dried slurries 78, 78' are adjacent to opposing sides of the separator 106. The separator 106 is generally a material that is porous to ions and typically comprise layers of uniaxially- or biaxially-stretched polyolefins (polyethylene, polypropylene, and so forth) with a thickness ranging from about 10 µm to about 30 µm.

Figure 6:
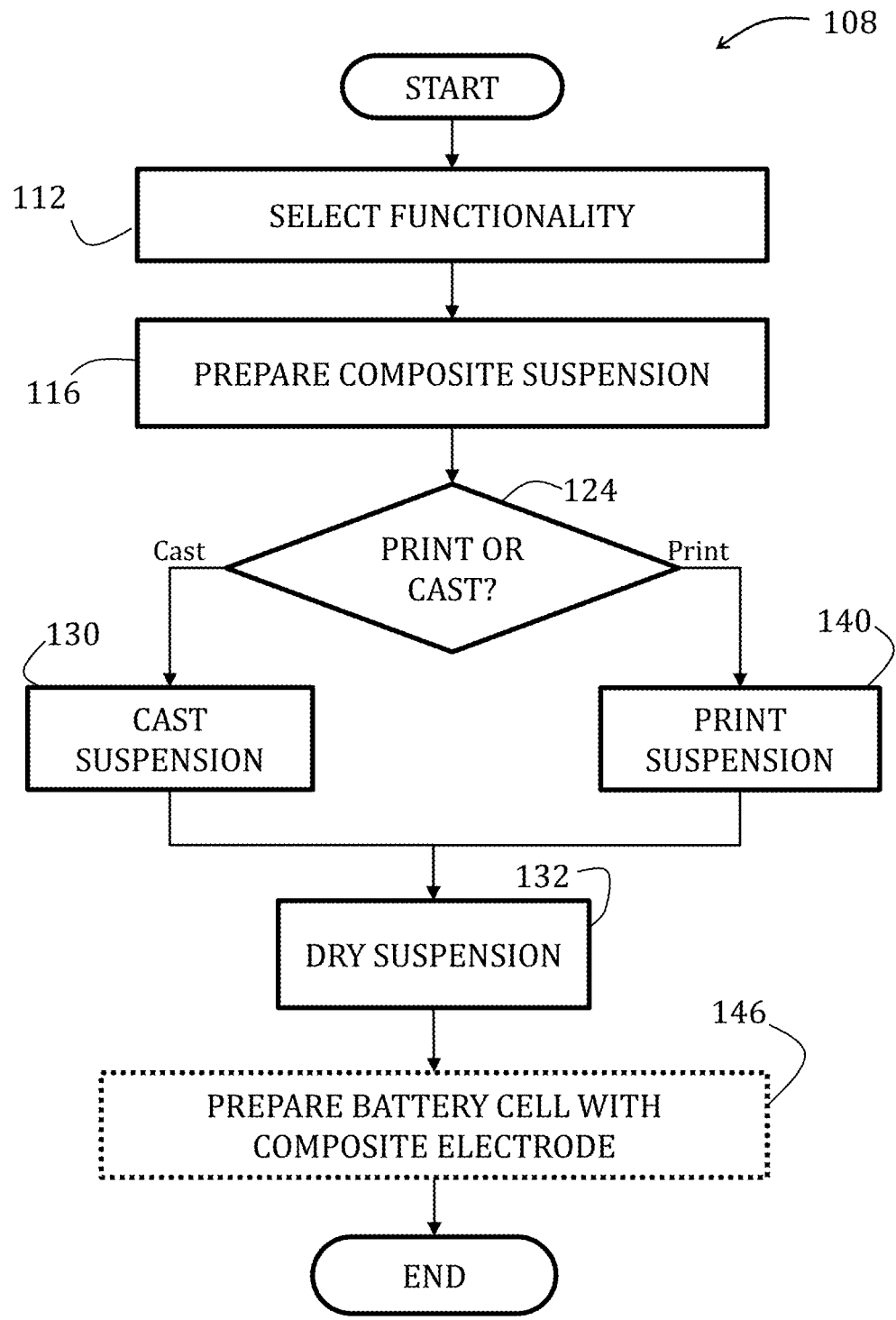
FIG. 6 is a flowchart illustrating a method of fabricating a composite electrode in accordance with an embodiment of the present invention.
Figure 7:
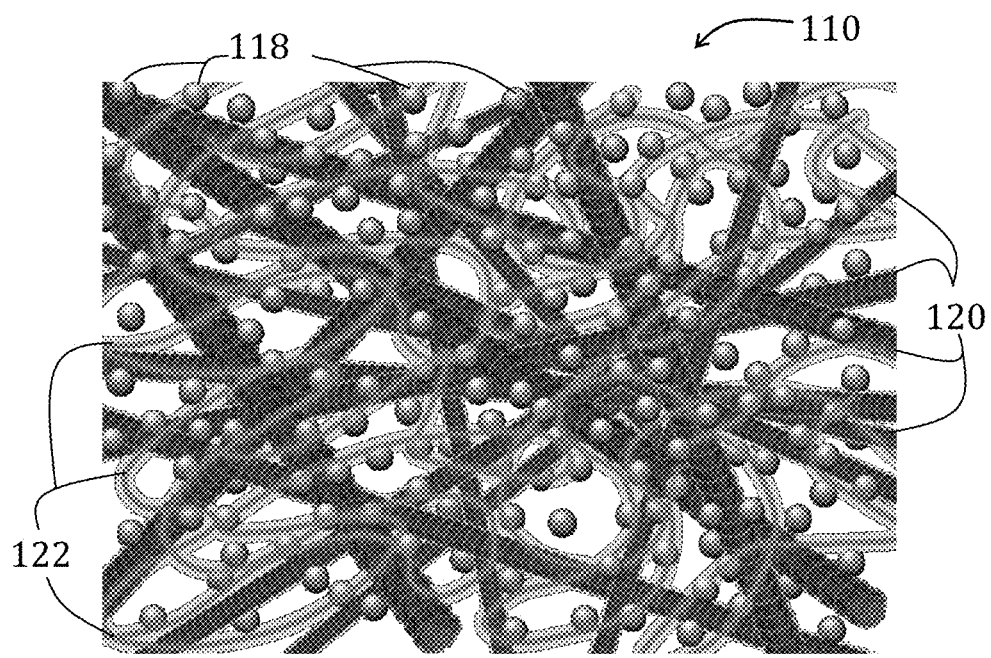
FIG. 7 is an enlarged, cross-sectional view of a composite suspension prepared in accordance with the method of FIG. 6.
Figure 8:
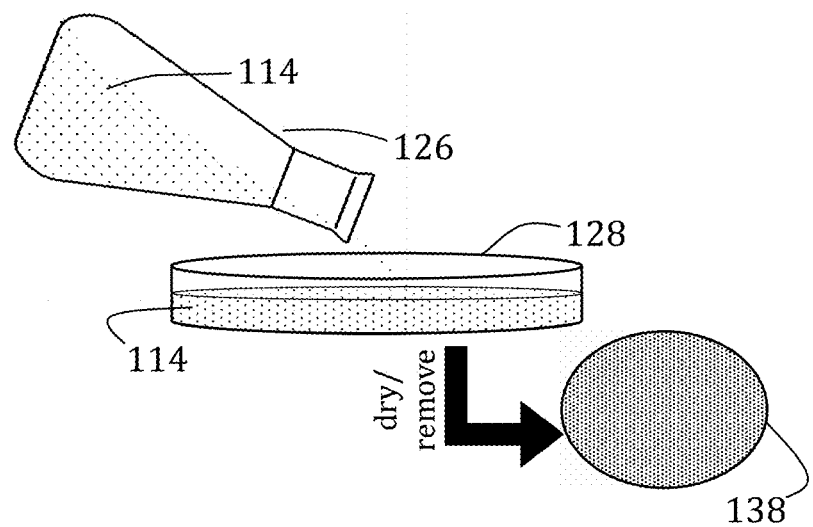
FIG. 8 is a side elevational view of a casting method used in the preparing the composite electrode of FIG. 6.

Turning now to FIG. 6, with reference to FIGS. 7 and 8, a flowchart 108 illustrating a method of fabricating a composite electrode 110 in accordance with an embodiment of the present invention is shown. At start, a functionality of the composite electrode 110 is determined (Block 112), wherein such functionalities may include a composite anode versus a composite cathode, a castable composite electrode versus a printable composite electrode, and so forth. As set forth in greater detail in Table 1, additional features of the composite electrode 110 may be specifically tailored, including both mechanical and electrochemical properties.

With desired functionality determined, a composite suspension 114 may be prepared (Block 116). While specific compositions and ratios of the elements comprising the composite suspension 114 may vary, the suspension 114 may generally include an active material 118, a conductive additive 120, a binder 122, and a solvent (not shown).

Composition of the active material 118 depends, at least in part, on a functionality of the electrode 110 being prepared and whether an anode or a cathode is desired. For purposes of illustration herein, the active material 118 may include $Li_4Ti_5O_{12}$, $LiFePO_4$, $LiCoO_2$, and so forth. Amounts of the active material may range from 25 wt % to 80 wt %.

Suitable solvents include those in which the binder 122 may be dissolved and stable over a period to time (such as for use as an ink, if desired). Specifically, as described herein, NMP, may be preferred. While non-solvent elections are more applicable to electrolyte fabrication, described in greater detail below, if a non-solvent is selected for preparing the composite electrode 110, then the weight fraction of non-solvent to solvent may range from 0.0 wt % to 30 wt %.

In preparing the suspension 114, the binder 122 may be dissolved in the solvent. The conductive additive 120, may be added to the solution. The manner by which the suspension is mixed may include shaking, sonication, and so forth. Selection of the active material 118, as described in this specific embodiment, is dependent on whether the suspension 114 is to produce a cathode or an anode, may then be added to the well-dispersed suspension. Again, the suspension 114 may be mixed.

Referring still to FIGS. 6-8, and once the suspension 114 is prepared, a decision is made as to whether the suspension 114 will be printed or cast (Decision Block 124), based, at least in part, in the functionality selected in Block 112. If casting is desired ("Cast" branch of Decision Block 124), then the suspension 114 may be transferred from a container 126 (mixing or storage) to a suitable casting dish 128 (Block 130). The casting dish 128 may include any suitable container constructed from an inert material (such as glass, metal, or plastic), but for purposes of illustration herein, the casting dish 128 is a PTFE-based Petri dish. The suspension 114 may then be dried (Block 132), or the solvent otherwise evaporated off. According to some embodiments of the present invention, drying may include two steps, such as drying at 90° C. under inert atmosphere and then drying under vacuum at 120° C. After the solvent is fully evaporated, a cast disc 138 may be removed from the casting dish 128.

Figure 9:
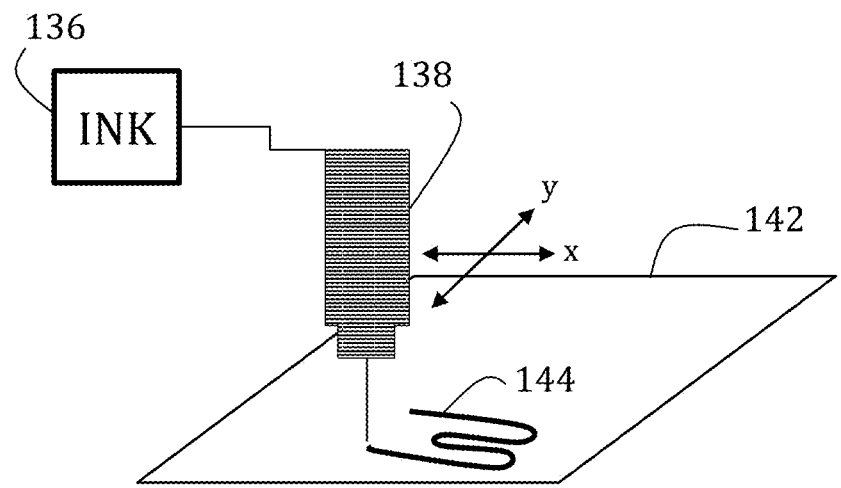
FIG. 9 is a perspective, schematic representation of a print method of preparing the composite electrode FIG. 6.

If printing is desired ("Print" branch of Decision Block 124), and as shown in FIG. 9, then the suspension 114 may be transferred to an ink well 136 that is operably coupled to a print head 138, which may include any suitable direct ink write device, such as filamentary, ink jet, aerosol jet, stencil print, or screen print, for example. The suspension 114 is printed (Block 140), for example, onto a substrate 142. According to some embodiments of the present invention, a stationary print head 138 may print the suspension 114 onto a moveable substrate 142 (moves with respect to the print head 138) or vice versa as specifically shown in FIG. 9. In either case, printing may occur along x- and y-axes of the substrate 142 to produce a print 144 on the substrate 142. Suitable substrates 142 may include rigid or flexible materials, including but not limited to glass, polymers, metals, meshes, fabrics, and so forth. Thereafter, the print 144 is dried (Block 132), or the solvent otherwise evaporated off.

Regardless of the final shape, whether the cast disc 138 (FIG. 8) or the print 144 (FIG. 9), FIG. 7 illustrates a structure of the composite electrode 110 having the active material 118, the conductive additive 120, and the binder 122. While not specifically illustrated, it would be understood that a suitable electrolyte could be added, intercalate into, and at least partially fill the spaces, voids, or pores between or within the active material 118, the conductive additive 120, and the binder 122.

Figure 11:
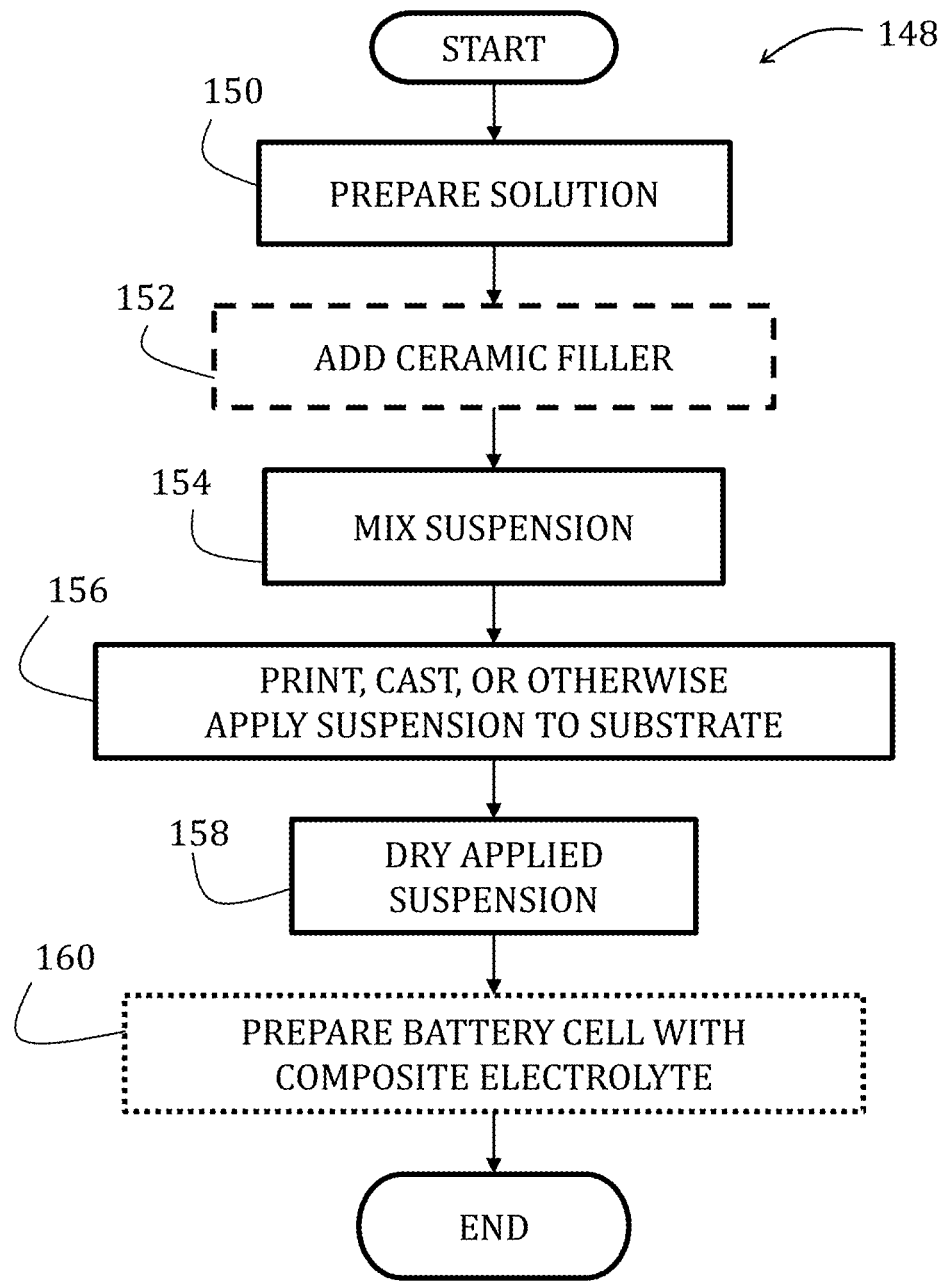
FIG. 11 is a flowchart illustrating a method of fabricating a composite electrolyte according to another embodiment of the present invention.

The composite electrode 110 may then be used in preparing of a battery cell 145 (Block 146), which is shown in FIG. 11 and includes a composite cathode 147 and a composite anode 149, both of which may be prepared in accordance with embodiments herein, separated by separator 151. The separator 151 may be prepared in accordance with embodiments described herein (specifically, below) or may be a commercially-available separator 151.

Figure 10:
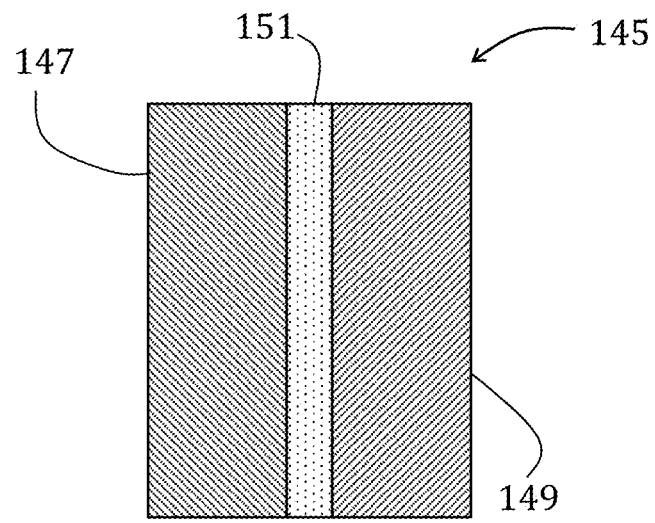
FIG. 10 is a schematic illustration, in cross-section, of a full-cell having a composite cathode and a composite anode prepared in accordance with embodiments of the present invention.

Turning now to FIG. 10, a method 148 of fabricating a composite electrolyte suitable is described. At start, a solution is prepared (Block 150) and includes a binder, a "good solvent," and a "non-solvent." The binder may be any suitable, conducting polymer, such as PVDF, PVDF-HFP, PTFE, PEO, PMMA, PAN, CMC, and SBR and amounts of the binder may range from 20 wt % to 50 wt %.

Good solvents are those solvents that dissolve the binder well and by energetically favorable interactions between the binder and the solvent molecules; non-solvents are those solvents that do not dissolve the binder as well as the good solvents because of a preference of the binder to self-interact in the presence of the non-solvent. According to some embodiments of the present invention, non-solvents have a boiling point that is higher than a boiling point of the good solvent. In such instances, the non-solvent remains during a drying process, leading to pore formation via a phase inversion ("PI") process. Generally, an amount of the good solvent may range from 90 wt % to 95 wt % while an amount of the non-solvent may range from 0.1 wt % to 30 wt % or, more specifically for some embodiments, from 5 wt % to 10 wt %.

Once the solution is mixed, a ceramic filler may, optionally, be introduced (Block 152) and the suspension mixed (Block 154). The ceramic filler may be any suitable inert particulate suitable for disrupting dendrite formation. Suitable ceramic fillers may include, for example, alumina ($Al_2O_3$), silica ($SiO_2$), titania ($TiO_2$), magnesia (MgO), lithia ($Li_2O$), lithium aluminate ($LiAlO_2$), barium titanate ($BaTiO_3$), lithium aluminum germanium phosphate ("LAGP"), lithium aluminum titanium phosphate ("LATP"), lithium lanthanum titanate ("LLTO"). An amount of the ceramic filler may range from 50 wt % to 80 wt %.

In Block 156, the suspension may be printed, such as in the manner described above with reference to FIG. 9, cast, such as in the manner described above with reference to FIG. 8, or otherwise applied to a substrate, such as in the manner described above with reference to FIG. 3. After application by the selected manner, the suspension is dried under ambient conditions or assisted with heating, vacuum, or other known methods (Block 158). The composite electrode may then be used in preparation of a battery cell (Block 160), such as with a composite electrode and slurry coated porous electrode as described above. Moreover, the electrolyte may be printed onto or cast over either of the electrodes or commercial electrodes.

According to still other embodiments of the present invention, materials for the method of preparing an electrolyte according to FIG. 11 may be selected such that the electrolyte is suitable for use at high temperatures, i.e., temperatures up to about 150° C. High temperature cells may be formed using one or more flexible components prepared in accordance with embodiments of the present invention or, alternatively, with one or more conventional components.

For high temperature applications, selection of materials comprising the electrolyte, electrode, composite electrode, and so forth may be limited as compared to the embodiments described above, including those at room temperature. For instance, a $LiFePO_4//Li_4Ti_5O_{12}$ full-cell prepared using a CPE-PI electrolyte prepared according to embodiments described above does not cycle at high temperature when lithium bis(trifluoromethyl-sulfonyl)imide ("LiTFSI") is used as the salt. While not wishing to be bound by theory, it is believed that failure of these full-cells may be due to liquid electrolyte (trifluoromethylsulfonyl)imide, "TFSI," intercalation into CNFs comprising the composite electrodes. Such intercalation may cause electrolyte and $Li^+$ consumption, which may render the full-cells unable to achieve a single full charge.

For instance, cells suitable for operating at temperatures ranging from room temperature up to about 120° C. may comprise electrolyte comprising a thermally stable salt dissolved in a high boiling point liquid (i.e., a liquid having a boiling point greater than 200° C.). Suitable salts may include LiTFSI or lithium bix(oxo-alato)borate ("LiBOB"). The electrolyte liquid may include, but is not limited to, high boiling point carbonates (such as EC, PC, or dibuty carbonate ("DBC")), room temperature ionic liquids ("RTILs"), other high boiling point liquids (such as γ-butyrolactone ("GBL") and tetraethylene glycol dimethyl ether ("TEGDME")), or combinations thereof. Such electrolyte may facilitate the formation of a stable solid electrolyte interphase ("SEI") layer. The SEI is a passivating, solid layer typically formed on the surface of the anode (e.g., graphite or lithium metal) that is electrically insulating but facilitates ionic conduction. The SEI layer is necessary to minimize irreversible liquid electrolyte degradation and capacity fade. Electrolyte additives, such as vinylene carbonate ("VC") and ethylene sulfite ("ES") may aid in the formation of the SEI layer. An amount of the electrolyte additives may range from 0.0 wt % to 10 wt %.

LiBOB in PC or EC provides thermal stability suitable for certain embodiments of the present invention. However, use of LiBOB and SEI forming materials may limit the selection of conductive additives as such liquids may react with additives having high surface area carbon (such as carbon black or CNFs), a phenomenon that may be accelerated at elevated temperatures. Therefore, lower surface area conductive additives, such as graphite, may be preferred.

Flexible or creasable batteries suitable for operating at temperatures ranging from room temperature up to about 120° C., according to embodiments of the present invention may be prepared by from a slurry comprising a suitable conductive additives including low surface area carbons (such as graphite) or metallic fillers (for example, Al, Cu, Ag, or Ni) with a suitable binder (PVDF, PVDF-HFP, PTFE, CMC, or SBR), and an active material (graphite, LiFePO$_4$, LiMn$_2$O$_4$, LiNiMnCoO$_2$, Li$_4$Ti$_5$O$_{12}$, silicon, or LiCoO$_2$) applied to a flexible substrate.

The flexible or creasable and high-temperature battery may further include a CPE-PI separator and a liquid electrolyte having 1 M LiBOB in 1/1 EC/PC and 5% VC.

The flexible or creasable and high-temperature battery may further include an anode having an anode active material on a flexible substrate or a cathode having a cathode active material on a flexible substrate.

In some instances, formulations for components according to one or more embodiments described herein may require alterations to render the formulations suitable for certain print techniques. For instance, slot die coating techniques require fast dry times. As such, and by way of example, a fast drying electrolyte according to an embodiment of the present invention may include a combination of acetone and water as the solvent and non-solvent, respectively. More particularly, PVDF-HFP could be dissolved in a 95/5 w/w solution of acetone and water. Once dissolved, Al$_2$O$_3$ may be introduced and the solution sonicated. The low boiling points of acetone and water facilitate faster drying times by allowing removal of solvent within minutes at room temperature.

Figure 12:
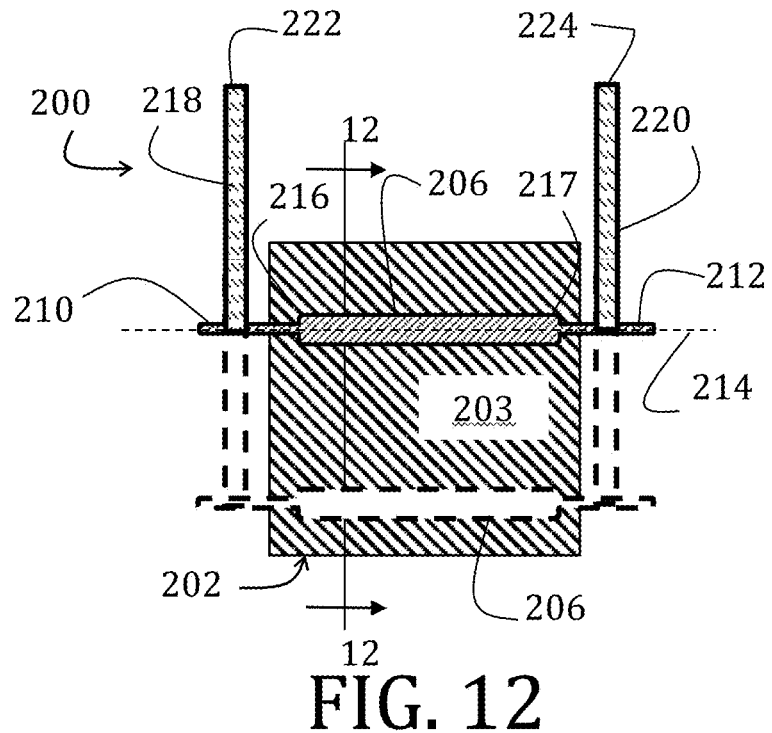
FIG. 12 is a top-side view of a flex durability tester according to an embodiment of the present invention.
Figure 13:
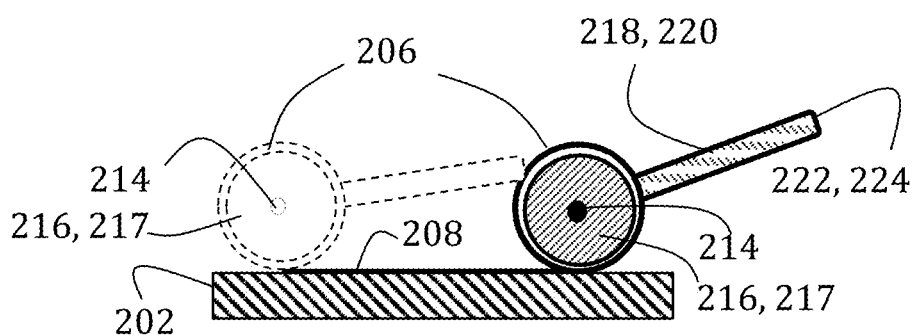
FIG. 13 is side elevational view of a mandrel of the flex durability tester of FIG. 12, shown in cross section with a flexible battery component coupled thereto.
Figure 14:
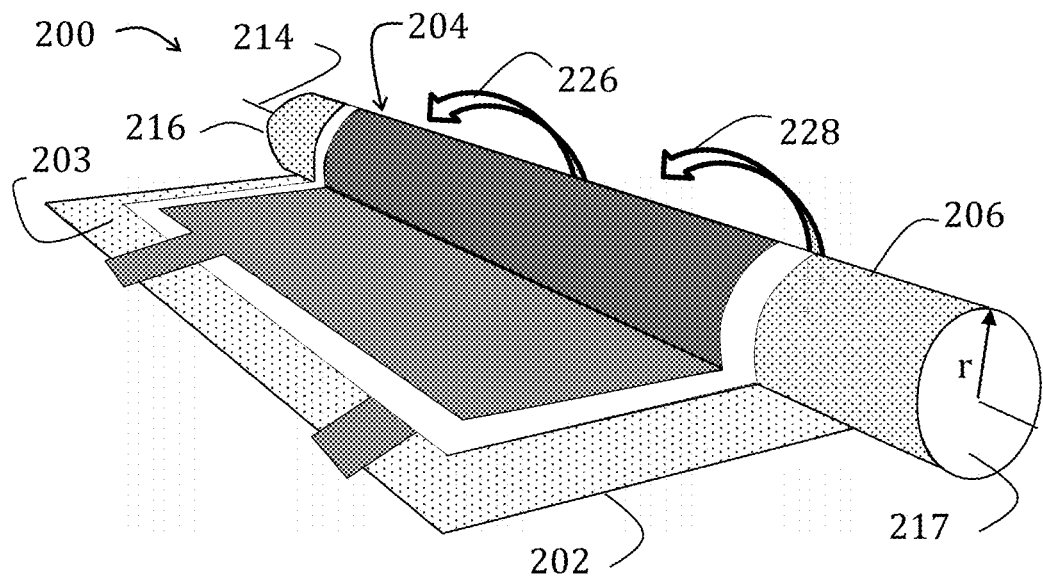
FIG. 14 is a perspective view of the mandrel with the flexible battery component of FIG. 13.

Referring now to FIGS. 12-14, a flex durability tester 200 (hereafter referred to as "tester") according to an embodiment of the present invention is schematically illustrated. With particular reference to FIG. 12, the tester 200 comprises a platform 202 providing a surface 203 thereof on which a battery 204 or a component of the battery may be rolled. A mandrel 206 is positioned on the platform 202 such that the mandrel 206 rolls linearly along the surface 203 of the platform 202. While not specifically illustrated herein, the mandrel 206 may further include a point of attachment in which the battery 204 or the component thereof to be tested is operably coupled to the mandrel 206 for a duration of the test. In the particular, illustrative embodiment, the mandrel 206 further comprises two coaxial struts 210, 212, extending along a lengthwise central axis 214 of the mandrel 206 and away from opposing ends 216, 217 of the mandrel 206. Each strut 210, 212 provides a contact point by which a piston 218, 220 may be operably coupled to the mandrel 206. Ends 222, 224 of the pistons 218, 220 distal to the struts 210, 212 may be operably coupled to a motor (not shown) in a manner that is known to those of ordinary skill in the art. Altogether the pistons 218, 220 and motor are configured to roll (arrows 226, 228) the mandrel 206 along the surface 208 of the platform 202 between a first position (illustrated in solid in FIGS. 12 and 13) and a second position (illustrated in phantom in FIGS. 12 and 13).

In use, and with reference now to FIGS. 12-14, the battery 204 (or particular component of the battery under investigation), after being secured to the mandrel 206 (for example, by way of the point of attachment), may be rolled and unrolled by advancing the mandrel 206 over the surface 203 of the platform 202 between the first and second positions. Angular conditions may be chosen such that strain, ε, experienced by the battery or component may be adjusted by altering a radius, r, of the mandrel 206 and in accordance with Equation 1:

$$\varepsilon_T = -\varepsilon_C = \frac{y}{r} \qquad \text{EQUATION 1}$$

Figure 15:
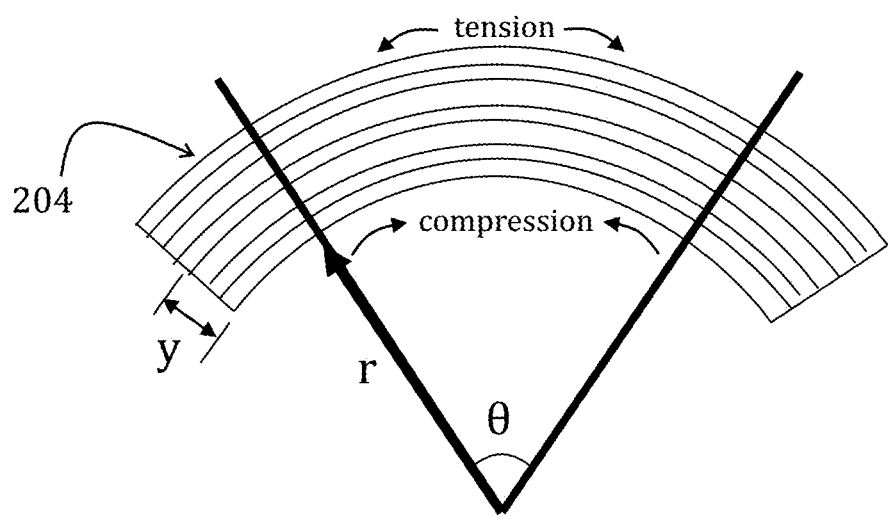
FIG. 15 is a schematic representation of a relationship between tension and compression forces applied to the flexible battery component rolled and unrolled about the mandrel in FIGS. 13 and 14.

In Equation 1 (schematically illustrated in FIG. 15), y is a distance from a surface of the battery 204 to its neutral plane. Therefore, the tensile, T, and compressive, C, strains are equal in magnitude but opposite in direction. Use of the tester 200 enables examination and testing of the electrochemical performance and mechanical fatigue of cells under specific amounts of strain ranging from 0% to 6%, or in some embodiments, up to 4.2% (in either tension or compression).

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

EXAMPLE 1

MWNT CCs according to embodiments of the present invention were prepared from slurries comprising LiFePO$_4$ (cathode) or Li$_4$Ti$_5$O$_{12}$ (anode) as an active material, graphite powder as a conductive additive, and PVDF as a binder in NMP solvent. Both LiFePO$_4$ and Li$_4$Ti$_5$O$_{12}$ slurries were applied, separately, to MWNT mats and conventional metal foils (Al and Cu) by a doctor blade method (Gardco Inc., Pompano Beach, Fla.) using a 6 mil path depth, and subsequently dried at 120° C. under vacuum for at least 12 hr to yield an active coating. Samples (0.375 in diameter discs) were punched from each of the MWNT CCs and the foil-based CCs. On average, the weights of Li$_4$Ti$_5$O$_{12}$ and LiFePO$_4$ in each disc ranged from 2.0 mg to 2.5 mg for the foil-based and MWNT CCs, respectively, corresponding to coating thicknesses ranging between 50 μm and 60 μm.

Wetting properties of these MWNT CCs and Li$_4$Ti$_5$O$_{12}$/MWNT electrodes were compared to commercially-available and conventional copper foil CCs and Li$_4$Ti$_5$O$_{12}$/Cu electrodes. Commercially-available CC and electrodes included copper (EQ-bccf-25u) or aluminum (EQ-bcaf-15u-280) foil CC s (MTI Corp., Richmond, Calif.). Spinel Li$_4$Ti$_5$O$_{12}$ nanopowder, PVDF, and NMP were purchased from Sigma Aldrich Co. (St. Louis, Mo.). LiFePO$_4$ was purchased through BASF SE (Ludwigshafen, Germany) (HED LFP-400), and graphite was purchased from Asbury Graphite Mills (Ashbury, N.J.) (HPM 850 powder). 1 M LiPF$_6$ in 1/1 EC/DEC by wt. was used as received from Novolyte Technologies Inc. To evaluate electrolyte wetting, samples were taped to a glass slide and 2.0 μL, of liquid electrolyte (1 M LiPF$_6$ in 1/1 EC/DEC by wt.) was applied to the center of each sample with a micropipetter.

Liquid electrolyte wetting was evaluated using electrodes prepared in the manner described in Example 1 by depositing a 2 μL, electrolyte (1 M LiPF$_6$ in 1/1 EC/DEC by wt.)

drop on each cell. For CCs having the active coating and for neat CCs (that is, the substrates), the drop quickly wicks through the MWNT mat and is visible on the bottom side of the substrate. On the electrodes having foil-based CCs, the electrolyte drop did not wick through the substrate thickness.

The electrolyte droplet on the neat MWNT mat demonstrated a significantly lower contact angle as compared to the contact angle of the electrolyte drop on the neat Cu foil. Such result indicates better wettability in the MWNT mat.

Figure 16:
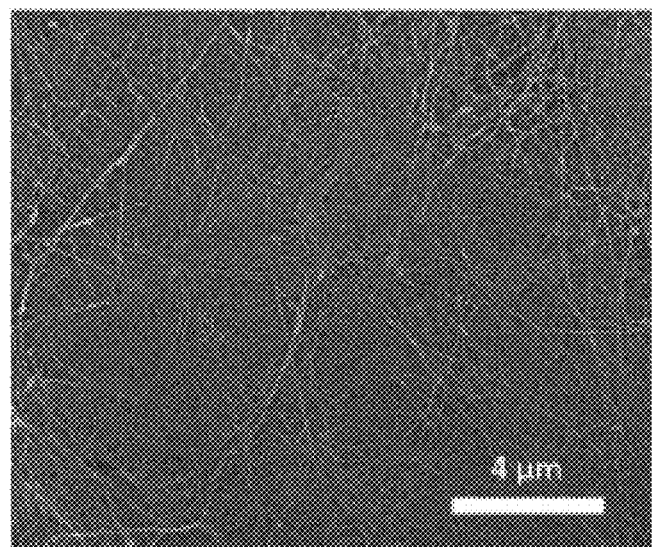
FIG. 16 is a scanning electron microscopy image of a multi-walled carbon nanotube current collector prepared in accordance with an embodiment of the present invention.
Figure 17:
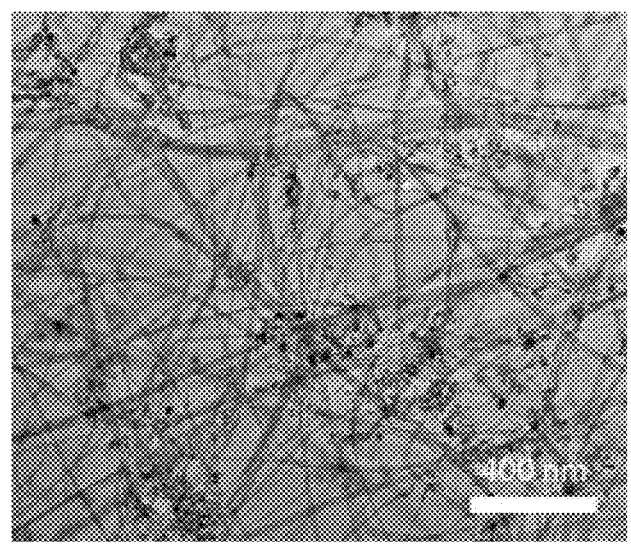
FIG. 17 is a transmission electron microscopy image of the multi-walled carbon nanotube current collector of FIG. 16.

FIGS. 16 and 17 are scanning electron microscopy ("SEM") and transmission electron microscopy ("TEM") images, respectively, of the MWNT CCs. The images were acquired on an FEI Sirion XL-30 FEG-SEM (FEI Co., Hillsboro, Oreg.) and a Cs-corrected (image corrector) FEI Titan (FEI Co.) operating at 300 kV. Free-standing layers of the MWNT CC samples were sufficiently thin for TEM imaging to be prepared using scotch tape exfoliation, illustrating the strength of the nanotube network. The MWNT CCs had a high porosity (75%), which was observed using TEM (porosity calculated from the bulk density of the film, measured to be 0.52 g/cm$^3$, and assuming a value of 2.1 g/cm$^3$ for the intrinsic density of the MWNT). The MWNT CCs had a high specific surface area, which was measured to be 176 m$^2$/g.

Figure 18:
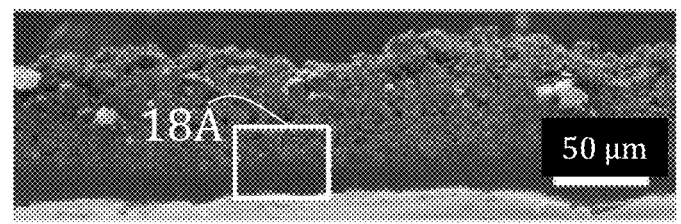
FIGS. 18 and 19 are scanning electron microscopy images of a multi-walled carbon nanotube electrode prepared in accordance with an embodiment of the present invention and a conventional foil-based current collector, respectively.
Figure 18A:
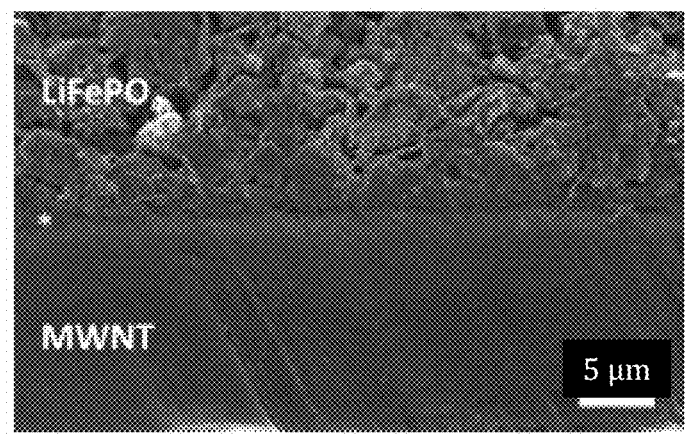
FIGS. 18A and 19A are enlargements of the portions enclosed in FIGS. 18 and 19, respectively.
Figure 19:
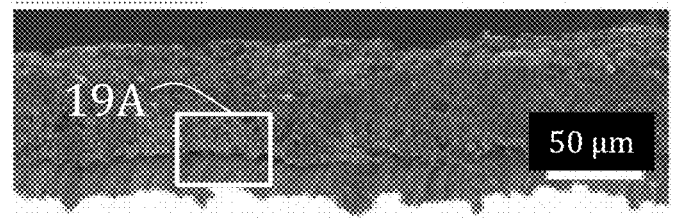
Figure 19A:
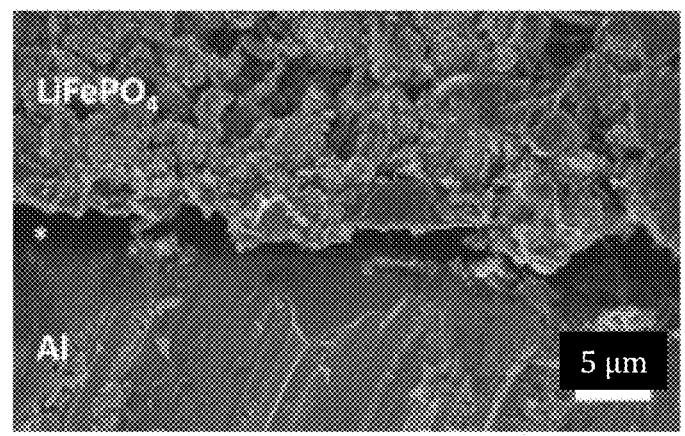

FIGS. 18, 18A, 19, and 19A are cross-sectional SEM images of slurry coated MWNT and the foil-based CC electrodes, respectively. FIGS. 18A and 19A are enlargements of portions enclosed by boxes 18A and 19A of FIGS. 18 and 19. Cross-sectional SEM samples were prepared through cryo-fracturing by dipping each sample in liquid N$_2$ and immediately cutting (with a razor blade), from the active coating side, through each sample. Optical microscopy was performed using a Zeiss Stemi DV4 stereo microscope (Carl Zeiss, AG, Oberkochen, Germany). Tensile test specimens were prepared according to ASTM standard E345-93 (2013) using a double-bladed cutter to form 50 mm×5 mm rectangular strips. Sample thicknesses were measured using a digital micrometer (Mitutoyo America Corp., Aurora, Ill.). After cutting, samples were mounted on paper supports to ensure alignment of each sample and a 25.4 mm gauge length.

Mechanical testing was performed using an H10K-S UTM benchtop tester (Tinius Olsen, Horsham, Pa.) with a HTE-100 N load cell at an extension rate of 0.5 mm/min. Surface area and porosity data of the MWNT CC were calculated by the Brunauer-Emmett-Teller ("BET") method based on N$_2$ adsorption-desorption isotherms at 77 K obtained using an ASAP 2020 surface area and porosimetry analyzer (Micromeritics Instrument Corp., Norcross, Ga.). Each sample was degassed at 200° C. under vacuum for 12 hr before acquiring measurements. Electrical conductivity was performed with an SP4, four point probe head (Lucas Labs, Gilroy, Calif.) controlled with a 2410 SourceMeter (Keithley Instruments, Solon, Ohio) and a computer-operated LabVIEW program (National Instruments, Austin, Tex.).

Samples from MWNT CCs (FIGS. 18 and 18A) prepared in accordance with embodiments of the present invention exhibited superior interfacial adhesion between the MWNT mat and the active coating. The high porosity and better wetting capability of the MWNT CC is believed to yield stronger binding between the active coating and the MWNT mat. By contrast, as shown in FIGS. 19 and 19A, the LiFePO$_4$ active coating on the foil-based CCs included many gaps and portions of delamination.

Samples of the MWNT CCs were sufficiently porous such that electrolyte (1 M LiPF$_6$ in 1/1 EC/DEC by wt.) could access the active material from both sides the MWNT mat, which promotes homogenous wetting. Similar wetting is not possible with the foil-based CCs. Proper wetting is a critical factor for Li-ion batteries as insufficient or inhomogeneous electrolyte wetting has been shown to accelerate cell degradation and shorten cell life.

Figure 20:
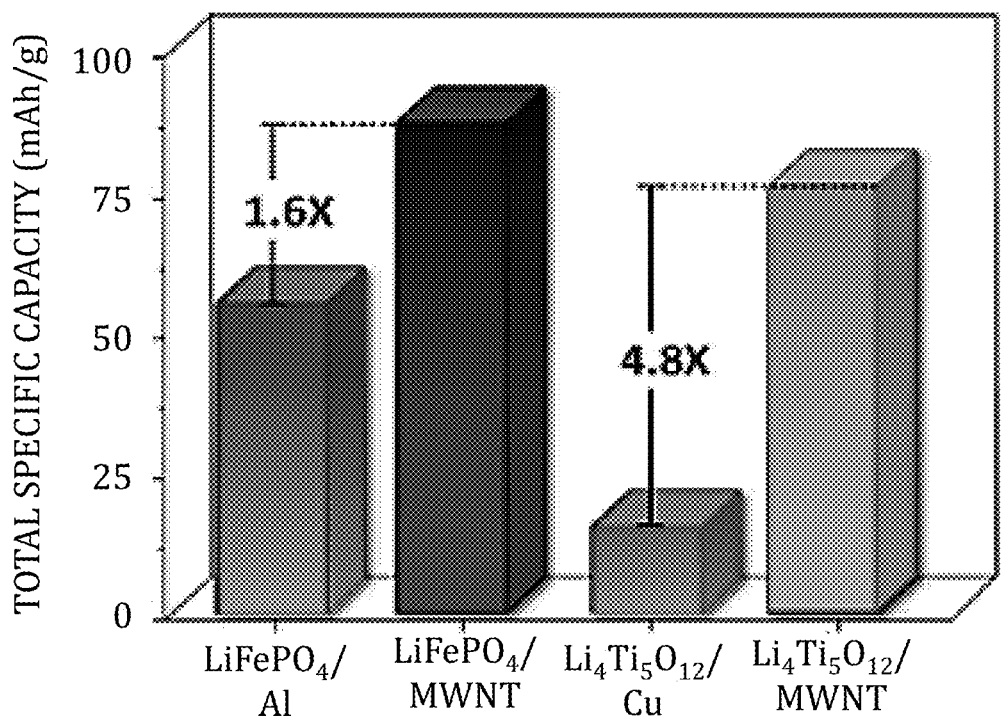
FIG. 20 is a graphical representation of specific capacity performance half-cells, one prepared in accordance with embodiments of the present invention, and one prepared according to conventional methods.

The high porosity of the MWNT CCs yielded a much lower density as compared to the foil-based CCs (0.52 g/cm$^3$, 2.56 g/cm$^3$, and 8.87 g/cm$^3$ for MWNT CCs, Al based CCs, and Cu based CCs, respectively). This, as illustrated in FIG. 20, leads to substantially improved total specific capacity values for electrodes using MWNT mat substrates as compared to the metal foil substrates. Specifically, 1.6-times and 4.8-times improvements were observed for LiFePO$_4$ and Li$_4$Ti$_5$O$_{12}$ electrodes, respectively, when accounting for the total mass (active material, conductive additive, binder, and CC).

EXAMPLE 2

Figure 21:
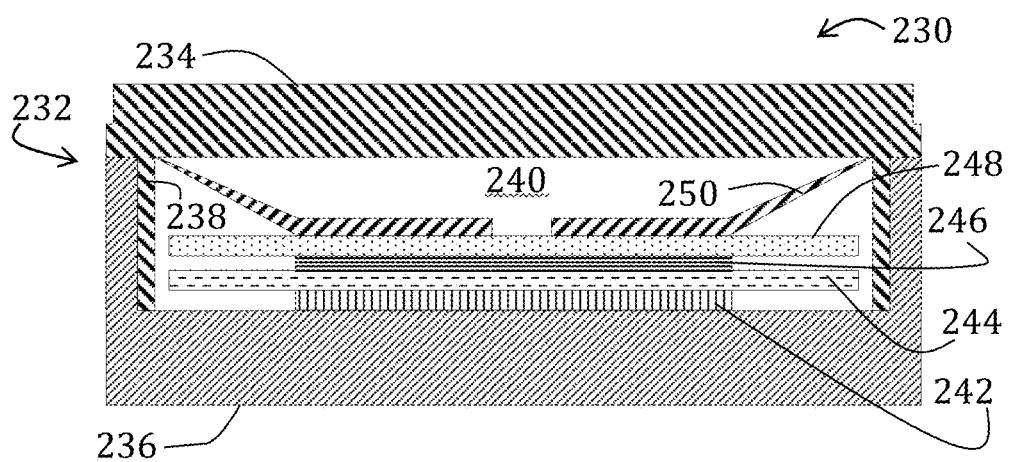
FIG. 21 is a side elevational view, in cross-section, of a 2325 coin cell configuration suitable for use with embodiments of the present invention.
Figure 21A:
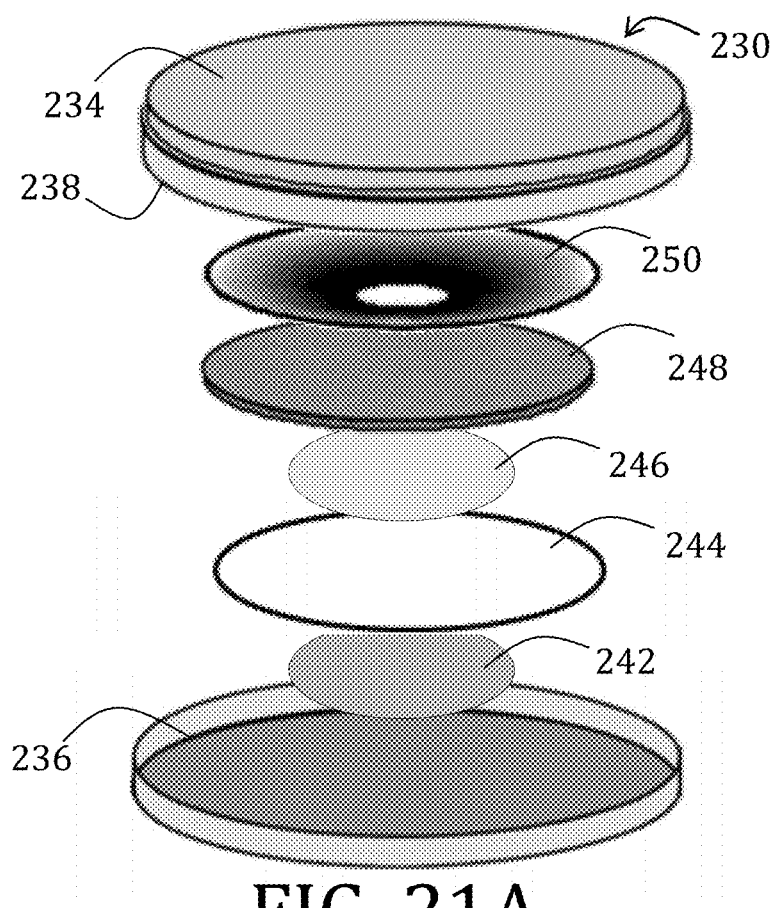
FIG. 21A is an exploded view of the 2325 coin cell of FIG. 20.

Electrochemical performance of half-cells composed of either LiFePO$_4$ or Li$_4$Ti$_5$O$_{12}$ slurries on both MWNT mats and conventional metal foils (Al and Cu) were fabricated versus a lithium counter electrode. Electrode samples were assembled into a 2325 coin cell configuration under argon environment (less than 1 ppm of each of H$_2$O and O$_2$). As illustrated in FIGS. 21 and 21A, an exemplary coin cell 230 configuration is shown (assembled and exploded views, respectively). Briefly, the coin cell 230 includes an encasement 232 comprising a negative cap 234 and a positive base 236. As specifically illustrated, although not required, at least a portion 238 of the negative cap 234 is surrounded by the positive base 236 to form a cavity 240 therein. Within the cavity 240, from the positive base 236 upwardly to the negative cap 234, the coin cell 230 includes a cathode 242, a separator 244, an anode 246, and a spacer 248, all of which are positioned and maintained by a Belleville spring 250.

For half-cell experiments, each electrode sample (having either a foil-based CC or a MWNT CC) was assembled with lithium foil as counter and reference electrodes and a porous polymer membrane (CELGARD 2325, Celgard, LLC, Charlotte, N.C.) as the separator. The half-cells were soaked in a liquid electrolyte solution of 1 M LiPF$_6$ in 1/1 w/w EC/DEC (Novolyte Technologies Inc., Independence, Ohio).

Figure 22:
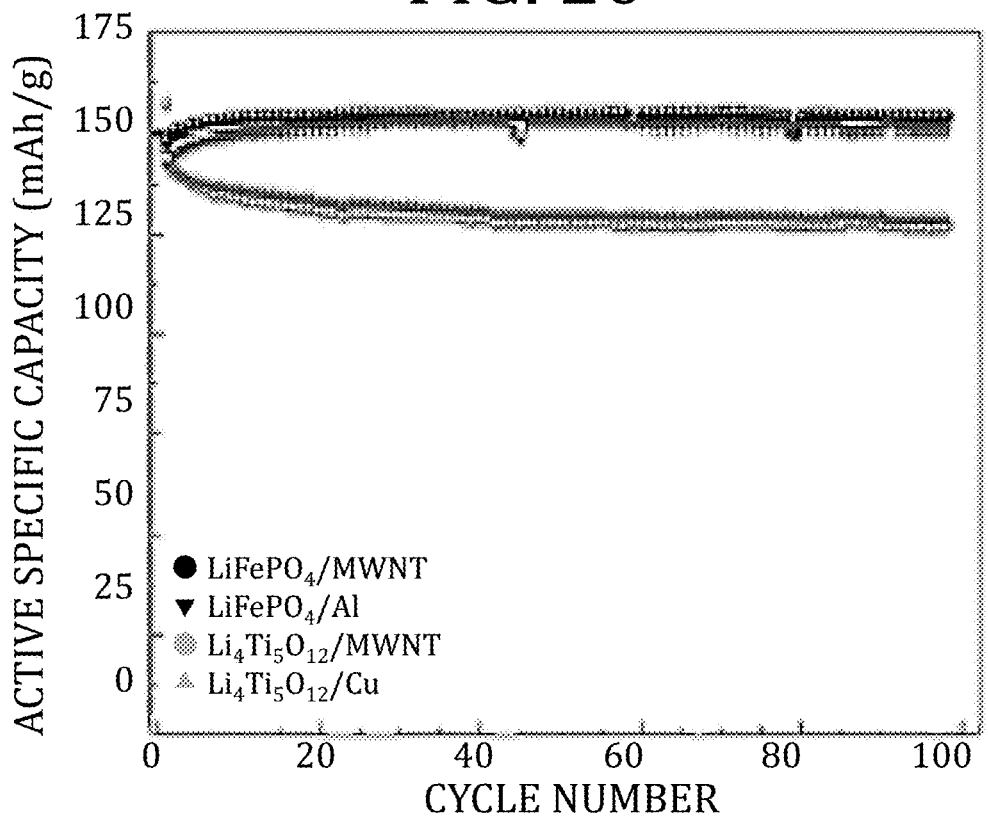
FIG. 22 is a graphical representation of the cycling behavior of half-cells, one prepared in accordance with embodiments of the present invention, and one prepared according to conventional methods, at a constant C/5 current rate.

In FIG. 22, the cycling behavior of each half-cell at a constant C/5 current rate was found to effectively be the same for both the foil-based CCs and the MWNT CCs. Observed specific capacity values (based on active mass) were as expected for both LiFePO$_4$ and Li$_4$Ti$_5$O$_{12}$. Each half-cell was cycled up to 100-times with limited-to-no loss of performance, which suggests that the highly porous MWNT mat was acting as a CC by permitting access to all of the available active material of the active coating without directly participating in the electrochemical reaction.

Figure 23:
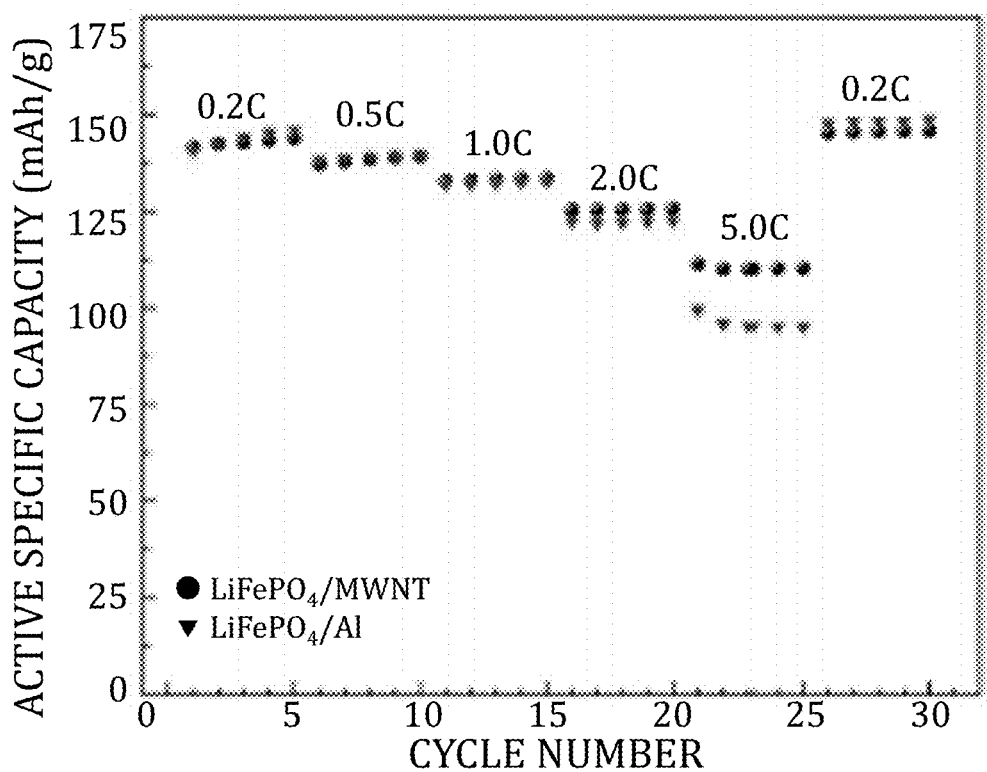
FIGS. 23 and 24 graphically illustrate results from half-cell rate performance studies, one prepared in accordance with embodiments of the present invention and one prepared according to conventional methods, respectively.
Figure 24:
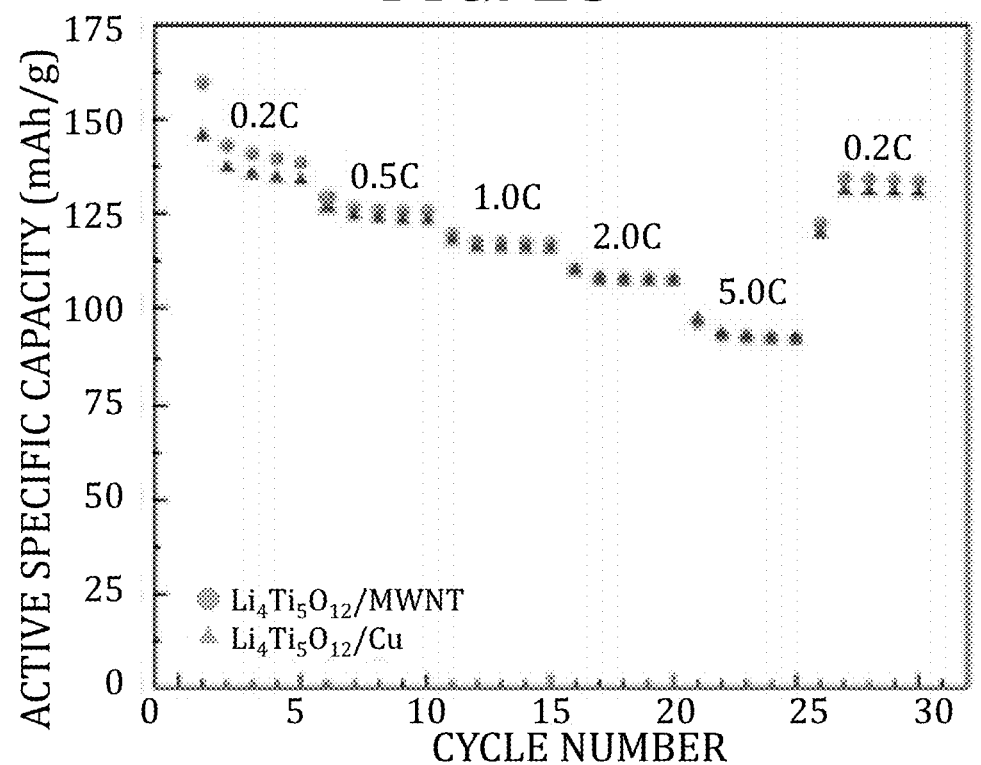

FIGS. 23 and 24 graphically illustrate results from rate studies performed on the same half-cells and reveal an equal or greater performance from the half-cells having MWNT CCs as compared to half-cells having foil-based CCs. In particular, performance at a high rate (for example, 5C) for LiFePO$_4$ on the MWNT CC shows a 14.7% improvement versus the Al-based CC counterpart. Such improvement suggests better interfacial adhesion, as well as better electrolyte accessibility to the active material within the active coating.

Figure 25:
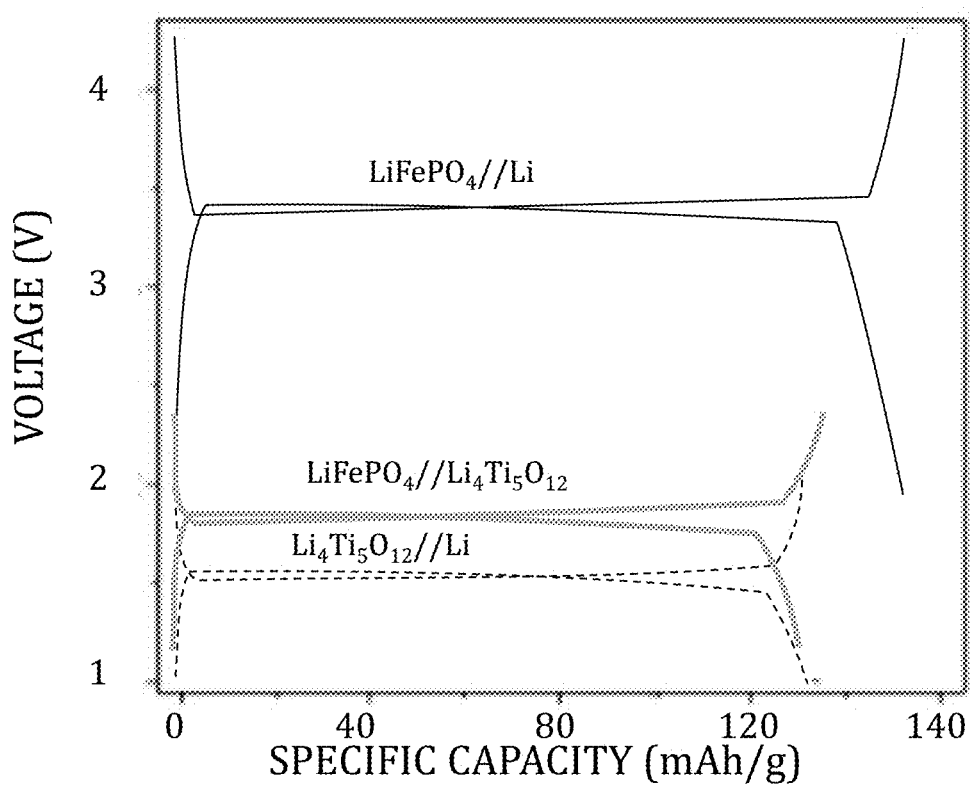
FIG. 25 is a graphical representation of charge and discharge profiles of half- and full-cells having multi-walled carbon nanotube current collectors prepared in accordance with an embodiment of the present invention.
Figure 26:
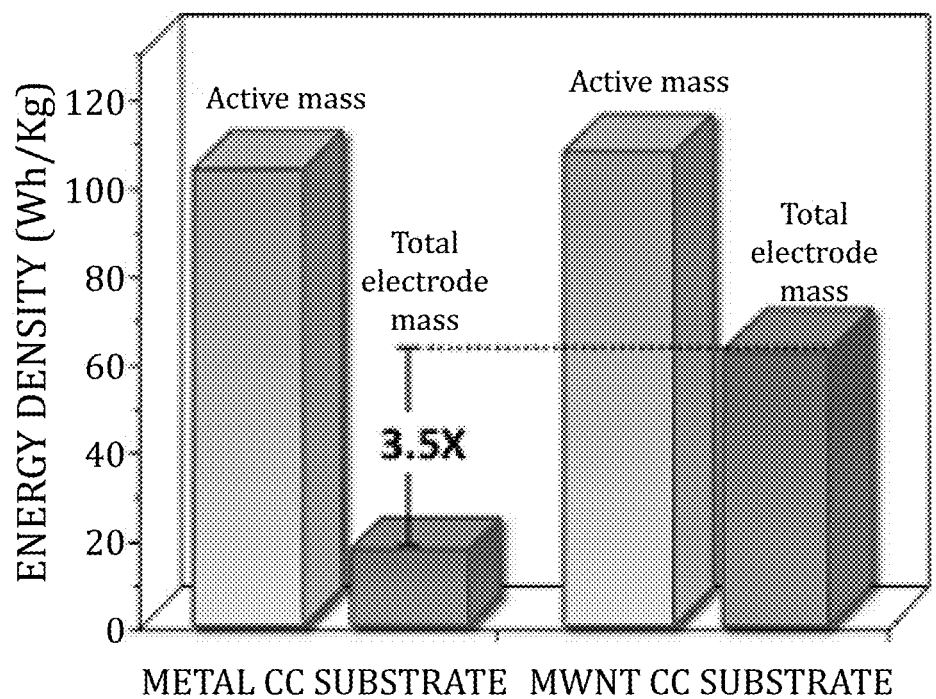
FIG. 26 is a graphical representation of the energy density of a full-cell battery having multi-walled carbon nanotube current collectors prepared in accordance with an embodiment of the present invention and a full-cell battery having conventional foil-based current collectors.

Half- and full-cells were assembled using both MWNT CCs and foil-based CCs. Performance and energy density at a C/5 current rate were compared. All half- and full-cells comprising MWNT CCs exhibited extremely stable charge/discharge profiles (FIG. 25), and the energy densities were comparable to foil-based cells on an active mass basis. However, when considering total electrode mass, full-cells having the MWNT CC rendered a 3.5× enhancement in energy density (FIG. 26) as compared to the full-cell samples having the foil-based CC. Mass distributions of the primary components are shown in Table 2, below, which highlights the mass reduction of the MWNT CCs compared to commercially-available Li-ion batteries. Metal foils contribute an average of 27% to the total weight of commercially-available batteries, which is reduced to 9.3% using MWNT CCs. Further weight reduction (to only 4.8%) may be accomplished by coating active material to both sides of the MWNT mat, as is standard practice in industry.

TABLE 2

|  | Commercial Metal Foil | Single-Sided Coating MWNT | Double-Sided Coating MWNT |
| --- | --- | --- | --- |
| Anode | 31.0% | 36.8% | 38.6% |
| Cathode | 34.0% | 40.9% | 42.9% |
| Separator | 8.0% | 13.0% | 13.7% |
| Aluminum | 8.0% | — | — |
| Copper | 19.0% | — | — |
| MWNT mat | — | 9.3% | 4.8% |

Electrochemical cycling was performed using a series 4000 battery test system (Maccor, Inc., Tulsa, Okla.). LiFePO$_4$ and Li$_4$Ti$_5$O$_{12}$ half-cells were investigated for cycling stability through 100 cycles at a constant C/5 current rate between 2.0 V and 4.3 V versus Li/Li$^+$ and 1.0 V and 2.1 V versus Li/Li$^+$, respectively. The rate studies were carried out in a similar manner, with each half-cell tested for five cycles at the following C-rates: C/5, C/2, 1C, 2C, 5C, and repeat of C/5. All C-rates were calculated with 1C being defined as 170 mA/g and 175 mA/g for LiFePO$_4$ and Li$_4$Ti$_5$O$_{12}$, respectively.

Full-cell electrochemical cycling was carried out in a similar fashion, with LiFePO$_4$ and Li$_4$Ti$_5$O$_{12}$ used as cathode and anode, respectively. These cells were cycled at a constant C/5 current rate (calculated using the active mass of the limiting electrode, Li$_4$Ti$_5$O$_{12}$) between 1.2 V and 2.4 V, with 1C being defined as 175 mA/g.

EXAMPLE 3

In situ durability analysis of full-cells (see Example 2) began with cutting battery components and encapsulating the components between two layers of 75 µm thick Surlyn (GLTE/M, Europack, Inc., Wilmington, Del.). The electrode samples were cut to a size of 3×3 cm$^2$ with electrical lead dimensions of approximately 1×2 cm$^2$. The actual anode capacity/cathode capacity ratio was adjusted to between 0.80 and 0.90 for the Li$_4$Ti$_5$O$_{12}$/LiFePO$_4$ full-cells. A CELGARD 2325 separator was cut to a size of 4×5 cm$^2$. Copper wires were placed in electrical contact with the leads of each electrode sample while a remainder of the copper wires extended externally from the encapsulation layers. Optionally, some copper wires were laminated between two sheets of 75 µm Surlyn using a GBC 9" Personal Desktop Laminator (General Binding Corp., Lake Zurich, Ill.) to prevent electrolyte leakage. A perimeter of each cell was sealed using a ZIPLOCK V151 vacuum sealer system (S.C. Johnson & Son, Inc., Racine, Wis.). Sealing was performed between two non-porous TEFLON sheets (E. I. du Pont de Nemours and Co.) to prevent sticking to the heating element. Using a needle, 0.8 mL of liquid electrolyte (1 M LiPF$_6$ in 1/1 EC/DEC by wt.) was added to each cell while in an argon glovebox. The excess region of the cell was sealed off using the method described above.

Contact between all layers was improved by carefully kneading the fully constructed cell to ensure electrolyte uptake and to remove any bubbles.

Figure 27:
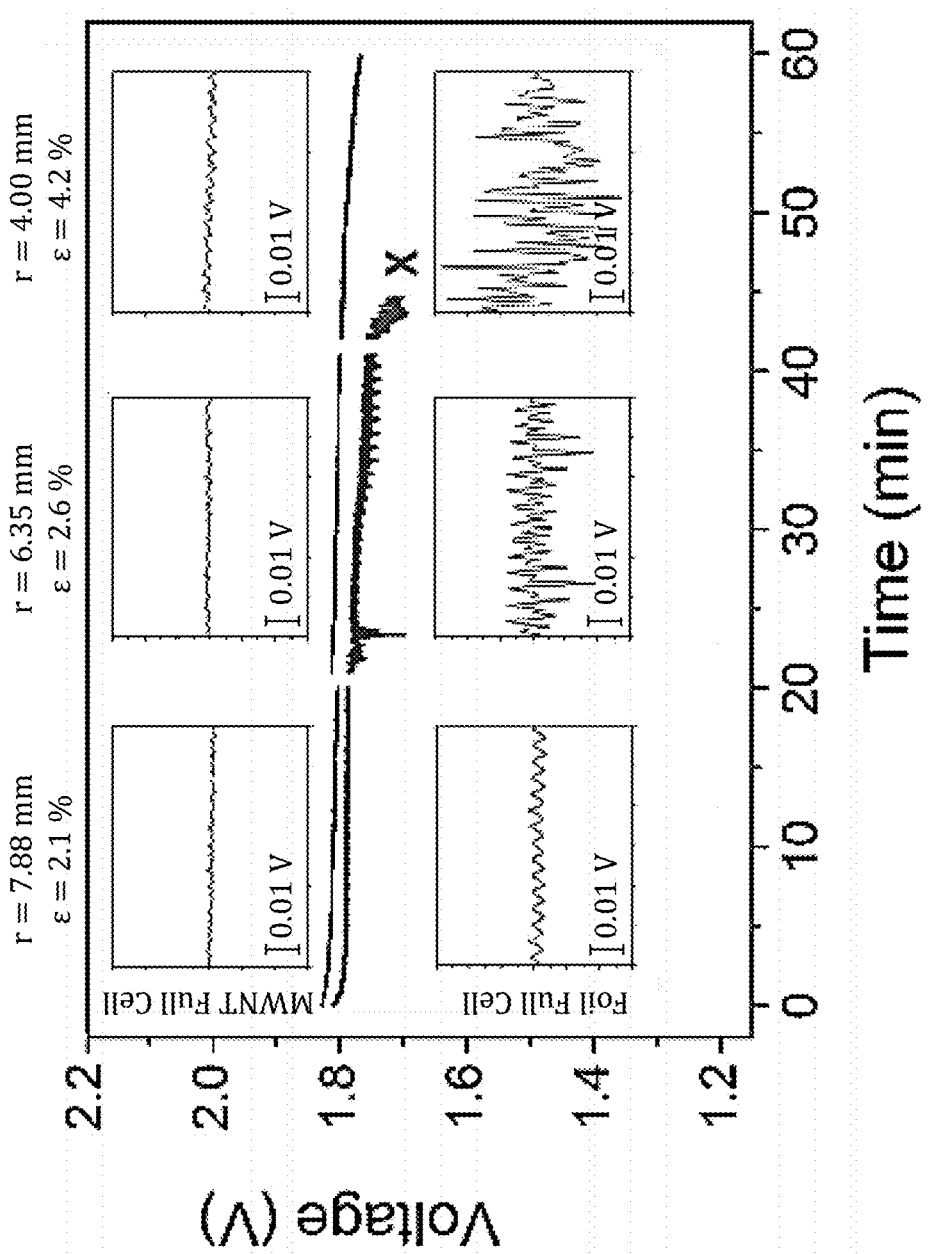
FIG. 27 are graphical representations of the discharge voltages measured during flexibility testing of a cell having a multi-walled carbon nanotube current collectors according to embodiments of the present invention and of a cell having a metal foil current collectors according to conventional methods.

Testing was accomplished using a flex tester according to embodiments of the present invention, as exemplified in FIGS. 12-14. During the course of the testing, the mandrel was rolled at a linear velocity of 10 mm/sec during a discharge at C/5 for cells having MWNT CCs and foil based CCs. FIG. 27 graphically represents such measured discharge voltage, where center traces show 600 roll/unroll cycles and 430 roll/unroll cycles for the MWNT- and foil-based CCs cells (the mandrel was exchanged every 20 min during a single discharge), respectively.

Bending conditions were chosen such that a ranged from 2.1% (r=7.88 mm) to 2.6% (r=6.35 mm) or to 4.2% (r=4.00 mm). Given that the total thickness of each cell was about 335 µm, shifting of the neutral axis could be neglected, and its location was taken to be the middle layer of the cell (i.e., the separator). A pure-bending set-up and linear strain field were assumed for calculations. Cells with dimensions of approximately 12 cm×8 cm were rolled a linear distance of 3 cm at a linear velocity of 10 mm/sec using Motion Planner v. 4.3.2 software (Parker Hannifin, Corp., Rohnert Park, Calif.). Each complete cycle (roll/unroll) took 6 sec for completion.

The electrochemical properties were galvanostatically tested in each cell with potential ranging from 1.2 V to 2.4 V. Each cell was charged in an argon environment to 2.4 V at a C/3 current rate. The bend test was then performed under ambient conditions while each cell was discharged at a C/5 current rate (calculated using the active mass of Li$_4$Ti$_5$O$_{12}$). Every 20 min, the mandrel was replaced with one having a smaller radius.

For better comparison, representative 1.5 min increments from each complete cycle were selected to highlight the amplitude of voltage noise on cells having MWNT CCs or foil-based CCs (illustrated inserts provided in FIG. 27). The cells having foil-based CCs demonstrated cyclical voltage fluctuations at 2.1% strain with a frequency corresponding directly to the periodicity of mechanical disruption. As strain increased, larger and more random voltage fluctuations were observed until the cell having foil-based CCs shorted (at 30 roll/unroll cycles at 4.2% strain), illustrated with an "X" in FIG. 27. Battery failure was attributed to interlayer separation and in-plane shifting. By contrast, the cells having MWNT-based CCs exhibited stable discharge characteristics as strain was increased. Even at 4.2% strain, only minor, cyclical fluctuations (less than about 0.005 V) were observed, and failure did not occur. Improved stability may be attributed to the increased flexibility of the MWNT mat, allowing the cell to readily conform to the mandrel as rolling proceeded. The flexibility may have also resisted layer-to-layer separation, giving rise to superior electromechanical stability.

An ideal flexible power source should experience minimal voltage noise during continuous deformation in order to maintain a steady supply voltage, a point which is especially significant for reliable microsystem performance. To evaluate such voltage noise, strain graphically illustrated in FIG. 27 was analyzed using root mean square error ("RMSE").

Resultant data are presented in Table 3, below. An increase of 0.5% in strain (from 2.1% to 2.6%) of the cell having foil-based CCs exhibited a 4.4-times increase in voltage noise. The mechanical instability of the cell having foil-based CCs translated into a nearly two order of magnitude increase ($10^{-4}$ V to $10^{-2}$ V) in voltage noise when bending strain was increased from 0% to 4.2%. A 14-fold increase in voltage noise was observed when using the cells having foil-based CCs as compared to the cells having MWNT-based CCs.

TABLE 3

| r (mm) | $RMSE_{MWNT}$ (V) | $RMSE_{Foil}$ (V) | $\dfrac{RMSE_{Foil}}{RMSE_{MWNT}}$ |
|---|---|---|---|
| ∞ | 2.51E−04 | 2.00E−04 | 0.80 |
| 7.88 | 4.88E−04 | 1.26E−03 | 2.58 |
| 6.35 | 5.09E−04 | 5.55E−03 | 10.90 |
| 4.00 | 8.40E−04 | 1.18E−02 | 14.05 |

EXAMPLE 4

Figure 28:
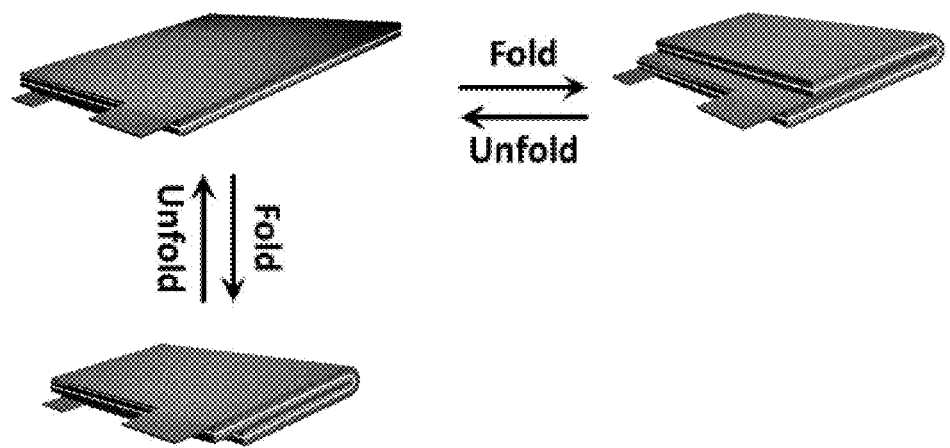
FIG. 28 is a perspective view of a sequential folding and unfolding process used for evaluating conventional cells and cells prepared according to embodiments of the present invention.

Stability of cells prepared in the manner described in Example 3 was evaluated by repeatedly folding and creasing each cell along a selected fold line. The fold line was selected to correspond to an extreme amount of mechanical stress and strain at the crease, which is illustrated in FIG. 28. Each cell was sequentially folded about the same line, every 20 sec, to mimic a scenario of severe mechanical deformation.

Figure 29:
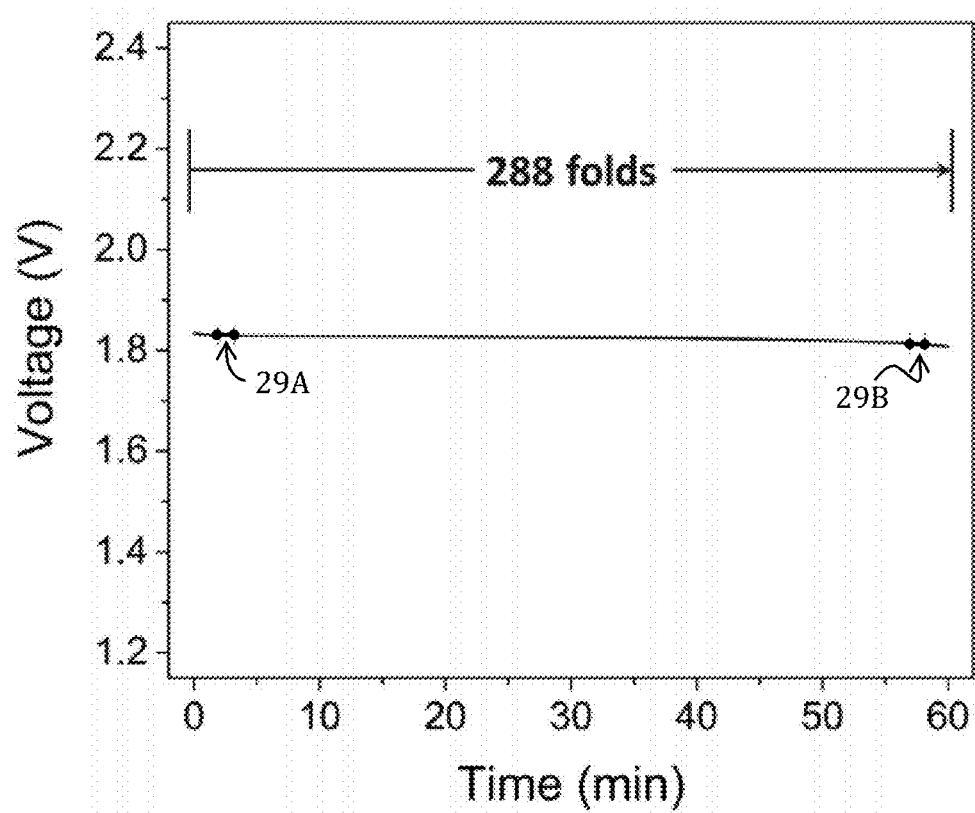
FIG. 29 is a graphical representation of discharge voltage of a flex cell having multi-walled carbon nanotube current collectors according to embodiments of the present invention during the folding and unfolding process of FIG. 28.
Figure 29A:
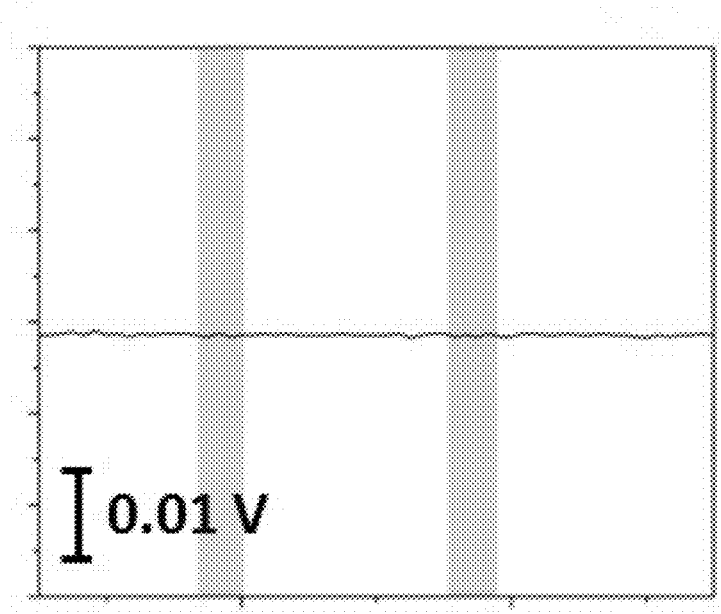
FIGS. 29A and 29B are enlargements of respectively enclosed portions in FIG. 29.
Figure 29B:
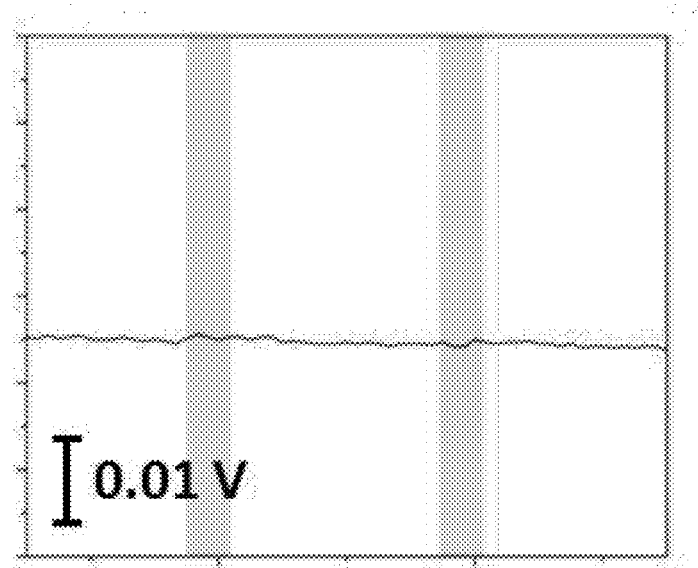

FIG. 29 illustrates the discharge voltage of the full-cells having MWNT-based CCs during a ±180° fold. Performance of the cells having MWNT-based CCs was uncompromised for all 288 180° folds. Two regions used for measuring voltage (indicated as 29A and 29B in FIG. 29) are enlarged to show that voltage is unchanged from the beginning to the end of the test. The cells having MWNT-based CCs yielded a remarkable ability to accommodate strains of repeated folding while maintaining excellent adhesion between both the active material/CC and interlayer interfaces.

Figure 30:
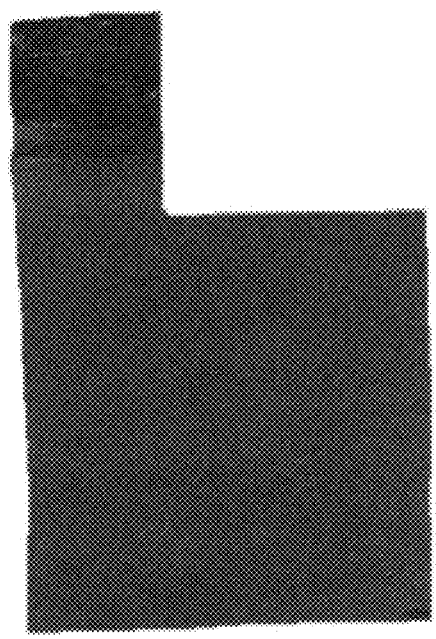
FIGS. 30 and 31 are photographs of electrodes prepared according to embodiments of the present invention with $LiFePO_4$ or $Li_4Ti_5O_{12}$, respectively, and having multi-walled carbon nanotube current collectors after completion of the folding and unfolding test of FIGS. 28 and 29.
Figure 31:
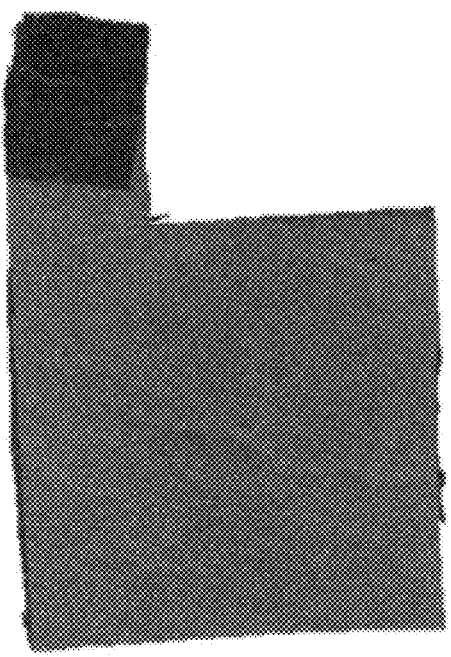

FIGS. 30 and 31 are photographs of LiFePO$_4$/MWNT and Li$_4$Ti$_5$O$_{12}$/MWNT electrodes, respectively, after the folding test. These photographs demonstrate little-to-no creasing or folding damage to the CCs.

Figure 32:
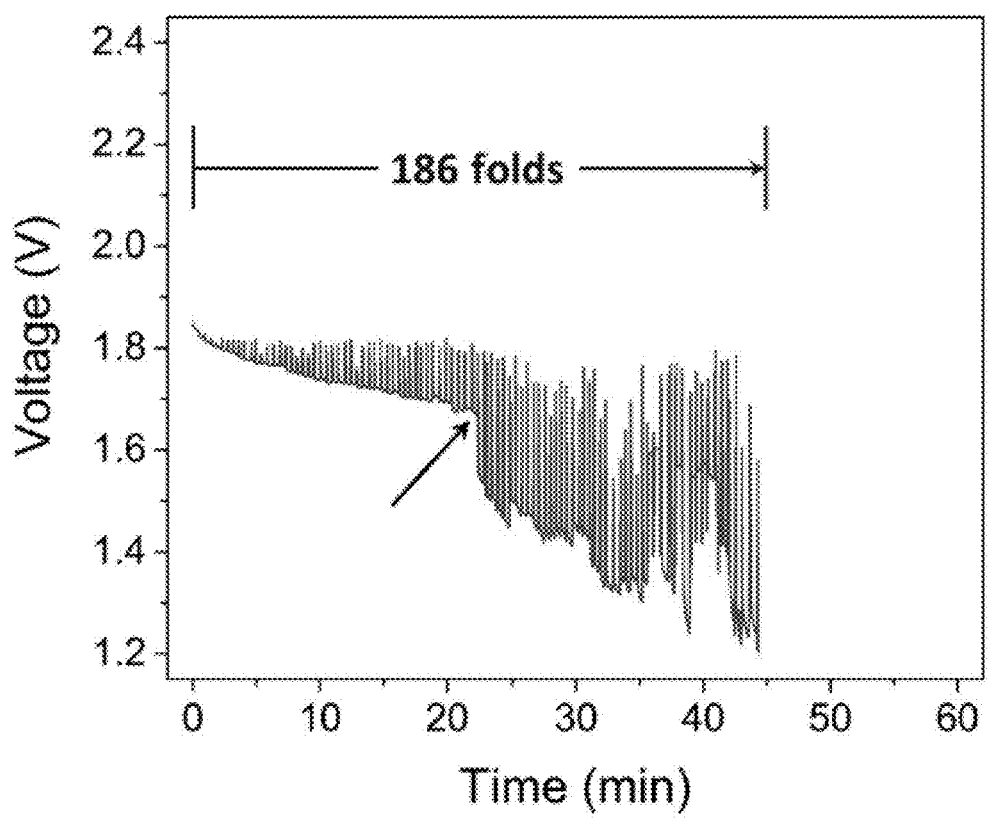
FIG. 32 is a graphical representation of the discharge voltage change of a cell having conventional, foil-based current collectors during the folding and unfolding process of FIGS. 28 and 29.

By contrast, FIG. 32 illustrates the discharge voltage of those full-cells having foil-based CCs through the same ±180° folding test. Severe and increasing voltage instability occurred as the number of folds increased. Such instability is believed to be due to accumulated damage caused by the mechanical deformation of the cells having foil-based CCs.

Figure 33:
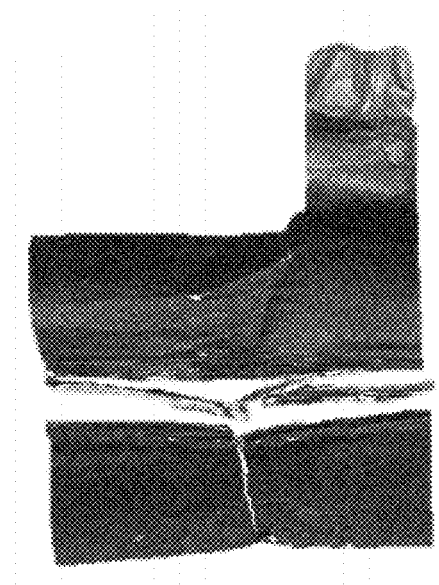
FIGS. 33 and 34 are photographs of electrodes having a conventional, foil based current collectors after completion of the folding and unfolding test of FIGS. 28 and 29.
Figure 34:
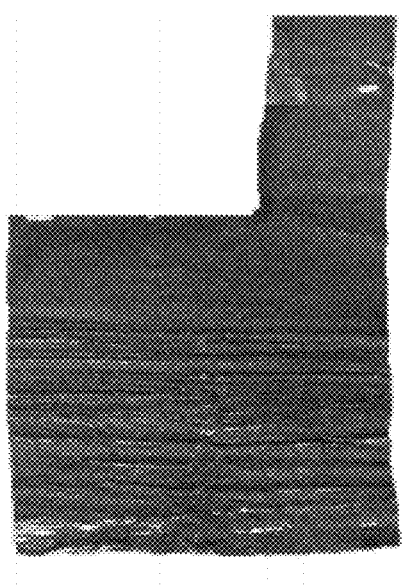

FIGS. 33 and 34 are photographs of the LiFePO$_4$/Al and Li$_4$Ti$_5$O$_{12}$/Cu electrodes, respectively. While the Cu-based electrode (FIG. 34) showed expansive buckling emanating from the fold region, the Al-based electrode (FIG. 33) catastrophically fractured after only 94 folds (indicated with an arrow in FIG. 32), which caused the magnitude of voltage spikes to severely increase. Ultimately the foil-based full-cell had complete performance failure after 186 folds.

Failure of the cells having foil-based CCs resulted from either severe buckling or fracturing along the fold line due to permanent plastic deformation, fatigue, and catastrophic failure of the metal foil during testing. Although failure from tearing is easy to conceptualize, buckling is also highly detrimental to performance as it decreases compliancy, exacerbates interlayer separation, and leads to severe voltage spikes and capacity degradation. On the other hand, the cells having MWNT CCs (FIGS. 30 and 31) remained intact after the fold test, exhibiting little sign of permanent deformation, crease memory, or active material delamination.

EXAMPLE 5

Figure 35:
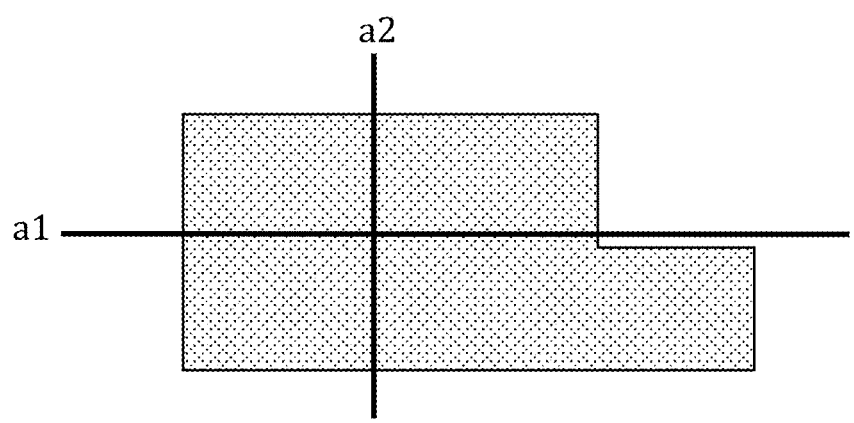
FIG. 35 is a top view of a schematic illustration of a folding process used to evaluating conventional cells and cells prepared according to embodiments of the present invention.

The stability of cells prepared in the manner described in Example 3 was evaluated by repeatedly folding each cell along two, perpendicular axes. As shown in FIG. 35, a first fold (a1) was positioned along a longitudinal axis while a second fold (a2) was positioned along a transverse axis. The cells were creased along each fold line. Positioning of the folds was selected to correspond to an extreme amount of mechanical stress and strain at the crease.

Figure 36:
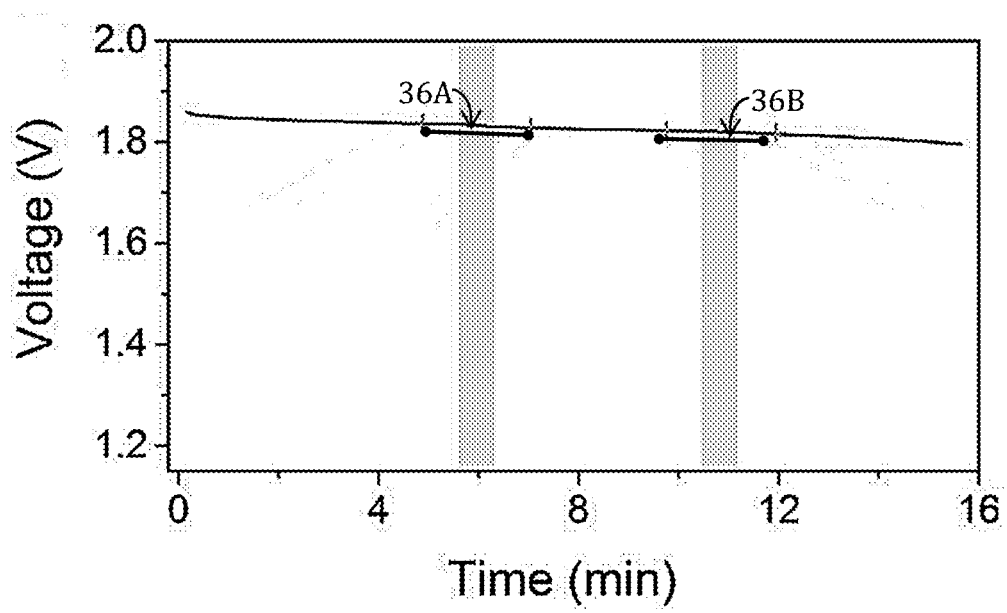
FIGS. 36 and 37 are graphical representation of discharge voltage of cells having multi-walled carbon nanotube and of cells having conventional, foil-based current collectors, respectively, during the folding test procedure of FIG. 35.
Figures 36A, 36B:
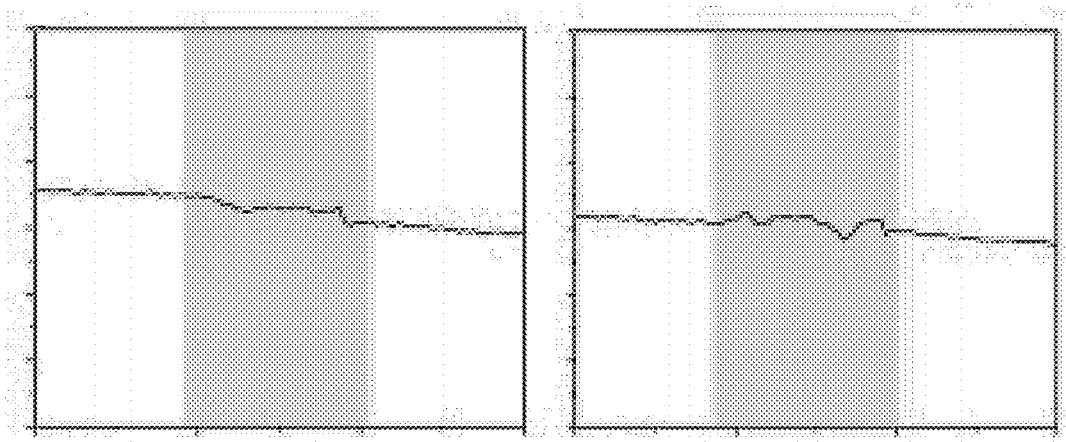
Figure 37:
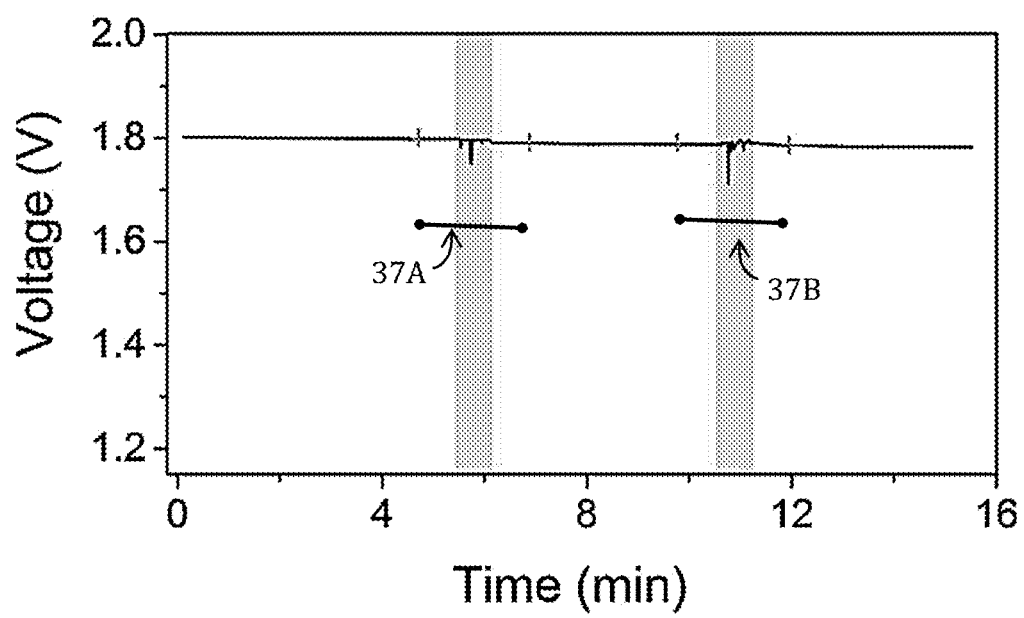
Figures 37A, 37B:
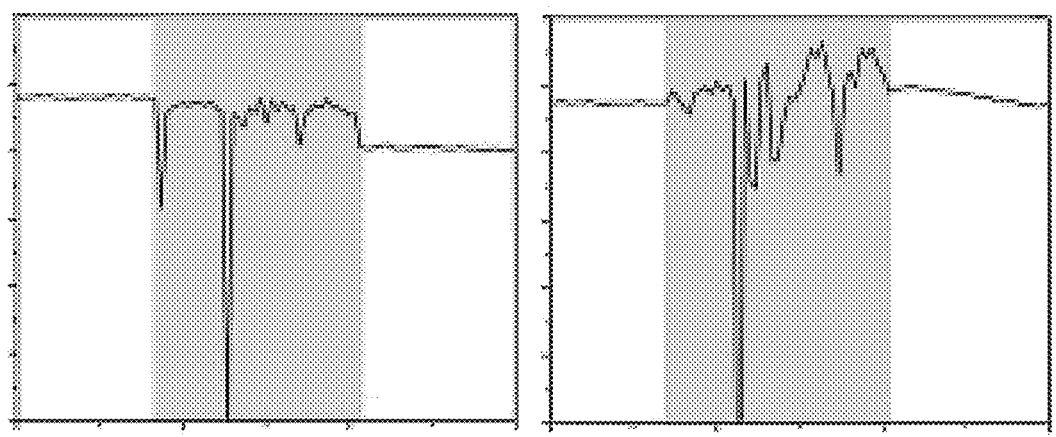

The discharge voltage of the cells having MWNT CCs (graphically illustrated in FIG. 36) remained nearly unaffected throughout the fold cycles, whereas the cells having foil-based CCs (graphically illustrated in FIG. 37) experienced appreciable voltage fluctuations during the same mechanical deformation. After several fold cycles, macroscopic, irreversible buckling was observed along both axes in the cells having foil-based CCs. Little-to-no folding-induced damage or crease memory was observed in the cells having MWNT CCs. Regions 36A, 36B, 37A, and 37B of FIGS. 36 and 37, respectively, corresponding to times of active folding, are enlarged to demonstrate differences in performance.

Resultantly, cells having MWNT CCs provide particular advantage in origami-based applications.

EXAMPLE 6

Figure 38:
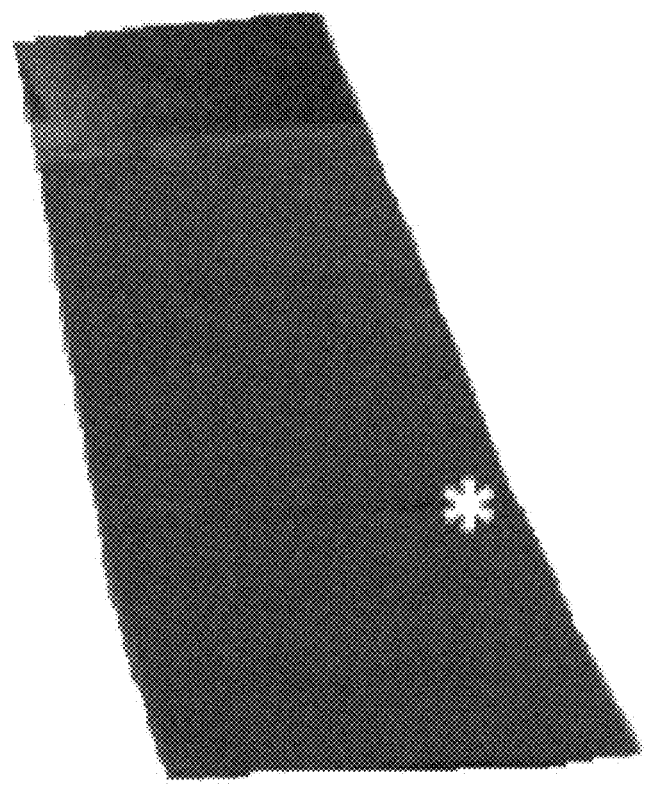
FIGS. 38 and 39 are photographs of an electrode having $LiFePO_4$ on a multi-walled carbon nanotube current collector prepared according to an embodiment of the present invention, and an electrode having $LiFePO_4$ on a conventional, aluminum-foil current collector, respectively.
Figure 39:
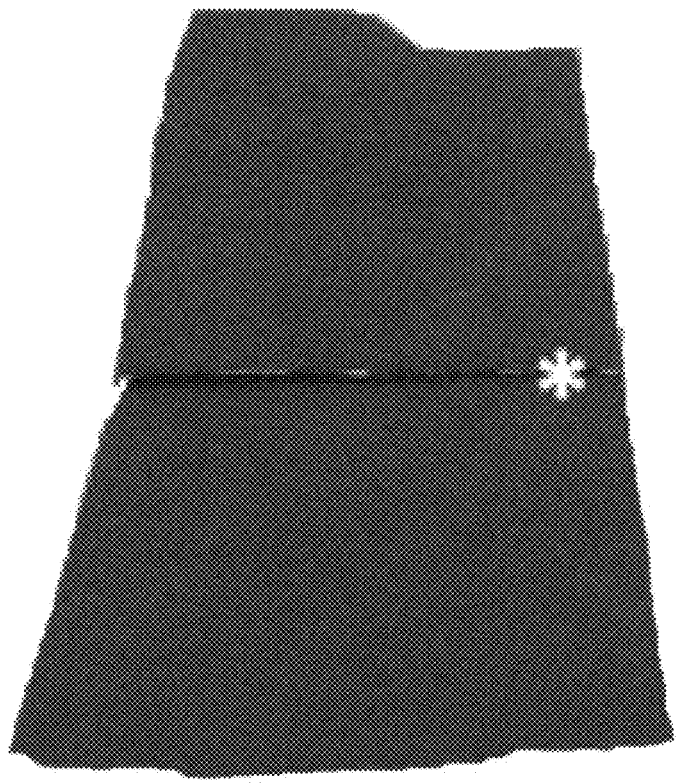

A MWNT CC having pristine LiFePO$_4$ active coatings (hereafter, LiFePO$_4$/MWNT) was subjected to 50 cycles of the ±180° folding, which is illustrated in FIG. 38. An Al-based CC having a LiFePO$_4$ active coating was subjected to only three folding iterations, which are illustrated in FIG. 39. A macroscale folding line was observed in both CCs; however, the folding line is much more pronounced in the Al-based CC (FIG. 39). Cracking of the Al foil substrate began only after two cycles off 180° folding. The MWNT CC (FIG. 38), on the other hand, showed only slight cracking in the active coating while the LiFePO$_4$/MWNT remained intact (likely due to interconnected network of long MWNTs).

Figure 38A:
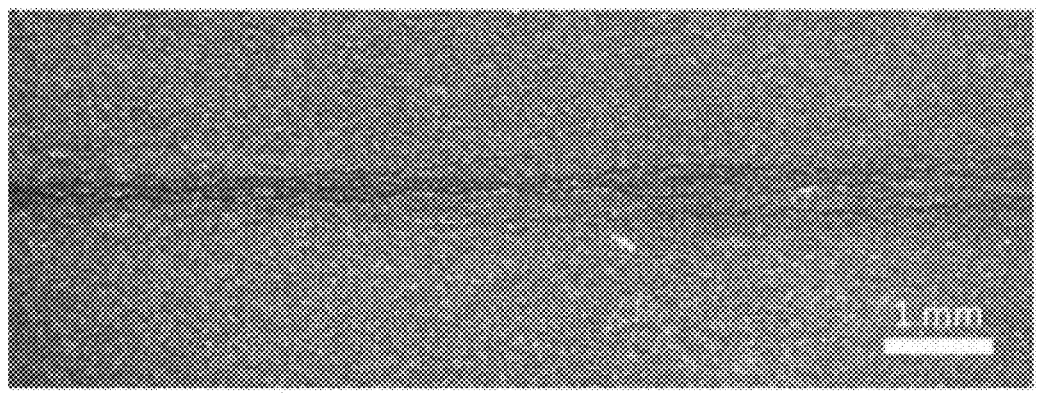
FIGS. 38A and 39A are enlargements of portions indicated by an asterisk in FIGS. 38 and 39, respectively.
Figure 39A:
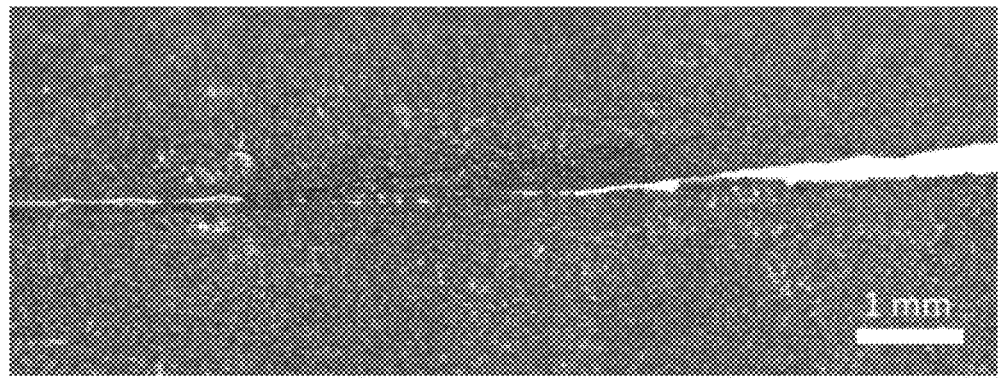

FIGS. 38A and 39A are magnified images of the folding line of the MWNT and Al-based electrodes, respectively.

Figure 38B:
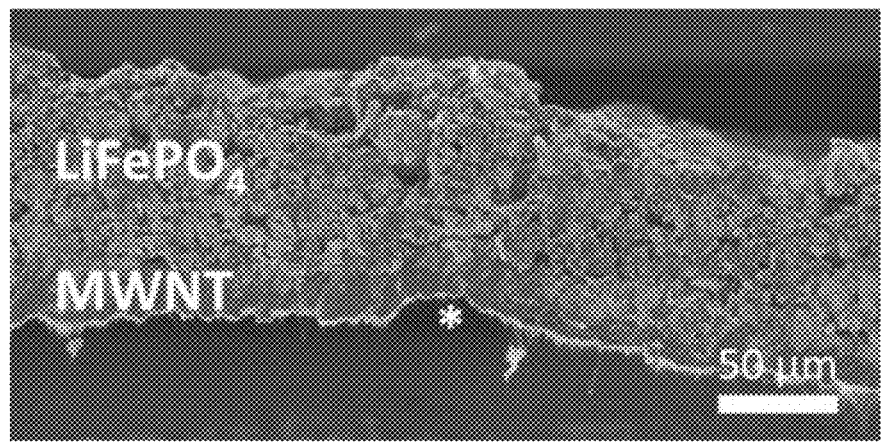
FIGS. 38B and 39B are scanning electron microscopy images of fold lines, indicated by an asterisk, of the cells of FIGS. 38 and 39, respectively, acquired after cryo-fracturing in a direction perpendicular to the fold line.
Figure 39B:
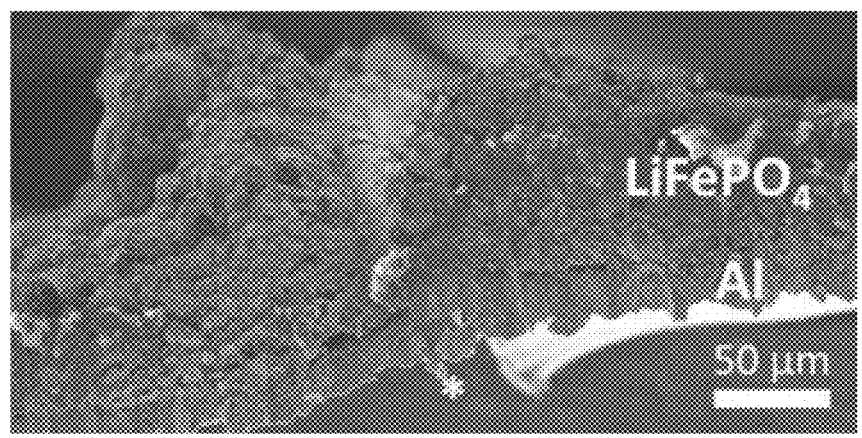

To complement the macroscopic observations, both the MWNT and Al-based electrodes were cryo-fractured in a direction perpendicular to the folding line for cross-sectional SEM examination Resulting images are shown in FIGS. 38B and 39B. The creased region of the MWNT-based electrode (FIG. 38B) did not appear to be significantly affected by folding, likely due to the interfacial adhesion between the MWNTs and the active coating. The Al-based electrode (FIG. 39B), on the other hand, demonstrated visible signs of delamination and cracking. Therefore, the observed, folding-induced voltage fluctuations in the cell having foil-based electrodes had likely arisen from a combination of active coating detachment, CC damage, and layer separation.

EXAMPLE 7

Figure 40:
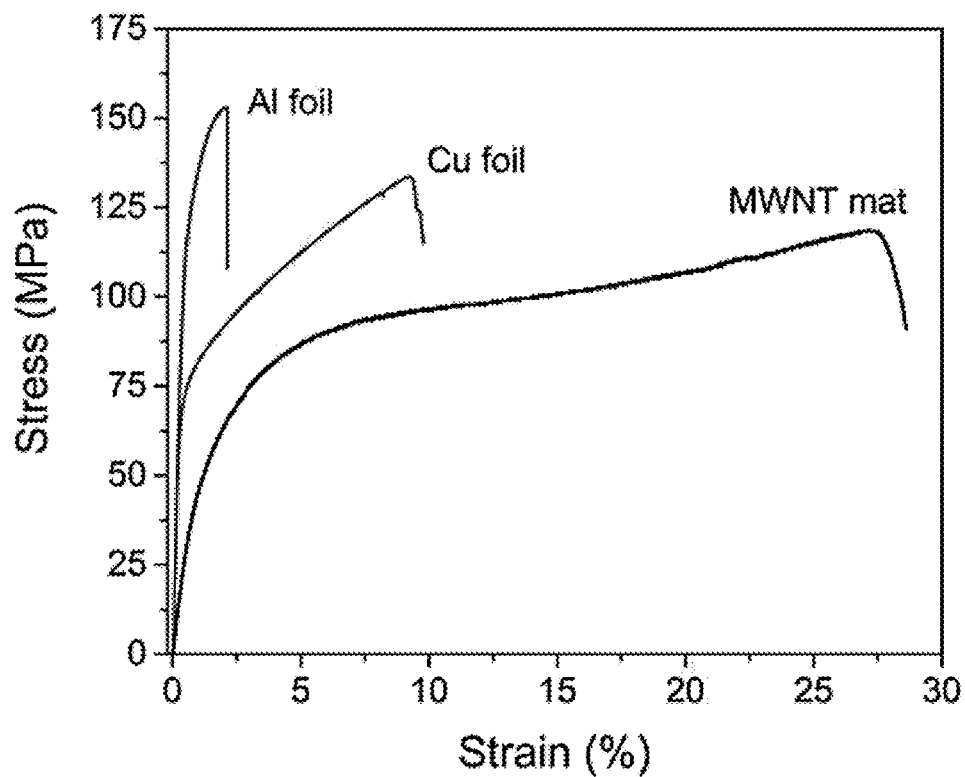
FIG. 40 is a graphical representation of the mechanical behavior of current collectors comprising aluminum-foil, copper-foil, and multi-walled carbon nanotube mat (the latter being according to an embodiment of the present invention) during uni-axial tensile testing.

The mechanical behavior of CCs was assessed by uniaxial tensile testing. Results of the testing are graphically illustrated in FIG. 40. The MWNT CCs exhibited a maximum strain at failure of 28%, which far exceeded the maximum strain of the Al-based CCs (2%) and the Cu-based CCs (9%). The ultimate tensile strength of the MWNT mat was 118 MPa as compared to 153 MPa and 133 MPa for Al foil and Cu foil, respectively.

Figure 41:
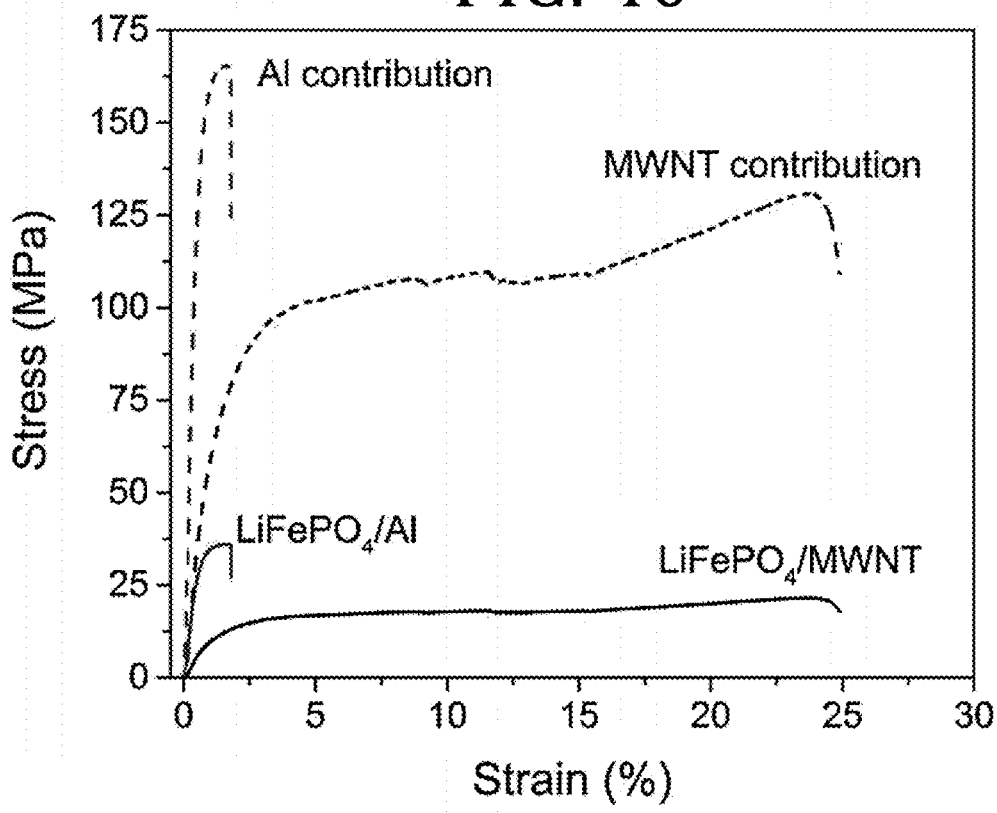
FIGS. 41 and 42 are graphical representations of mechanical behavior of aluminum foil, copper foil, and multi-walled carbon nanotube current collectors with active material coatings thereon.
Figure 42:
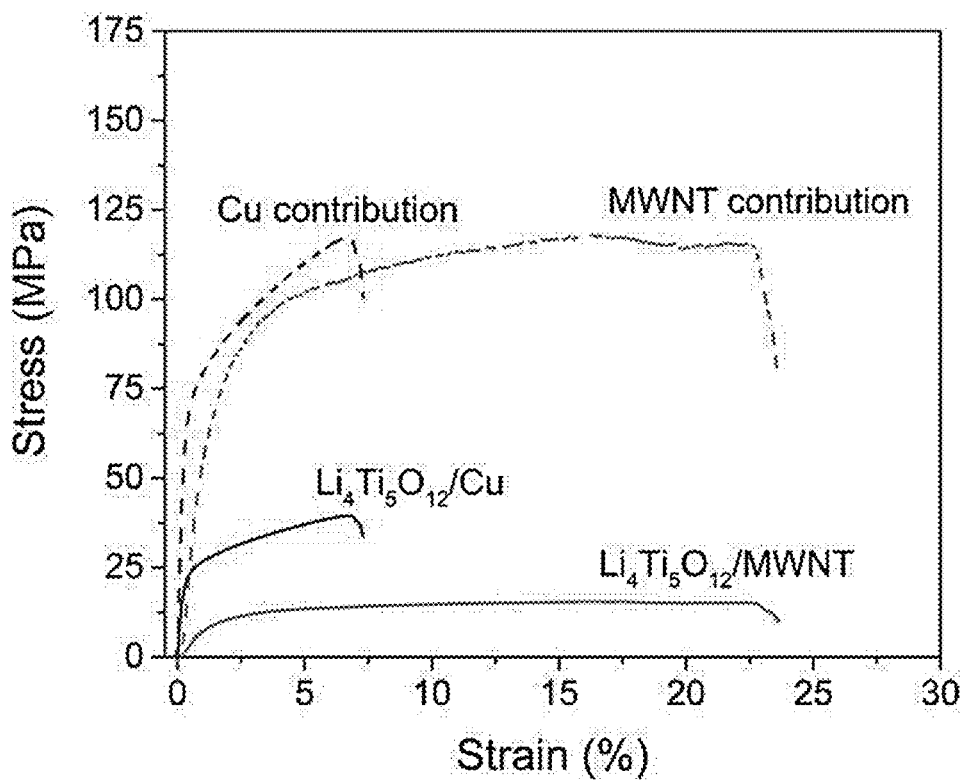

The MWNT mat, therefore, should have sufficient tensile strength to act as a mechanical support for battery electrodes. The increase in maximum strain should yield improved performance under flex, bend, or crease testing. FIGS. 41 and 42 illustrate that the addition of the active coating did not significantly alter the force-displacement behavior of the MWNT mat.

EXAMPLE 8

Composite electrodes according to various embodiments of the present invention were prepared with $Li_4Ti_5O_{12}$, $LiFePO_4$, and $LiCoO_2$ active material powders purchased from the MTI Corp. CNFs (PYROGRAF-III PR-19-HT) were supplied by Applied Sciences Inc. (Cedarville, Ohio). Graphite was purchased through Asbury Graphite Mills (HPM 850 powder) and Super P-Li carbon black was from TIMCAL Graphite & Carbon. KYNAR HSV 900 PVDF was provided from Arkema Inc. (King of Prussia, Pa.). NMP was purchased through Sigma Aldrich Co. Ratios of these materials for various samples are provided in Table 4, below.

For composite electrodes having an active material, a conductive additive, and a binder, each batch included 100 mg of the selected active material and 5 mL solvent (conductive additive and binder were scaled according to the ratios in Table 4). The procedure for each composite electrode included first dissolving the binder in NMP. Next, CNFs were added and probe sonicated for 1 min at 17% amplitude using a Sonics Vibra-Cell VCX 750 Probe Sonicator (Sonics and Materials, Inc., Newton, Conn.) with a 0.25 in microtip. The active material was then added, and the mixture was bath sonicated for 10 min using a 2510 bath sonicator (Branson Ultrasonics Inc., Danbury, Conn.). The suspensions were shaken by hand several times during the sonication period for more thorough mixing. Finally, the suspension was transferred to a 6 cm diameter PTFE dish and dried at 90° C. Once the solvent had evaporated, the suspensions were dried under vacuum at 120° C. overnight to yield composite electrodes.

Samples (9.5 mm diameter discs) were punched from the composite electrodes with typical weights of $Li_4Ti_5O_{12}$, $LiFePO_4$, and $LiCoO_2$ comprising each sample ranging from 1.5 mg to 3.0 mg. These weights corresponded to sample thicknesses ranging between 100 μm and 200 μm, as measured by a digital micrometer (Mitutoyo America Corp.). Half-cells were assembled versus lithium foil under argon environment (less than 1 ppm $H_2O$ and $O_2$) as a full-cell having the 2325 coin cell configuration illustrated in FIG. 21. A porous polymer membrane (CELGARD 2325) soaked in a liquid electrolyte solution of 1 M $LiPF_6$ in 1/1 w/w EC/DEC (Novolyte Technologies) was used as the separator. After fabrication, the coin cells were allowed to age at least 8 hr before electrochemical cycling to allow for homogeneous electrolyte wetting.

EXAMPLE 9

The electrochemical performances of composite electrode compositions selected from Table 4 were studied and evaluated. For example, electrochemical performance of four electrodes comprising $Li_4Ti_5O_{12}$/CNF/PVDF (Sample Nos. A, B, D, and F) are graphically illustrated in FIG. 43, where square data points correspond to Sample No. A, triangular data points correspond to Sample No. D, circular data points correspond to Sample No. B, and star-shaped data points correspond to Sample No. F. All electrodes exhibited reasonably low C-rate (C/5) performances (greater than or equal to 129 mAh/g) based on $Li_4Ti_5O_{12}$ active mass; however, a sharp drop off in high C-rate (2C and 5C) performance with increased polymer loading was noted. Namely, electrodes including Sample Nos. A and D (50 wt % and 40 wt % polymer, respectively) showed decaying cycle performance at high C-rate when compared to samples composed of 20 wt % polymer or less (e.g., Sample Nos. B and F).

All electrochemical cycling was performed using a Maccor series 4000 battery test system (Maccor, Inc.). $LiFePO_4$, $LiCoO_2$, $Li_4Ti_5O_{12}$, and CNFs were investigated for cycling stability at a constant C/5 current rate between 2.0 V and 4.3 V, between 3.0 V and 4.2 V, between 1.0 V and 2.1 V, and between 0.01 V vs. 3.0 V Li/Li$^+$, respectively. Rate studies were carried out in a similar manner, with each half-cell tested for five cycles at C/5, C/2, 1C, 2C, 5C, and C/5 for all active materials. All C-rates were calculated with 1C being defined as 170 mA/g, 155 mA/g, 175 mA/g, and 372 mA/g for $LiFePO_4$, $LiCoO_2$, $Li_4Ti_5O_{12}$, and CNFs, respectively.

Figure 44:
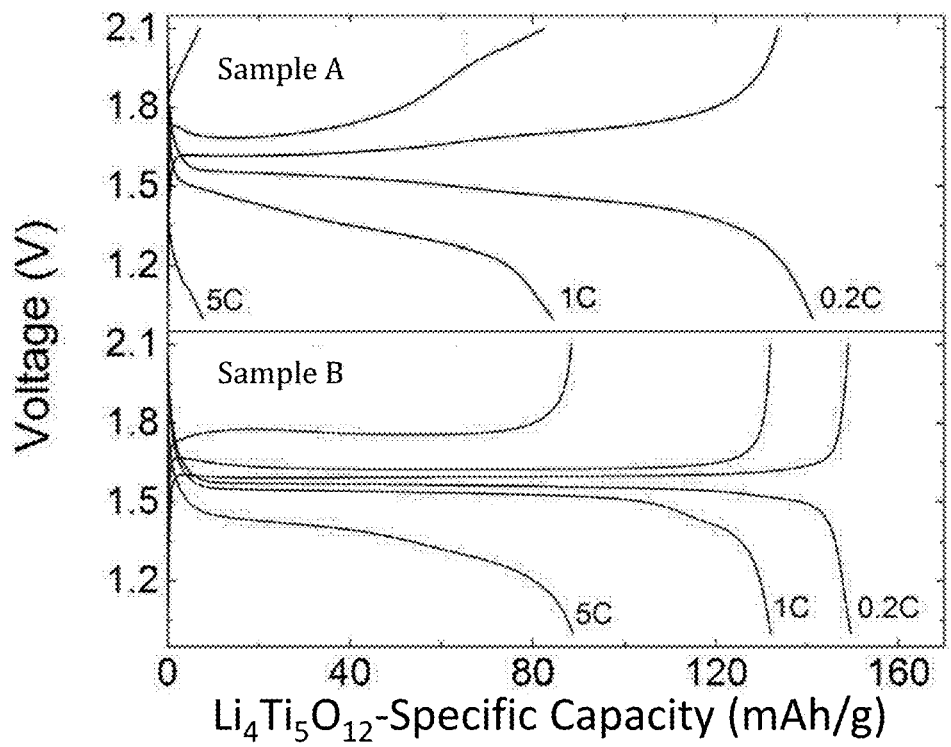
FIG. 44 is a graphical representation of an effect of binder loading on charge and discharge profiles of $Li_4Ti_5O_{12}$ composite electrodes prepared in accordance with embodiments of the present invention.

FIG. 44 graphically illustrates the effect of binder loading on charge/discharge profiles. While composite electrodes comprising Sample No. A (top portion of FIG. 44) achieved an expected capacity of 141 mAh/g at C/5, the high binder content had a detrimental effect on high C-rate performance (i.e., 9 mAh/g at 5C). Additionally, the charge/discharge plateaus were not flat at any of the tested current rates for composite electrodes comprising Sample No. A, indicating significant ohmic loss and poor reaction kinetics with increasing current rate. Composite electrodes comprising Sample No. B (bottom portion of FIG. 44), on the other hand, displayed stable and flat charge/discharge plateaus with excellent capacities of 150 mAh/g and 89 mAh/g at C/5 and 5C, respectively.

TABLE 4

| Sample No. | Composition | Ratio[a] | ρ [g/cm$^3$] | σ[b] [S/cm] | TS[c] [MPa] | C/5 Capacity [mAh/g] | 5 C Capacity [mAh/g] |
|---|---|---|---|---|---|---|---|
| A | $Li_4Ti_5O_{12}$/CNF/PVDF | 25/25/50 | 0.97 | 10.50 | 12.7 | 141 | 8 |
| B | $Li_4Ti_5O_{12}$/CNF/PVDF | 40/40/20 | 0.61 | 10.13 | 2.5 | 150 | 89 |
| C | $Li_4Ti_5O_{12}$/CNF/PVDF | 40/30/30 | 0.75 | 8.32 | 2.5 | 130 | 77 |
| D | $Li_4Ti_5O_{12}$/CNF/PVDF | 40/20/40 | 0.80 | 7.17 | 5.8 | 139 | 37 |
| E | $Li_4Ti_5O_{12}$/CNF/PVDF | 50/25/25 | 0.76 | 6.25 | 2.2 | 125 | 73 |
| F | $Li_4Ti_5O_{12}$/CNF/PVDF | 67/17/17 | 0.88 | 3.82 | 1.1 | 129 | 73 |
| G | $Li_4Ti_5O_{12}$/Graphite/PVDF | 40/40/20 | 1.01 | 1.34 | 4.3 | 123 | 1 |
| H | $Li_4Ti_5O_{12}$/CB[d]/PVDF | 40/40/20 | 0.82 | Brittle[e] | Brittle[e] | 170 | 64 |
| I | $LiCoO_2$/CNF/PVDF | 40/40/20 | 0.73 | 10.43 | 2.1 | 137 | 80 |
| J | $LiFePO_4$/CNF/PVDF | 40/40/20 | 0.66 | 10.68 | 2.2 | 156 | 106 |

TABLE 4-continued

| Sample No. | Composition | Ratio[a] | ρ [g/cm³] | σ[b] [S/cm] | TS[c] [MPa] | C/5 Capacity [mAh/g] | 5 C Capacity [mAh/g] |
|---|---|---|---|---|---|---|---|
| K | CNF/PVDF | 50/50 | 0.94 | 12.40 | 14.8 | 115 | — |
| L | CNF/PVDF | 67/33 | 0.55 | 14.28 | 4.7 | 250 | — |

Where a) sample ratios were by wt %, b) four-point probe electrical conductivity, c) tensile strength at failure, d) carbon black, and e) the sample was too brittle to measure electrical conductivity or mechanical properties.

Electrochemical Impedance Spectroscopy ("EIS") was used to investigate losses affecting electrode performance and were conducted in a three-electrode split cell (MTI Corp.) with Li foil as the counter and reference electrodes. An area of the working electrodes (i.e., $Li_4Ti_5O_{12}$ composites) was 1.6 cm². The liquid electrolyte was the same as the liquid electrolyte used in the cycling experiments.

Measurements were performed with a Gamry Reference 600 Potentiosat/Galvanostat/ZRA (Gamry Instruments, Philadelphia, Pa.) at open circuit potential by applying an AC amplitude of 10 mV over a frequency ranging from 50 mHz to 300 kHz at room temperature. Prior to performing the EIS measurements, the electrodes were subjected to one discharge/charge cycle at C/5 between 1.0 V and 2.1 V to activate the electrode/electrolyte interface, followed by a discharge cycle to 50% depth-of-discharge. The samples were then allowed to equilibrate for 2 hr before the EIS measurements were acquired to minimize the drift in open circuit voltage. A stable open circuit voltage was typically attained at 1.58 V.

Curve fitting of Nyquist plots was used for quantitative analysis of the variation in impedance between the composites. An equivalent circuit diagram illustrating the investigative process is shown in FIG. 47, and the data is provided, below, in Table 5.

Figure 45:
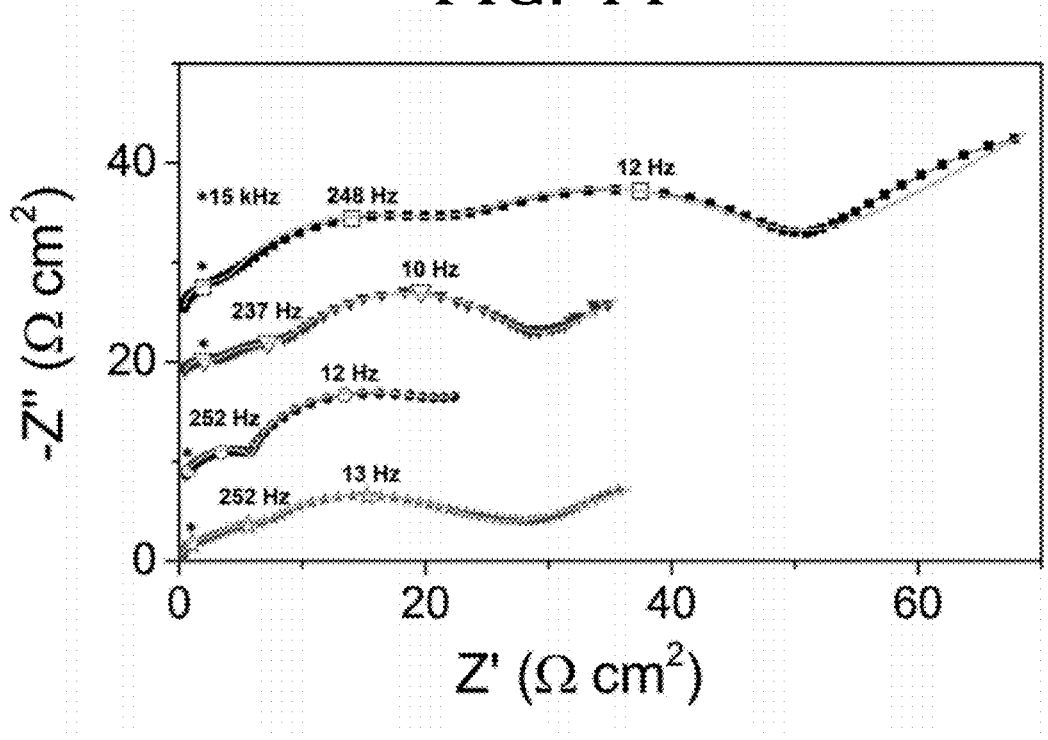
FIG. 45 is a graphical representation of Nyquist plots for $Li_4Ti_5O_{12}$ composite electrodes prepared in accordance with embodiments of the present invention.

FIG. 45 graphically represents Nyquist plots for $Li_4Ti_5O_{12}$ composite electrodes comprising Sample Nos. A, B, D, and F. Square data points correspond to Sample No. A, triangular data points correspond to Sample No. D, circular data points correspond to Sample No. B, star-shaped data points correspond to Sample No. F, and the solid line corresponds to the simulation results Simulations were carried out using eChem Analyst software (Gamry Instruments), wherein equivalent circuits were designed in the software and a simplex method was applied to fit the parameters. The curves for Samples A and B show several characteristic features, beginning with a high frequency intercept (Rs), located near the origin because the solution resistance between the working and reference electrodes is compensated by the three-electrode set-up. Three depressed semicircles were observed throughout the frequency regime for each composite. A first semicircle (Rh) at 15 kHz represents a Schottky barrier at the CNF/active material interface; a second semicircle ($R_m$) at 252 Hz represents the contact impedance between the stainless steel testing platform and the composite electrode. A three-fold increase in areal resistance was observed in coin cells having composite electrodes comprising Sample No. A over Sample No. B for both Rh (3.06 Ωcm² vs. 0.99 Ωcm²) and $R_m$ (16.67 Ωcm² vs. 5.18 Ωcm²), which indicated sluggish electron transfer reactions at the surface of the electrode and poor electronic conductivity during Li⁺ insertion, respectively.

Figure 47:
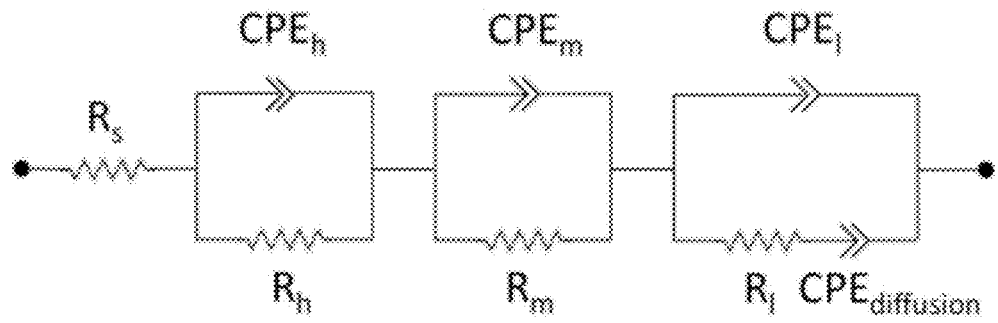
FIG. 47 is an equivalent circuit diagram of a setup used for quantitative analysis of variation in impedance of $Li_4Ti_5O_{12}$ composite electrodes prepared in accordance with embodiments of the present invention.

Impedance spectra were fitted to the circuit illustrated in FIG. 47, where the true capacitance was replaced with a constant phase element ("CPE") to better represent a non-homogenous nature of the porous composite samples. Furthermore, the CPE has replaced the common Warburg element in the above model to more accurately represent the finite diffusion process.

The increased impedance values in composite electrodes comprising Sample No. A vs. Sample No. B were consistent with the electrochemical data in FIG. 45.

Referring still to FIG. 45, a third semicircle ($R_1$) at 12 Hz represents the charge transfer process as Li⁺ migrates into the active material through the rock-salt shell and ultimately into the spinel core structure. Because this reflects an intrinsic property of $Li_4Ti_5O_{12}$, this response was held constant (about 18 Ωcm²) for all sample compositions provided in Table 4.

TABLE 5

| | | Sample No. | | | |
|---|---|---|---|---|---|
| | | A | B | D | F |
| $Li_4Ti_5O_{12}$/CNF/PVDF Ratio | Representation | 25/25/50 | 40/40/20 | 40/20/40 | 67/17/17 |
| $R_s$ (Ωcm²) | Ohmic resistance of liquid electrolyte | 0.41 ± 0.01 | 0.63 ± 0.02 | 0.45 ± 0.02 | 0.24 ± 0.01 |
| $R_h$ (Ωcm²) | Schottky barrier resistance | 3.06 ± 0.43 | 0.99 ± 0.15 | 2.41 ± 0.37 | 2.10 ± 0.26 |
| $R_m$ (Ωcm²) | Contact resistance | 16.67 ± 1.06 | 5.18 ± 0.58 | 9.14 ± 1.20 | 7.84 ± 0.87 |
| $R_1$ (Ωcm²) | Transfer across the phase boundary | 18.72 ± 2.79 | 17.99 ± 2.96 | 17.79 ± 2.53 | 18.28 ± 2.66 |

The combination of a semicircle and straight line in the lowest frequency region represents the phase transformation from $Li_4Ti_5O_{12}$ (spinel) into $Li_4Ti_5O_{12}$ (rock-salt) and solid-phase diffusion of Li⁺ within a bulk of the composite electrode material, respectively. Overall, the impedance curves of the coin cell having a composite electrode comprising Sample No. B suggest comparable or improved electronic properties relative to similar works performed with $Li_4Ti_5O_{12}$ coatings on Cu foil, which would suggest that embedded CNFs are sufficient to replace conventional metal foil CCs.

One of the biggest factors dictating electrochemical performance of the composite electrodes prepared in accordance with embodiments of the present invention is binder loading, which does not have a significant impact on the electrical conductivity of the composites. All of the $Li_4Ti_5O_{12}$/CNF/PVDF composite electrodes of Table 4 possessed acceptable electrical conductivities (ranging between 3 S/cm and 10 S/cm), since the CNF loading is well above the percolation threshold (which is known to be less than about 1 wt % when using CNFs embedded in a polymer matrix).

The range of conductivity is sufficient for lithium ion batteries without a dedicated metal foil CC. Therefore, the binder may be affecting an intrinsic composite property, such as lithium diffusivity. Lithium ion diffusivity ($D_{Li+}$) was calculated by the EIS method using Warburg impedance and according to Equation 2 and Table 6, below:

$$D_{Li+} = \frac{R^2 T^2}{2A^2 n^4 F^4 C^2 \sigma^2} \quad \text{EQUATION 2}$$

where R is the gas constant, T is the absolute temperature, A is the area of the composite electrode, n is the number of electrons transferred, F is the Faraday constant, C is the molar concentration of lithium, and σ is the Warburg coefficient.

Figure 43:
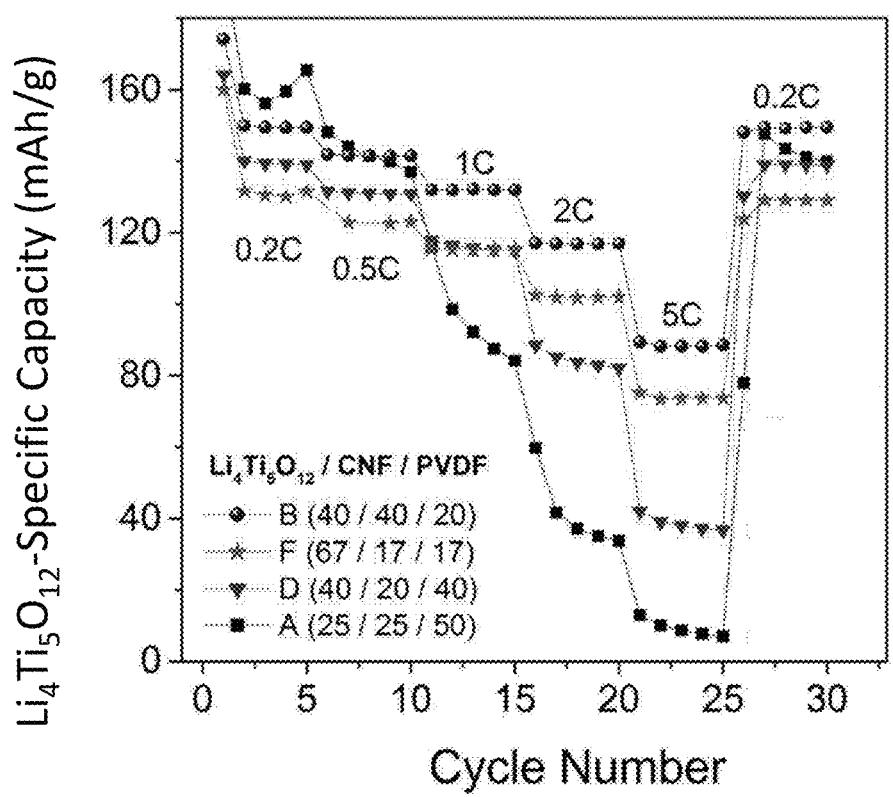
FIG. 43 is a graphical representation of the electrochemical performance of $Li_4Ti_5O_{12}$ composite electrodes prepared in accordance with embodiments of the present invention.
Figure 46:
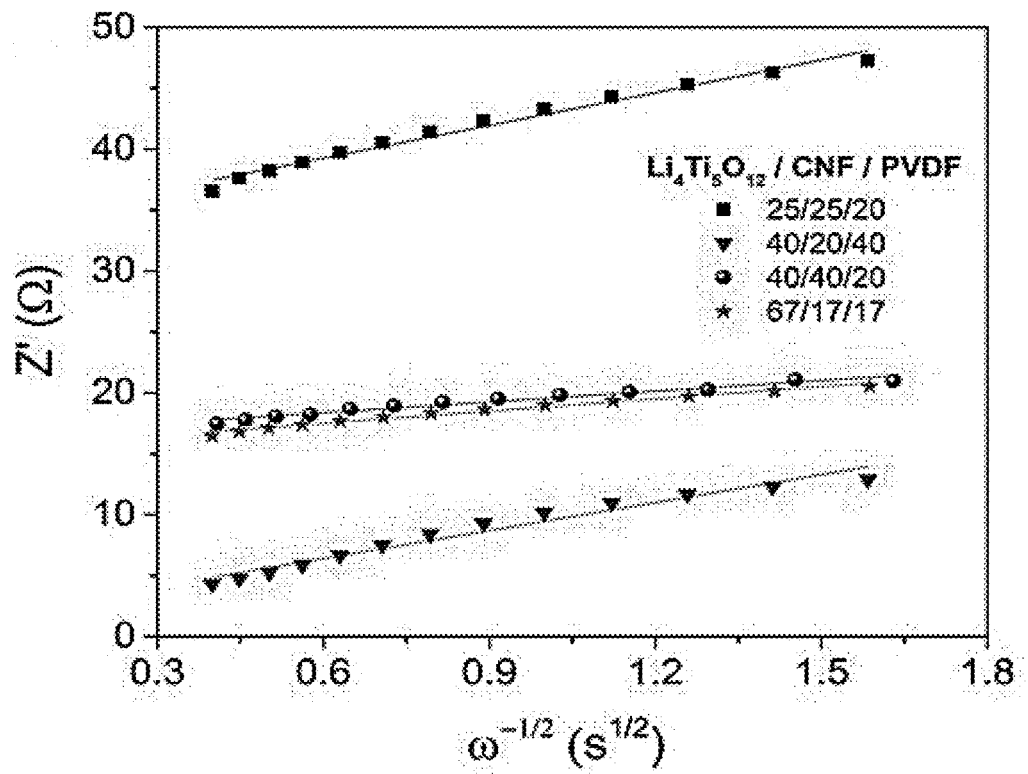
FIG. 46 is a graphical representation of lithium ion diffusivity based on the Nyquist plots of FIG. 45.

Based on the evaluation of these parameters, illustrated in FIG. 46, the observed trend in the values of $D_{Li+}$ was consistent with respective rate performances in FIG. 43. It is likely that in composite electrodes having a high PVDF loading, the network of interconnected spaces between particles was occupied by binder rather than electrolyte. As a result, many of the lithium ion diffusion pathways were blocked, yielding low $D_{Li+}$ values (see Table 6) for composite electrodes comprising Sample Nos. A and D. On the other hand, the more porous nature of composite electrodes comprising Sample Nos. B and F promoted higher $D_{Li+}$ values.

TABLE 6

| Sample | σ (Ω s$^{-1/2}$) | $D_{Li+}$ (cm$^2$/s) |
|---|---|---|
| A (25/25/50) | 8.95 | 1.5 × 10$^{-13}$ |
| D (40/20/40) | 7.65 | 2.0 × 10$^{-13}$ |
| B (40/40/20) | 2.93 | 1.4 × 10$^{-12}$ |
| F (67/17/17) | 3.35 | 1.1 × 10$^{-12}$ |

Figure 48:
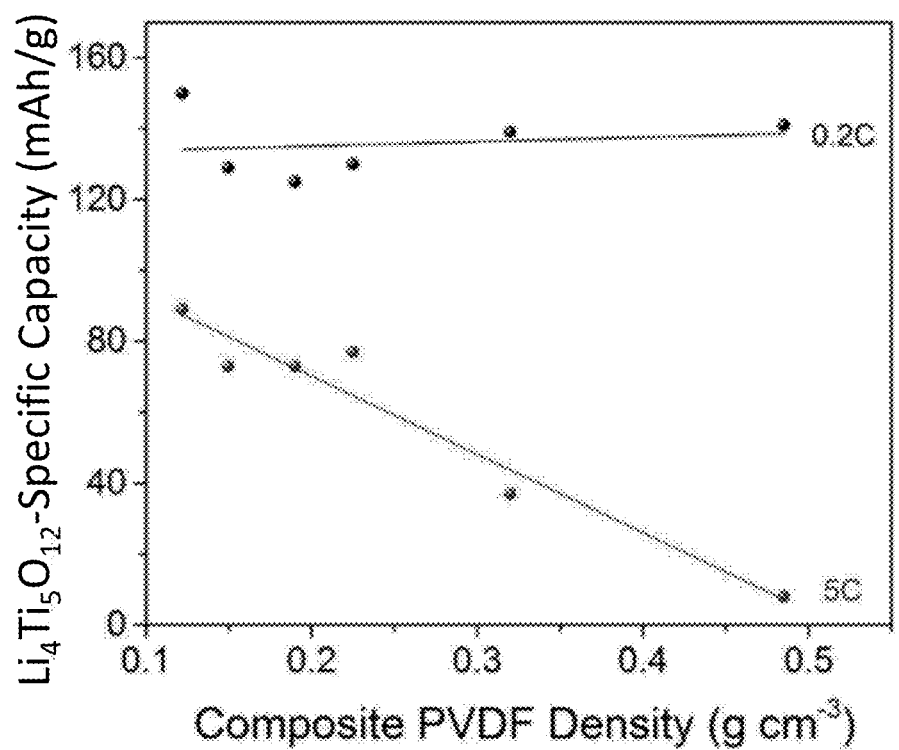
FIG. 48 is a graphical representation of specific capacities of $Li_4Ti_5O_{12}$ composite electrodes prepared in accordance with embodiments of the present invention.

Because polymer loading correlated with degraded performance, capacity as a function of polymer density throughout the composite for both low and high C-rates was evaluated. FIG. 48 illustrates the specific capacity of the coin cells having a composite electrode comprising $Li_4Ti_5O_{12}$ and PVDF densities. The observed trends at low C (C/5) and high C (5C) rates are believed to be due to bulk diffusion within each composite electrode. That is, at a low C-rate, where there is more time for Li$^+$ diffusion, PVDF density had little-to-no effect on performance and reasonable $Li_4Ti_5O_{12}$-specific capacities (of at least 125 mAh/g) were achieved. Conversely, at a high C-rate, where there is less time for Li$^+$ diffusion, there was a strong correlation (R=−0.97) between decreased electrochemical performance and increased binder density. Thus, in composites where PVDF loading is high, the network of interconnected spaces between particles becomes filled with binder rather than electrolyte and many of Li$^+$ diffusion pathways are blocked, which gives rise to the poor high C-rate (5C) performance.

Figure 49:
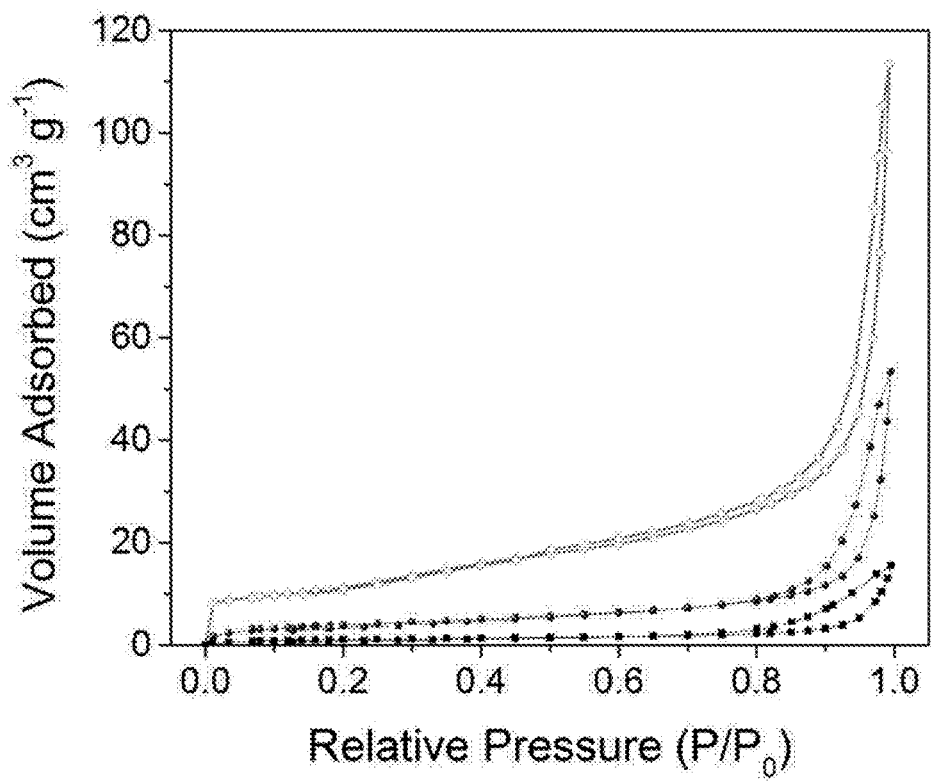
FIG. 49 is a graphical representation of $N_2$ adsorption and desorption isotherms of $Li_4Ti_5O_{12}$ composite electrodes prepared in accordance with embodiments of the present invention.

FIG. 49 is a graphical representation of $N_2$ adsorption and desorption isotherms of composite electrodes comprising Sample No. A (square data points), Sample No. B (circular data points), and pure CNFs (triangular data points). Generally, the Brunauer-Emmett-Teller ("BET") surface area decreased from 40 m$^2$/g for pure CNFs to 14 m$^2$/g and 4 m$^2$/g in composite electrodes comprising Sample No. B and Sample No. A, respectively. Such change in surface area supports a conclusion that increased polymer loading fills in many of the potential pores, thereby decreasing electrolyte and Li$^+$ diffusion pathways.

EXAMPLE 10

Mechanical properties of the composite electrodes of Example 8 were also investigated. SEM imaging was performed using an FEI Sirion XL-30 FEG-SEM (FEI, Co.). Samples for cross-sectional SEM were prepared through cryo-fracturing in liquid $N_2$. All tensile tests were conducted on a DMA Q800 Dynamic Mechanical Analyzer (TA Instruments, New Castle, Del.) in displacement control mode with a constant strain rate of 1%/min at room temperature. The composite electrodes were cut into rectangular tensile specimens of 20 mm length and 3 mm width using a razor. The finished tensile specimens were examined using a Zeiss Stemi DV4 optical microscope (Carl Zeiss, AG) to ensure that there were no visible flaws from cutting. The thickness of each tensile specimen was determined from the average of three measurements taken along the gauge length with a Mitutoyo micrometer (Mitutoyo America Corp.). The surface area and porosity data of the MWNT mat were calculated by BET method based on $N_2$ adsorption-desorption isotherms at 77 K obtained using an ASAP 2020 surface area and porosimetry analyzer (Micromeritics Instrument Corp.). The sample was degassed at 100° C. under vacuum for 16 hr before running the measurement. Electrical conductivity was performed with a Lucas Labs SP4 four-point probe head controlled with a Keithley 2410 SourceMeter (Keithley Instruments) and a computer operated LabVIEW program (National Instruments).

Figure 50:
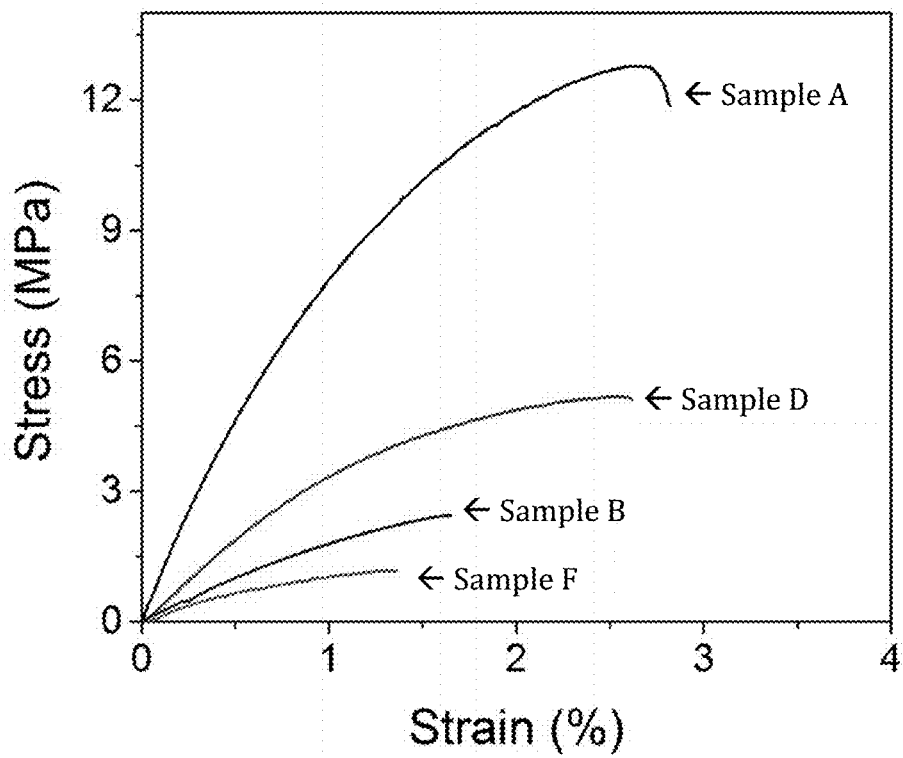
FIG. 50 is a graphical representation comparing stress-strain curves for tensile strength of $Li_4Ti_5O_{12}$ composite electrodes prepared in accordance with embodiments of the present invention.
Figure 51:
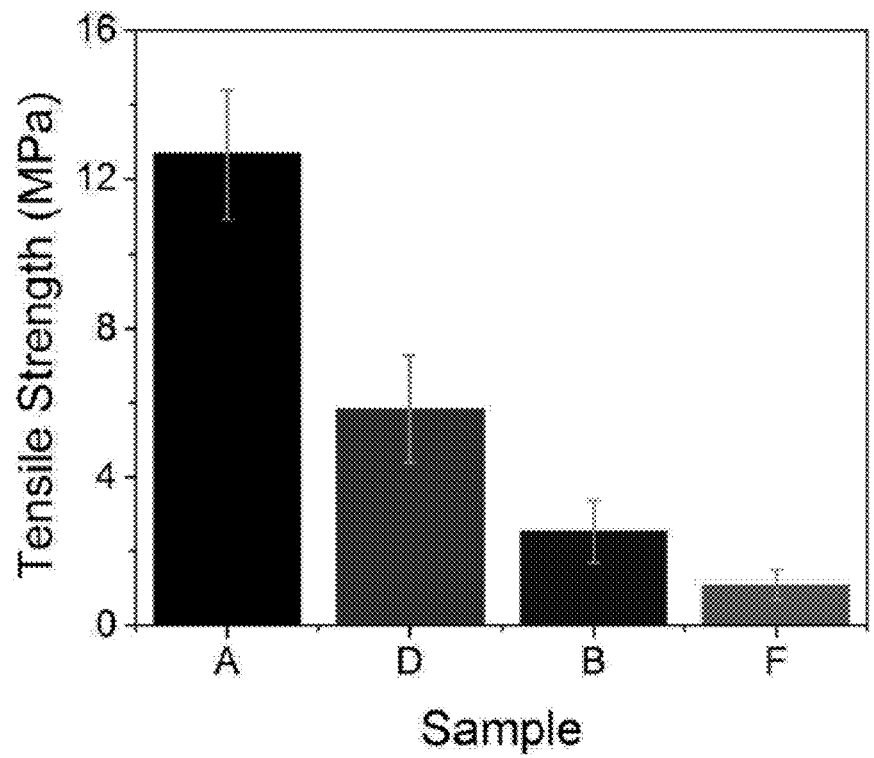
FIGS. 51 and 52 are graphical representations of tensile strength and strain-to-failure of $Li_4Ti_5O_{12}$ composite electrodes prepared in accordance with embodiments of the present invention.
Figure 52:
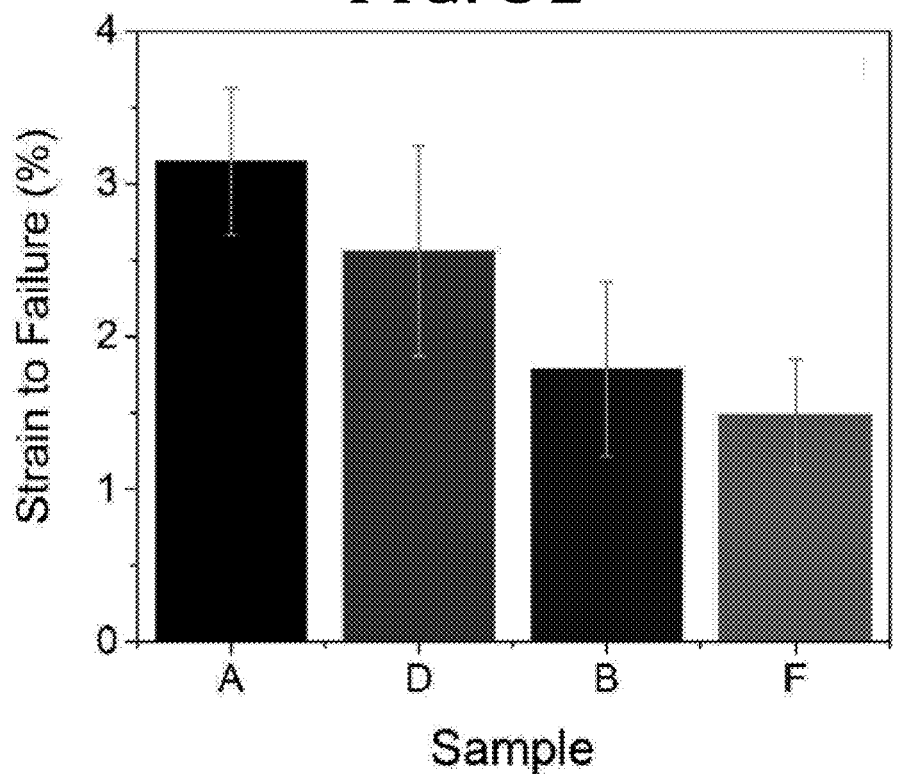

FIG. 50 is a graphical representation of the comparison of stress-strain curves for tensile strength of samples comprising Sample Nos. A, B, D, and F. From these curves, and the analysis of mean mechanical properties (illustrated in FIGS. 51 and 52 for tensile strength and strain to failure, respectively), a positive correlation between both tensile strength and strain-to-failure with increased binder loading was observed. Sample No. B, which exhibited excellent electrochemical performance, possessed moderate mechanical properties (tensile strength and strain-to-failure of 2.5 MPa and 1.8%, respectively). Such properties are improved, or at least comparable to, as compared to other current state-of-the-art free-standing composites. For example, the tensile strength of composite electrodes prepared in accordance with these embodiments could be improved up to 12.7 MPa at 50 wt % PVDF. Such an enhancement in mechanical properties could be utilized for applications where a slow charge or discharge is acceptable.

EXAMPLE 11

Figure 53:
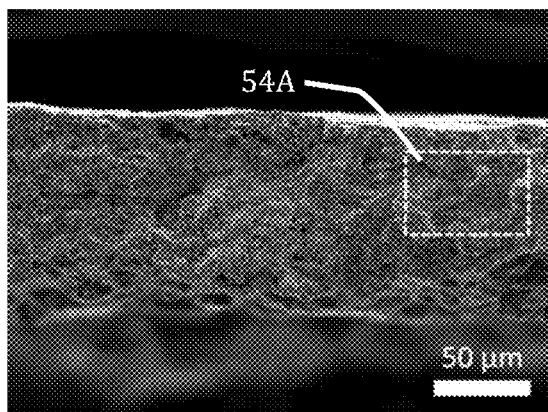
FIGS. 53 and 54 are scanning electron microscopy images of electrodes prepared in accordance with embodiments of the present invention.
Figure 54:
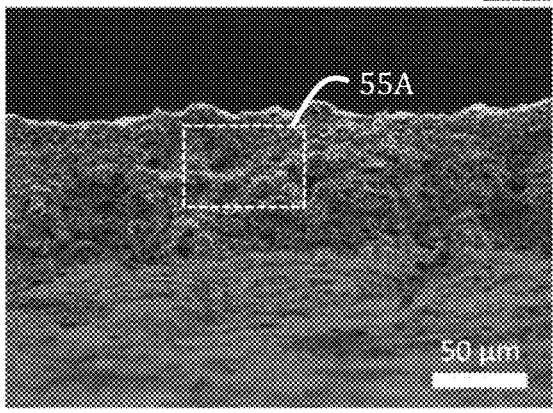

To understand the observed improved mechanical strength and electrochemical performance of electrodes prepared in Example 8, SEM images were acquired to characterize composite electrodes comprising Sample Nos. A and B. Resultant images are shown in FIGS. 53 and 54, with portions enclosed 53A and 54A being enlarged.

Figure 53A:
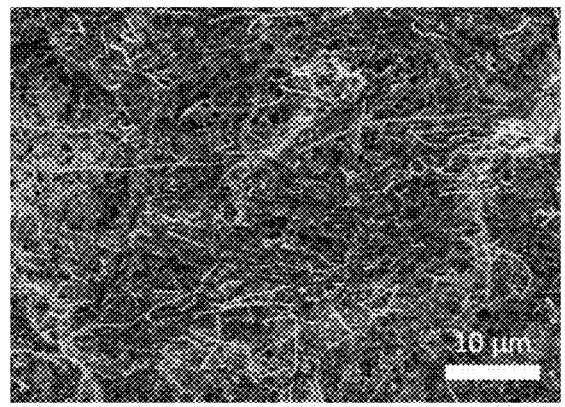
FIGS. 53A and 54A are enlargements of enclosed portions of FIGS. 53 and 54, respectively.
Figure 54A:
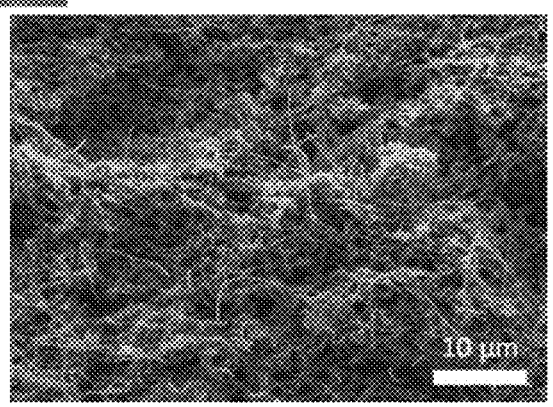

The composition of Sample No. A (FIGS. 53 and 53A), having 50% binder, has a limited number of visible pores. The high binder content and limited pore structure may contribute to the observed, excellent mechanical properties, which come at the cost of a high C-rate (2C and 5C) performance. Such a difference may also be due to the lack of diffusion pathways. Conversely, the composition of Sample No. B (FIGS. 54 and 54A), having only 20% binder, has many pores as compared to FIGS. 53 and 53A. The high porosity of the composite electrodes comprising Sample No. B may give rise to the observed superior electrochemical performance. Although, not surprisingly, some mechanical properties were sacrificed. Yet, the electrochemical and mechanical properties of composite electrodes comprising Sample No. B provided the best trade-off between mechanical integrity and electrochemical performance.

The 40% loading of active material composite electrodes comprising either Sample No. A or Sample No. B is comparable to commercially-available Li-ion battery electrodes, which typically consist of about 30% to 35% active material when considering conductive additive, binder, and metal foil CC.

Electrodes having other, more common conductive additives for Li-ion batteries, such as graphite or carbon black, were also fabricated at the optimum loading found for the $Li_4Ti_5O_{12}$/CNF/PVDF (Samples Nos. G and H). However, both electrodes comprising Sample Nos. G and H presented undesirable issues during casting, such as inhomogeneous settling in the case of graphite or cracking and curling in the case of carbon black.

EXAMPLE 12

To examine versatility of methods of preparation, composite electrodes were prepared in accordance with the method described in Example 8, using $LiFePO_4$ (Sample No. J) and $LiCoO_2$ (Sample No. I), with optimized ratios determined using $Li_4Ti_5O_{12}$. Electrical and mechanical characterizations were performed in a manner similar to those described in Examples 8-10.

Figure 55:
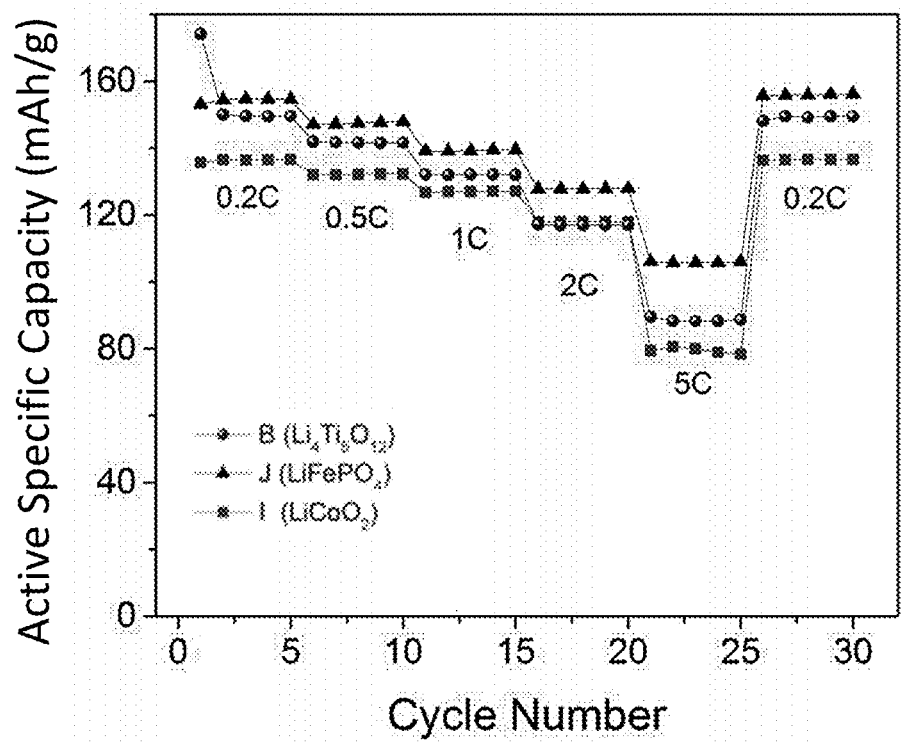
FIG. 55 is a graphical representation of rate performances of composite electrodes prepared in accordance with embodiments of the present invention.

FIG. 55 graphically represents the rate performances (C/5) of resulting composite electrodes comprising Sample Nos. I (square data points) and J (triangular data points), as compared to Sample No. B (circular data points). At low current rates, each of the three types of active materials displayed excellent capacities of 150 mAh/g ($Li_4Ti_5O_{12}$), 156 mAh/g ($LiFePO_4$), and 137 mAh/g ($LiCoO_2$). Even at a high, 5C current rate, each sample exhibited a capacity of at least 80 mAh/g, with the composite electrode comprising Sample No. J performing the best at 106 mAh/g.

Figure 56:
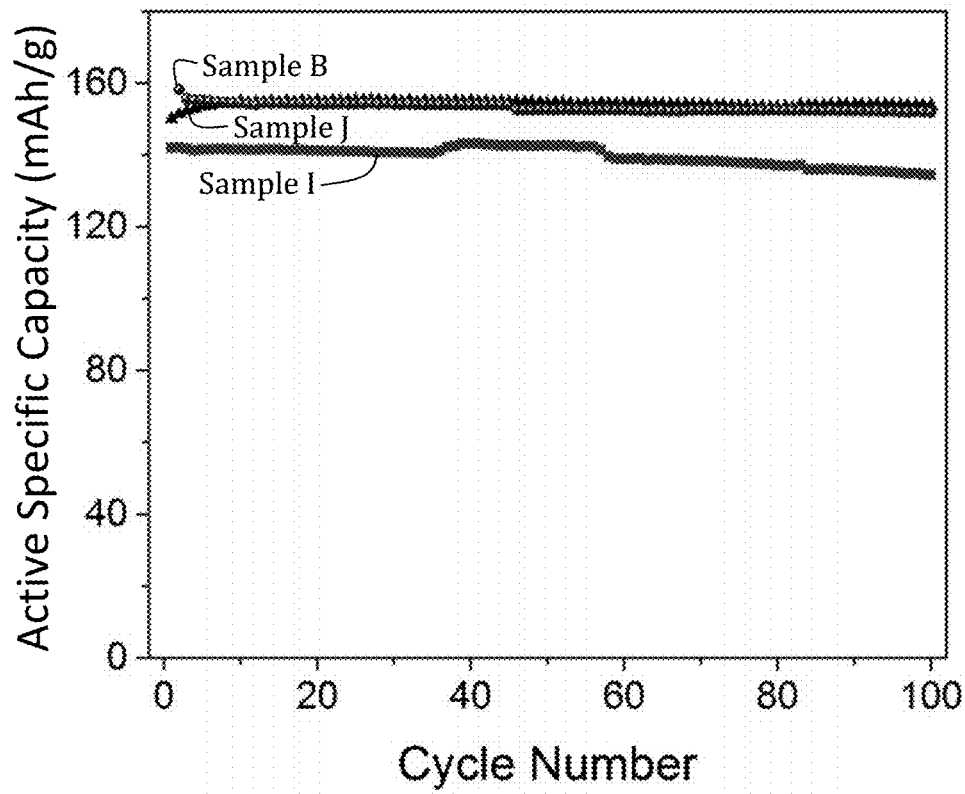
FIG. 56 is a graphical representation of cycling performances of composite electrodes prepared in accordance with embodiments of the present invention.
Figure 57:
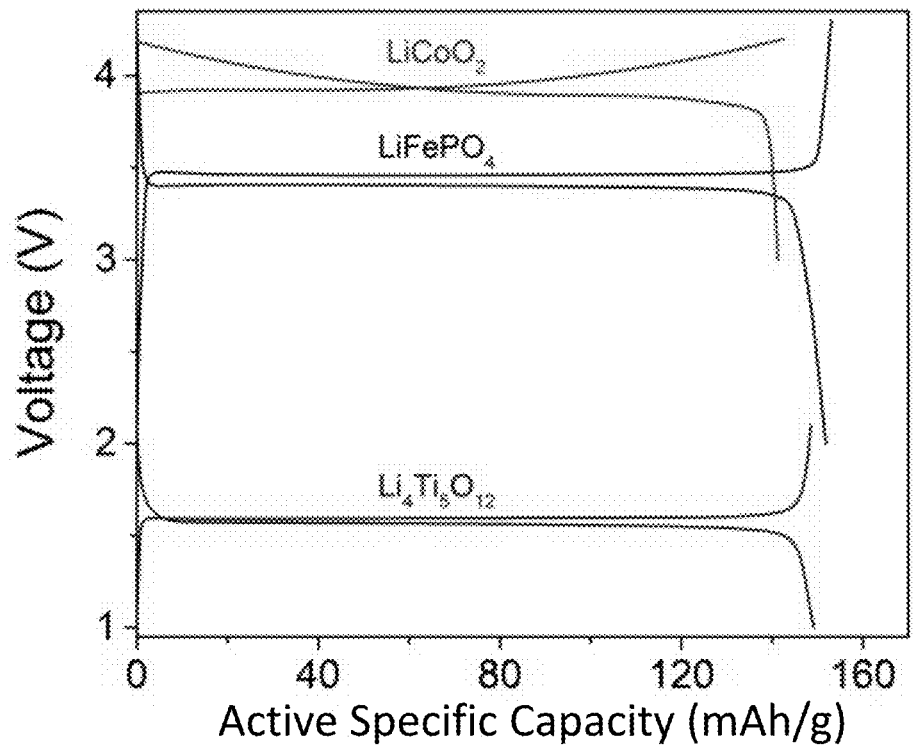
FIG. 57 is a graphical representation of stable charge and discharge profiles observed in composite electrodes prepared in accordance with embodiments of the present invention.

The composite electrodes were tested for 100 cycles at a C/5 current rate, as shown in FIG. 56, which led to consistent performance as well as extremely stable charge/discharge profiles, as shown in FIG. 57.

Composites were prepared using only CNF and PVDF, according to the method described in Example 8 using a 50/50 ratio of CNF to PVDF (Sample No. K) and a 67/33 of CNF to PVDF (Sample No. L).

Figure 58:
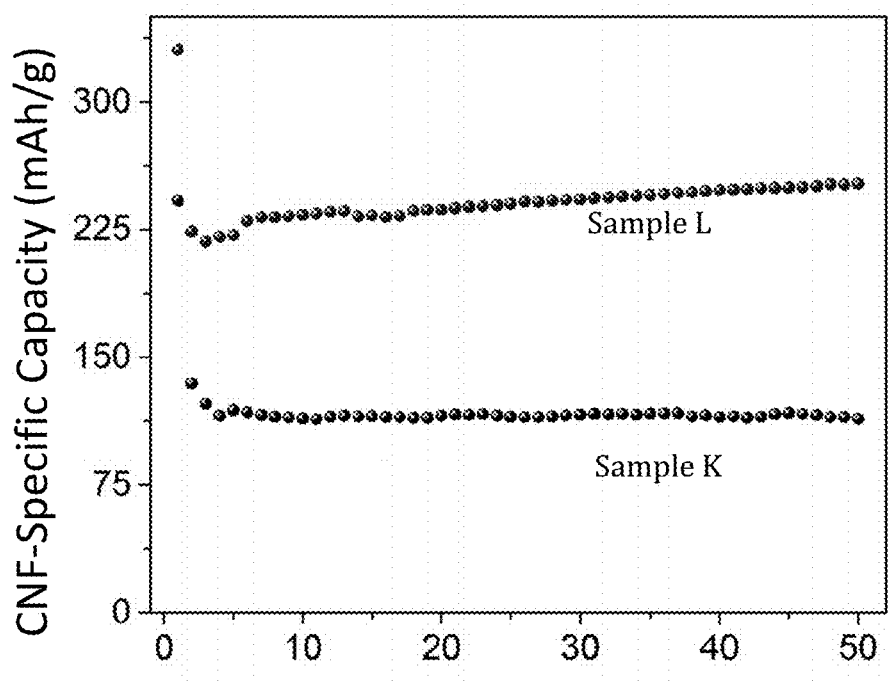
FIG. 58 is a graphical representation of cycling performance for carbon nanofiber composite electrodes prepared in accordance with embodiments of the present invention.
Figure 59:
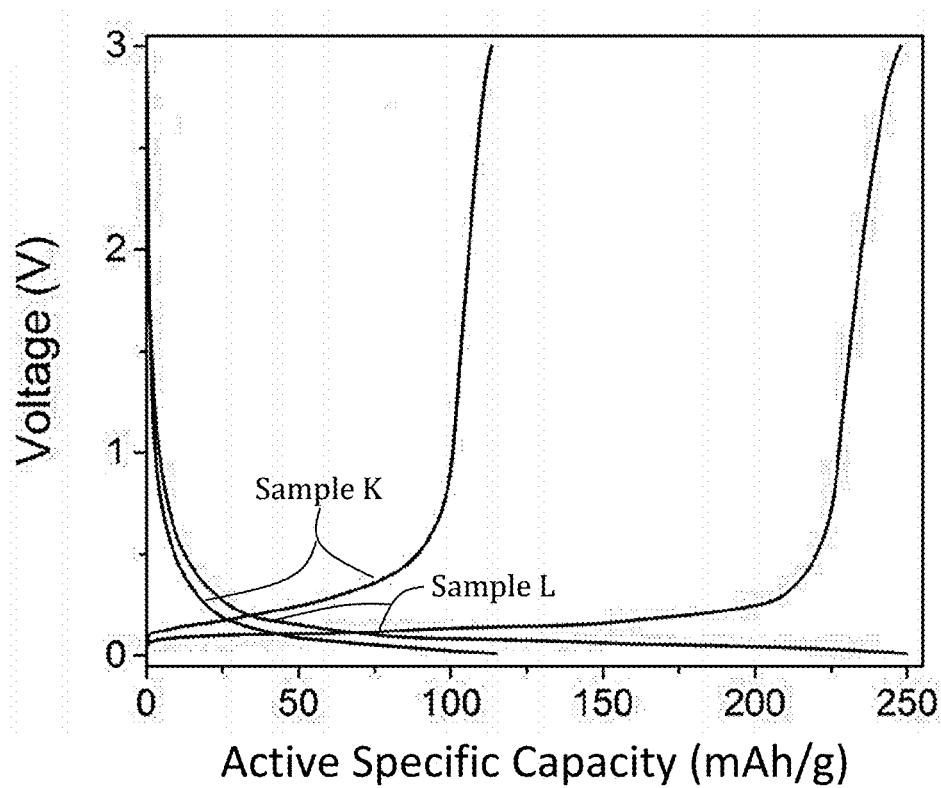
FIG. 59 is a graphical representation of charge and discharge profiles for carbon nanofiber composite electrodes prepared in accordance with embodiments of the present invention.

While the composite electrodes comprising Sample Nos. K and L showed excellent C/5 cyclability over 50 cycles, the composite electrode with Sample No. K (with 50% CNFs) achieved a reversible capacity of only 115 mAh/g, whereas the composite electrode with Sample No. L (with 67% CNFs) showed a 250 mAh/g CNF-specific capacity (FIG. 58). Such decrease in electrochemical performance may be attributed to increased binder loading, which fills the voids within the composite electrode, blocks potential diffusion pathways, and leads to a nearly three-fold enhancement in tensile strength. Representative charge and discharge profiles of Sample Nos. K and L are shown in FIG. 59.

Figure 60:
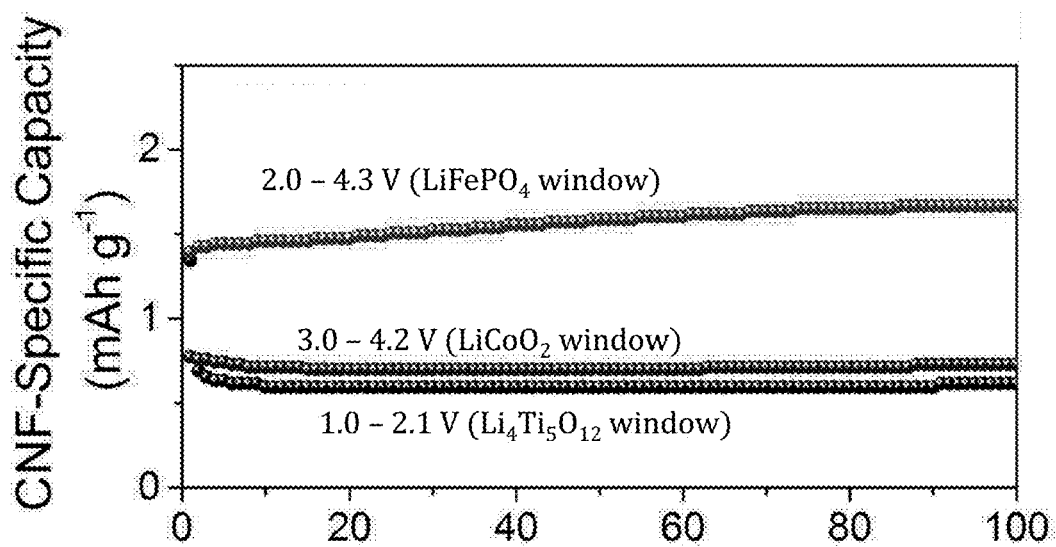
FIG. 60 is a graphical representation of cycling performance for carbon nanofiber composite electrodes prepared in accordance with embodiments of the present invention.

Using the testing methods described above, composite electrodes comprising Sample Nos. K and L were formed as free-standing, flexible films; however, the electrochemical performance and mechanical strength both suffered. At higher electrochemical windows, the CNFs only act as a conductive additive and do not participate electrochemically within the electrodes. Only minimal CNF contributions (0.6 mAh/g to 1.7 mAh/g) were observed (FIG. 60), which corresponds to about 1% or less of the total active material specific capacity.

EXAMPLE 13

In reviewing the composite electrodes from Example 8, those comprising Sample No. B were found to retain a casting shape without shrinkage, which is a desirable trait for a printable ink. By comparison, those comprising Sample No. A led to significant shrinkage and out-of-plane buckling around the edges during the casting process. Any shrinkage or out-of-plane deformation would severely complicate printing, particularly for building up sequential layers in the z-direction. The 40/40/20 ratio of active/CNF/PVDF provides a good balance between electrochemical performance, mechanical strength, and shape retention while drying.

In that regard, composite inks configured for printing according to embodiments of the present invention were prepared using the procedure described above in Example 8, except solid loading of each composition was doubled to increase viscosity. For anodes consisting of only CNFs, 150 mg of CNFs were added to a 6 mL polymer/NMP solution (the amount of binder was scaled according to the ratios in Table 4). The anode mixture was probe sonicated for 2 min at 22% amplitude, transferred to a 6 cm PTFE dish, dried at 90° C. to remove solvent, then vacuumed at 120° C. overnight.

Printing was performed by extrusion from a syringe mounted on a custom Aerotech 3D-motion gantry (Pittsburgh, Pa.). Typical motion speeds ranged from 5 mm/s to 20 mm/s. Extrusion was controlled using an Ultimus V pressure pump system from Nordson EFD (East Providence, R.I.) at pressures ranging from 0.5 psi to 5 psi. The syringe tips, also from Nordson EFD, ranged from 18 gauge to 25 gauge, of 0.25 in stainless steel. Needle geometry, pressure, and print speed were tuned to minimize feature size and maximize print reliability (reliable extrusion and wetting of ink). Tool paths were developed in AeroBasic scripting language.

Figure 61:
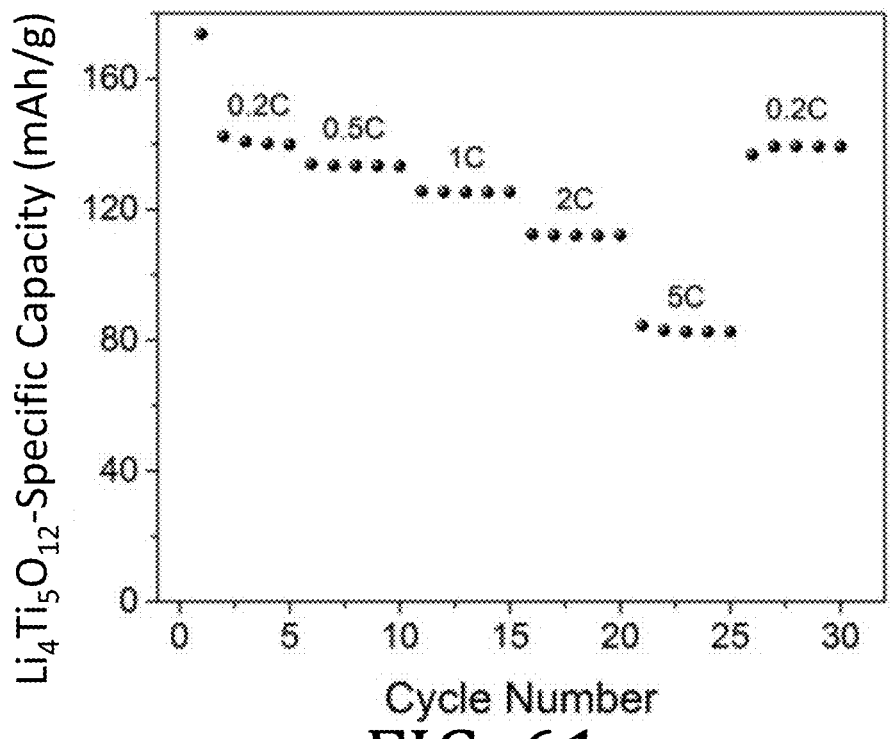
FIG. 61 is a graphical representation of rate performance of a printed $Li_4Ti_5O_{12}$ composite electrode prepared in accordance with embodiments of the present invention.

A printed $Li_4Ti_5O_{12}$ disc (not shown) of the prepared anode composite ink was electrochemically cycled in the half-cell configuration. The printed anode's rate performance was on par with the performance of the casted composite electrodes comprising Sample No. B (graphically illustrated in FIG. 61).

Figure 62:
FIGS. 62 and 63 are photographs of patterns printed using composite inks prepared in accordance with embodiments of the present invention.
Figure 63:
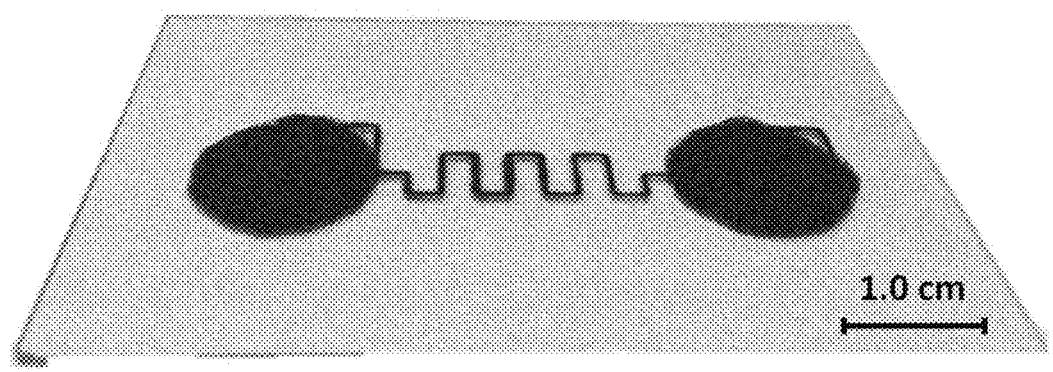

To emphasize the versatility of the composite electrodes, a composite cathode ink comprising $LiFePO_4$ ink and having ratios similar to the composite electrode was prepared and used to print several complex patterns onto a substrate (here, transparency paper). Two of such patterns are shown in FIGS. 62 and 63. The patterns were easily flexed or deformed while on the substrate without any visible cracking or delamination. As such, the cathode composite ink was shown to print layered structures into highly flexible or stretchable patterns (e.g., serpentine, crossed, and interdigitated).

EXAMPLE 14

A dry phase inversion ink for printing porous electrolytes for use in Li ion batteries according to embodiments of the present invention was prepared with KYNAR HSV 900 PVDF from Arkema Inc.; 40-50 nm APS powder $Al_2O_3$ from NanoDur purchased through Alfa Aesar (Ward Hill, Mass.); and NMP and glycerol purchased from Sigma Aldrich Co.

Nanocomposite electrolytes were prepared by dissolving 0.1726 g PVDF in 3 mL NMP (or NMP/glycerol 95/5 w/w for electrolytes made with the phase inversion process). For electrolytes containing ceramic filler, 0.4030 g $Al_2O_3$ (70/30 $Al_2O_3$/PVDF w/w) was added and bath sonicated for 3 hr using a 2510 bath sonicator (Branson Ultrasonics Inc.).

For electrodes, the CNFs were probe sonicated in solvent for 1 min at 17% amplitude using a Vibra-Cell VCX 750 Probe Sonicator (Sonics and Materials, Inc.) with a 0.25 in microtip. Active material was then added, and the mixture was bath sonicated for 10 min. The suspensions were shaken by hand several times. The suspension was then either cast or printed. Generally, each suspension included 100 mg of active material and 5 mL solvent (conductive additive and binder were scaled accordingly).

For casting, the suspensions were transferred to a 6 cm diameter PTFE dish and dried at 90° C. Once NMP evaporated, the suspensions were subjected to vacuum at 120° C. overnight for better drying and to remove glycerol. Electrolyte samples (19 mm discs) were punched from cast electrolyte membranes; composite electrode samples (prepared in a manner similar to those of Example 8) (9.5 mm diameter discs) were punched from composite electrodes. Typical weights of $Li_4Ti_5O_{12}$ and $LiFePO_4$ in each composite electrode sample ranged from 1.5 mg to 3.0 mg, with corresponding thicknesses ranging from 100 μm to 200 μm (measured by a Mitutoyo digital micrometer). Composite electrode samples were assembled versus lithium foil under argon environment (less than 1 ppm $H_2O$ and $O_2$) in a 2325 coin cell configuration (see FIG. 21). Either the electrolyte sample or a commercial polyolefin membrane (CELGARD 2325) were soaked in a liquid electrolyte solution of 1 M $LiPF_6$ in 1/1 EC/DEC by wt. (Novolyte Technologies Inc.) and used as the separator. After fabrication, the cells were allowed to age at least 8 hr before electrochemical cycling in order to allow for homogeneous electrolyte wetting.

For printing, direct ink write was performed by extrusion from a syringe mounted on a custom Aerotech 3D-motion gantry. Typical motion speeds ranged from 5 mm/sec to 20 mm/sec. Extrusion was controlled using an Ultimus V pressure pump system from Nordson EFD at pressures ranging from 0.5 psi to 5 psi. The syringe tips, also from Nordson EFD, ranged from 18 gauge to 25 gauge of 0.25 in stainless steel. Needle geometry, pressure, and print speed were tuned to minimize feature size and maximize print reliability (reliable extrusion and wetting of ink). Tool paths were developed in AeroBasic scripting language.

EXAMPLE 15

SEM imaging was performed using a FEI Quanta 600F (FEI, Co.) using the method described in Example 17 (below). All tensile tests were conducted on a TA Instruments DMA Q800 Dynamic Mechanical Analyzer in displacement control mode with a constant strain rate of 1%/min at room temperature (ASTM D882). Rectangular tensile specimen were cut from composite electrodes with dimensions of 20 mm by 3 mm (length by width) using a razor. The finished tensile specimen were examined using a Zeiss Stemi DV4 optical microscope to ensure that there were no visible flaws due to cutting. The thickness of each tensile specimen was determined from the average of three measurements taken along the gauge length with a Mitutoyo micrometer. The surface area and porosity data of the MWNT mat were calculated by a BET method based on $N_2$ adsorption-desorption isotherms at 77 K obtained using an ASAP 2020 surface area and porosimetry analyzer (Micromeritics Instrument Corp.).

The samples were degassed at 100° C. under vacuum for 16 hr before running the measurement. Electrical conductivity was performed with a Lucas Labs SP4 four-point probe head controlled with a Keithley 2410 SourceMeter and a computer operated Lab VIEW program. For wettability experiments, a 10 μL drop of liquid electrolyte was placed onto the samples and spreading of the electrolyte drop was observed.

The coin cells were cycled using a Maccor series 4000 battery test system (Maccor, Inc.). $LiFePO_4$, and $Li_4Ti_5O_{12}$ were investigated for cycling stability at a constant C/5 current rates ranging between 2.0 V and 4.3 V and between 1.0 V and 2.1 V vs. Li/Li', respectively. The rate studies were carried out in a similar manner, with half-cells tested for 5 cycles at C/5, C/2, 1C, 2C, 5C, and repeated C/5 for all active materials. All C-rates were calculated with 1C being defined as 170 mA/g and 175 mA/g for $LiFePO_4$ and $Li_4Ti_5O_{12}$, respectively.

EXAMPLE 16

A composite electrolyte according to an embodiment of the present invention was prepared by sonicating $Al_2O_3$ nanoparticles (diameter ranging from 40 nm to 50 nm) and PVDF in a mixture of NMP (good solvent) and glycerol (non-solvent). More specifically, KYNARHSV 900 PVDF was provided from Arkema Inc. $Al_2O_3$ powder (40 nm to 50 nm) from NanoDur was purchased through Alfa Aesar. NMP and glycerol were purchased from Sigma Aldrich Co. Glycerol was added as a non-solvent to increase porosity through phase inversion to aid in the dispersion of $Al_2O_3$ nanoparticles, and to protect PVDF from dehydrofluorination (glycerol has been shown to interact strongly with $Al_2O_3$ by forming a bridging alkoxy bond with one of the primary alcohols and a hydrogen bond with the secondary alcohol group). The solvation layer minimized nanoparticle aggregation and aided in more uniform dispersion throughout the electrolyte membrane.

The composite electrolytes were prepared by dissolving 0.1726 g PVDF in 3 mL NMP (or NMP/glycerol 95/5 w/w for composite electrolytes made with the phase inversion process). For composite electrolytes comprising ceramic filler, 0.4030 g $Al_2O_3$ (70/30 $Al_2O_3$/PVDF w/w) was added and bath sonicated for 3 hr using a Branson 2510 bath sonicator. The suspension was then suitable for casting or printing.

The suspension had a high boiling point (greater than about 200° C.) and was suitable for casting or printing.

For casting, the suspensions were transferred to a 6 cm diameter PTFE dish and dried at 90° C. under nitrogen. Once the NMP had evaporated, the samples were placed in vacuumed at 120° C. overnight to complete drying and to remove glycerol.

Casted electrolyte membranes were punched to 19.0 mm discs and composite electrode samples were punched to 9.5 mm diameter discs. Typical thicknesses of electrolytes used in this study were about 100 µm, although similar performance was observed in thicknesses as low as 30 µm. Electrode samples were assembled versus Li foil under argon environment (less than 1 ppm $H_2O$ and $O_2$) in 2325 coin cell configuration (see FIGS. 21 and 21A). Electrolyte membranes and commercially-available CELGARD 2325 were soaked in a liquid electrolyte solution (1 M $LiPF_6$ in 1/1 EC/DEC by wt. (Novolyte Technologies)) and used as separators. Printed electrode membrane architectures ("PE-MAs") were soaked in liquid electrolyte and assembled versus Li foil. After fabrication, the cells were allowed to age at least 8 hr before electrochemical cycling in order to allow for homogeneous electrolyte wetting.

For composite electrodes prepared using phase inversion, PVDF was dissolved in 5 mL NMP (or NMP/glycerol 95/5 w/w). Next, the CNFs were added and probe sonicated for 1 min at 17% amplitude using a Sonics Vibra-Cell VCX 750 Probe Sonicator with a 0.25 in microtip. 100 mg active material was then added (CNF and PVDF loading was determined using the composite wt. ratios listed in the text and figure captions), and the mixture was bath sonicated for 10 min. The samples were shaken by hand several times during the sonication period for more thorough mixing. Finally, the mixtures were transferred to a 6 cm diameter PTFE dish and dried at 90° C. Once NMP was evaporated, the samples were dried under vacuum at 120° C. overnight. Composite inks for printing were prepared using the same procedure as above except the solids loading was doubled to increase the viscosity of the mixture and sonication intensity was increased to 21% for 2 min.

Direct ink write printing was performed by extrusion from a syringe mounted on a custom Aerotech 3D-motion gantry. Typical motion speeds ranged from 5 mm/s to 20 mm/s. Extrusion was controlled using an Ultimus V pressure pump system from Nordson EFD at pressures ranging from 0.5 psi to 5 psi and 5 psi to 25 psi for the composite electrode and composite electrolyte inks, respectively. The stainless steel syringe tips, also from Nordson EFD, were 18 gauge to 25 gauge and 0.25 in to 0.50 in length. Needle geometry, pressure, and print speed were tuned to maximize print reliability and fidelity (reliable extrusion and wetting of the composite electrolyte ink). Composite electrolyte inks were deposited onto glass substrates that were previously scrubbed with acetone and dried with compressed air. Tool paths were developed in the AeroBasic scripting language.

Multilayer electrolyte prints required specific drying conditions to prevent a first printed layer from swelling subsequent printed layers were dispensed thereon. Each printed layer was partially dried by covering with a glass dish and heating to 90° C. for 10 min to 20 min, depending on the amount of ink suspension dispensed. Subsequently printed layers were then dispensed atop the previously printed, partially dried ink.

EXAMPLE 17

Figure 64:
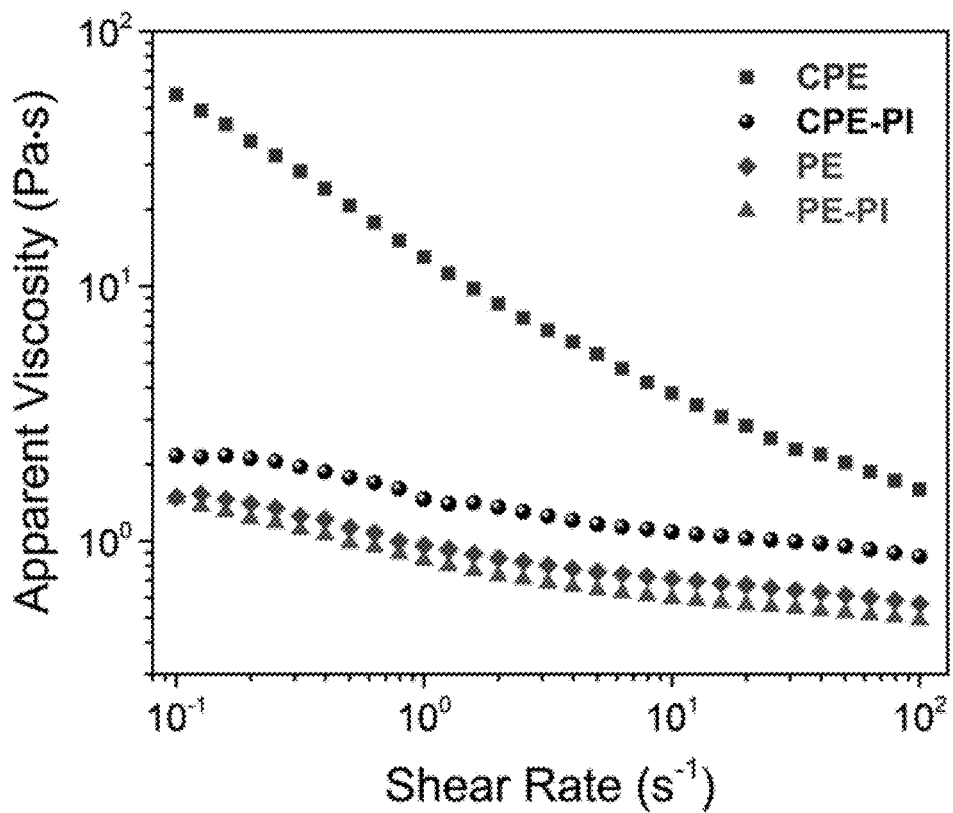
FIG. 64 is a graphical representation of viscosity as a function of shear rate of electrolyte inks prepared in accordance with embodiments of the present invention.

FIG. 64 graphically illustrates apparent viscosity as a function of shear rate of electrolyte inks (Example 16) and highlights an effect caused by glycerol and nanoparticle addition. Electrolyte inks comprising only PVDF (PE and PE-PI) displayed nearly identical rheological properties. The near identical properties suggest glycerol does not affect the binder component. Adding 70 wt % of $Al_2O_3$ to the electrolyte ink comprising PVDF and NMP (CPE) caused a substantial increase in apparent viscosity at all shear rates tested (e.g., about 14-times increase at 1 $s^{-1}$), which may likely be due to a flocculated $Al_2O_3$ suspension. Glycerol added to this electrolyte ink (CPE-PI) rendered the rheological behavior similar to electrolyte inks containing only PVDF and solvent. This may suggest the presence of deflocculated $Al_2O_3$. As such, glycerol may form a solvation or lubrication layer on the $Al_2O_3$ surface that promotes uniformity within the electrolyte ink. Interestingly, the solvation layer also protects PVDF from basic $Al_2O_3$.

When NMP alone is used to prepare a PVDF/$Al_2O_3$ composite electrolyte, a color of the composite turns from white to orange/brown with heated drying. Such color change may be explained by an $Al_2O_3$-catalyzed dehydrofluorination reaction in PVDF that forms conjugated double bonds along the main chain and crosslinking between polymer chains Dehydrofluorination of PVDF has been associated with undesirable shrinkage and embrittlement, which was observed in composite electrolytes comprising PVDF/$Al_2O_3$ without glycerol.

SEM imaging was used to characterize the cross-sections of three different PVDF-based, electrolytes (PE-PI, CPE, and CPE-PI) prepared in accordance with Example 16. Exemplary images are provided in FIGS. 65A-65F. Cross-sectional SEM imaging was performed using a FEI Quanta 600F SEM after cryo-fracturing samples while immersed in liquid nitrogen. Composite electrode samples were imaged at a 5 kV accelerating voltage without coating. Electrolyte samples were coated with a conductive 10 nm layer of iridium to avoid charging artifacts, and the coated samples were imaged using a 5 kV accelerating voltage. Ink rheology measurements were obtained using a TA Instruments ARES-G2 Rheometer. A flow sweep method was used to observe the apparent viscosity as a function of shear rate. At ambient temperatures, shear rates varied in a logarithmic sweep from 0.1 $s^{-1}$ to 100 $s^{-1}$, with a step equilibration time of 30 sec. Electrolyte inks were loaded on a 25 mm stainless steel plate with a constant gap of about 0.95 mm. All mechanical tensile tests were conducted on a TA Instruments DMA Q800 Dynamic Mechanical Analyzer in strain control mode with a constant strain rate of 5%/min at room temperature (ASTM D882). A preload force of 0.01 N was applied to compensate for any take-up of slack. Composite electrode samples were cut into rectangular tensile specimens having lengths ranging from 10 mm to 12 mm and widths ranging from 3 mm to 4 mm, using a razor. The tensile specimens were examined using a Zeiss Stemi DV4 optical microscope to ensure that there were no visible flaws due to cutting. The thickness of each tensile specimen was determined from the average of three measurements taken along the gauge length with a Mitutoyo micrometer. The surface area was calculated by the BET method based on $N_2$ adsorption-desorption isotherms at 77 K and obtained using an ASAP 2020 surface area and porosimetry analyzer (Micromeritics Instrument Corp.). The samples were degassed at 120° C. under vacuum for 16 hr before acquiring the measurement. For wettability experiments, a 10 µL drop of liquid electrolyte (1 M $LiPF_6$ in 1/1 EC/DEC by wt.) was placed on the specimens. Spreading of the electrolyte drop was observed. Porosity was measured by completely immersing the sample in liquid electrolyte overnight and massing after gently wiping excess electrolyte from the surface of the sample with a paper towel. Samples were massed before and after soaking and porosity was calculated as the volume of the absorbed liquid over the volume of the dry membrane. A volume of liquid was calculated with the mass of the absorbed liquid and a density of 1.22 $g/cm^3$ for liquid electrolyte.

Thermal stability was studied by placing the composite electrolyte and CELGARD 2325 on a hotplate for 5 min while increasing the temperature. Exact temperatures were determined using a non-contact IR thermometer. Shrinkage was monitored by taking photos after each temperature increase and measuring dimensions of each sample.

Figure 66A:
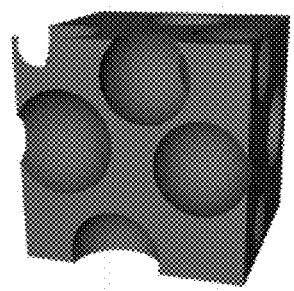
FIGS. 66A-66C are side elevation views of schematic model of voids and pores within composite electrodes, corresponding to FIGS. 65A, 65C, and 65E, respectively.

Based on the SEM images, the phase inversion process and the inclusion of $Al_2O_3$ has a significant impact on the resulting morphology. The pure polymer electrolyte (PE-PI; FIGS. 65A and 65B) prepared by phase inversion was dominated by larger voids (about 5 μm) over the majority of the pure polymer membrane. Walls of the larger voids comprise a plurality of smaller, cellular pores (FIG. 65B). These structures are schematically represented in FIG. 66A.

Figure 66B:
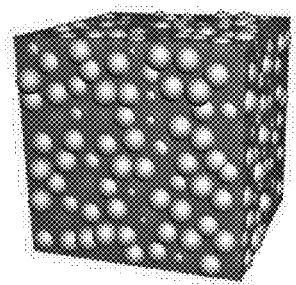

In contrast, composite electrolyte morphology became less porous for the CPE having a ceramic and polymer using only good solvent, NMP (FIGS. 65C and 65D). The SEM image of FIG. 65D indicates $Al_2O_3$ was clearly present, but PVDF fills potential voids around the ceramic. A schematic model of the CPE membrane is shown in FIG. 66B.

Figure 66C:
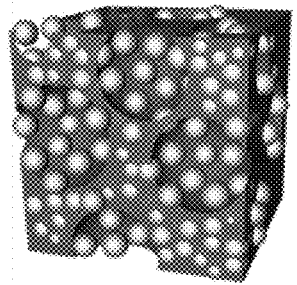
Figure 67:
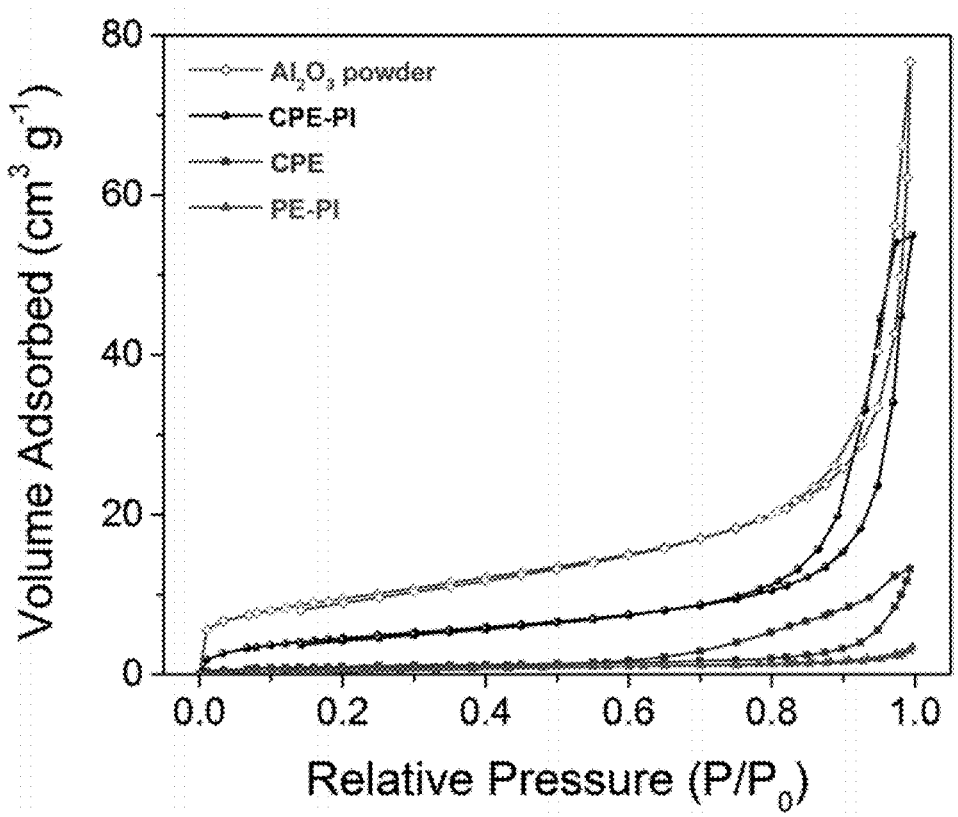
FIG. 67 is a graphical representation of $N_2$ adsorption and desorption isotherms of electrolyte membranes prepared in accordance with embodiments of the present invention.
Figure 68:
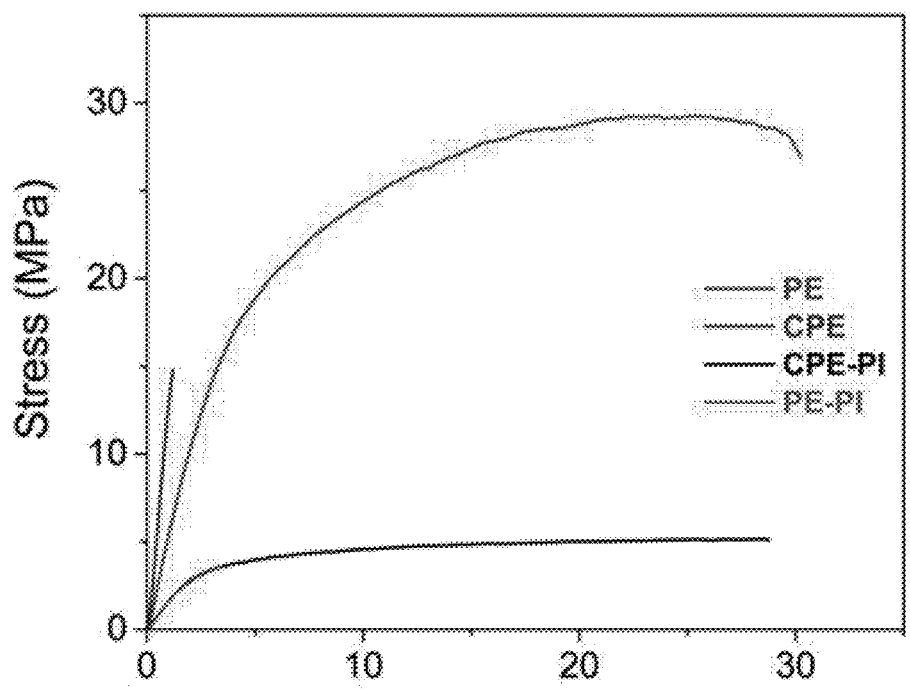
FIG. 68 is a graphical representation of mechanical behavior for composite electrolyte membranes prepared in accordance with embodiments of the present invention.

When phase inversion was used with $Al_2O_3$ in preparing the composite electrolyte membrane (CPE-PI), a balance between the two aforementioned microstructures was achieved, wherein the resulting composite electrolyte membrane included many small, submicron pores (FIGS. 65E and 65F). Formation of such submicron pores may be explained by the drying mechanism of the phase inversion process and a strong interaction between $Al_2O_3$ and glycerol. Due to the slower evaporation of the weak non-solvent (glycerol), a solid-like PVDF phase and a liquid-like glycerol phase were formed as the good solvent (NMP) evaporated. As this occurred, many ceramic particles preferentially occupied the glycerol phase. Since PVDF is insoluble in the glycerol phase, the resultant membrane was left with small voids between $Al_2O_3$ particles after complete drying (see, FIG. 66C). Such a hypothesized model is directly supported by BET specific surface area, $S_{BET}$, which was characterized for all of the electrolyte membranes described as well as pure $Al_2O_3$ (FIG. 67). $Al_2O_3$ and PVDF displayed a $S_{BET}$ of 33 m²/g and 3 m²/g, respectively. CPE exhibited a $S_{BET}$ of only 4 m²/g, which suggests that PVDF coated the majority of the $Al_2O_3$. On the other hand, CPE-PI exhibited a $S_{BET}$ of 17 m²/g (roughly 50% of neat $Al_2O_3$), which may indicate the retention of void space between nanoparticles, which can potentially act as $Li^+$ transport pathways.

The neat polymer membrane prepared with good solvent alone (for example, PE) demonstrated limited porosity (21%), and the addition of ceramic in CPE had an insignificant effect on the porosity value (25%). Both electrolyte films prepared by phase inversion displayed excellent porosities (greater than 50%), exceeding the porosity of commercially-available CELGARD 2325 (38%).

The ionic conductivity of each electrolyte membrane was observed to correlate with both the materials used and the solvents present. The use of phase inversion resulted in a two order of magnitude increase in conductivity when applied to similar material compositions. For example, electrolyte membranes comprising CPE exhibited a low conductivity (0.0080 mS/cm) compared to 0.82 mS/cm for electrolyte membranes comprising CPE-PI. Interestingly, while the porosity was the same for electrolyte membranes comprising CPE-PI and PE-PI, the ionic conductivity was 4-times less in the latter. Even though the majority of its morphology consisted of large, open pores, the smaller, cellular pores in the electrolyte membrane comprising PE-PI likely reduced the ionic conductance. In contrast, electrolyte membranes comprising CPE-PI had uniform porosity throughout its entire thickness, resulting in the highest observed conductivities.

TABLE 7

| Sample | Composition | Ratio[a] | Solvent | Porosity (%) | $\sigma$[b] [mS/cm] | $E_a$[c] (kJ/mol) | TS[d] [MPa] | $\varepsilon_f$[e] [%] |
|---|---|---|---|---|---|---|---|---|
| CPE-PI | PVDF/$Al_2O_3$ | 30/70 | NMP/glycerol | 51 | 0.82 | 10.6 | 5.4 ± 0.3 | 28.2 ± 1.7 |
| CPE | PVDF/$Al_2O_3$ | 30/70 | NMP | 25 | 0.0080 | 43.6 | 14.2 ± 0.7 | 1.3 ± 0.2 |
| PE-PI | PVDF | 100 | NMP/glycerol | 53 | 0.20 | 18.4 | 3.5 ± 0.2 | 3.9 ± 0.5 |
| PE | PVDF | 100 | NMP | 21 | 0.0017 | 52.9 | 32.9 ± 0.6 | 28.0 ± 2.5 | where a) sample ratios by wt %, b) room temperature ionic conductivity, c) activation energy, and d) tensile strength, and e) strain-to-failure.

Figure 69:
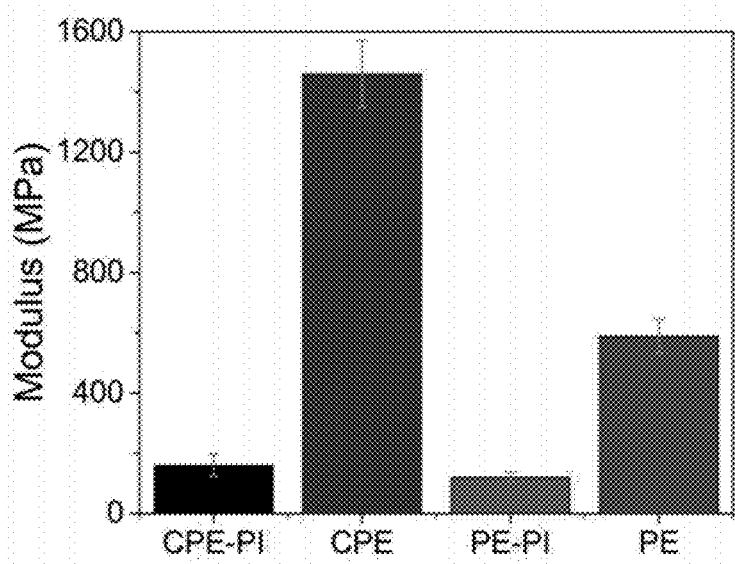
FIGS. 69-71 are graphical representations of modulus, tensile strength, and strain of electrolyte membranes prepared in accordance with embodiments of the present invention.
Figure 70:
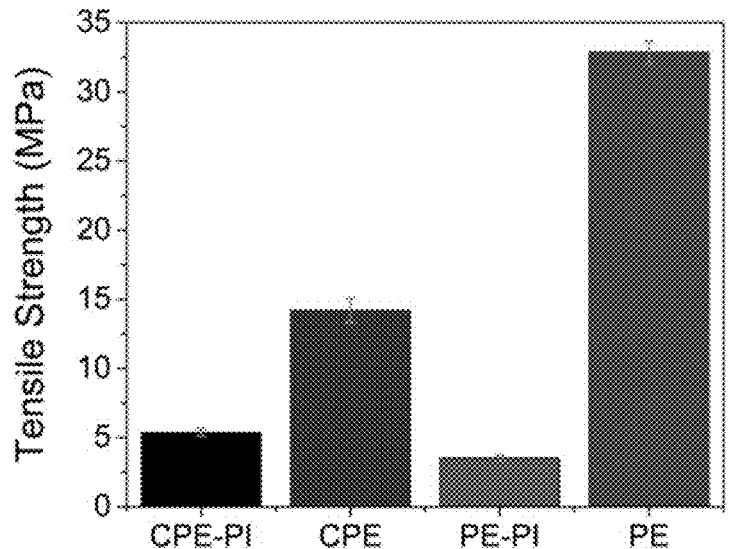
Figure 71:
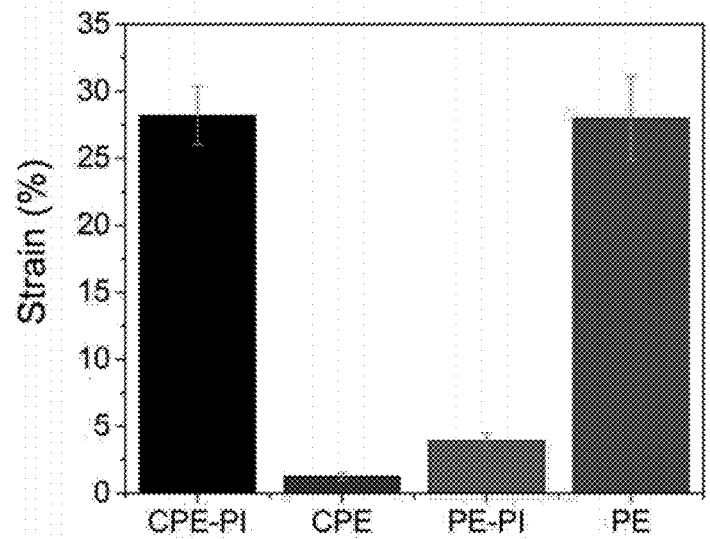

Ductility, which is closely related to strain tolerance, is of particular concern for applications requiring battery flexibility. Mechanical properties of electrolyte membranes were characterized and displayed in FIGS. 68-71 and Table 7. Electrolyte membranes comprising PE or CPE-PI showed a ductility of about 28%, making these electrolyte membranes suitable for flexible battery applications. Electrolyte membranes comprising CPE or PE-PI, on the other hand, displayed weakened ductility values of 1.3% and 3.9%, respectively. Such low strain may be explained by the resultant microstructure of PE-PI, which is composed primarily of large, void-like pores (FIG. 66A). In the composite electrolyte membrane comprising CPE, the diminished ductility likely stemmed from a weakening of the polymer and covalent crosslinking of neighboring PVDF chains due to $Al_2O_3$-catalyzed dehydrofluorination rather than an unfavorable pore structure. The resulting embrittlement of the composite electrolyte membrane was reflected in its high modulus relative to the other membranes (see FIG. 69). The effect was mitigated in the composite electrolyte membrane comprising CPE-PI by permitting a glycerol solvation shell to surround the $Al_2O_3$ particles. The tensile strength of the electrolyte membranes prepared using the phase inversion process was decreased as compared to NMP only counterparts, which may be explained by increased porosity.

Figure 72:
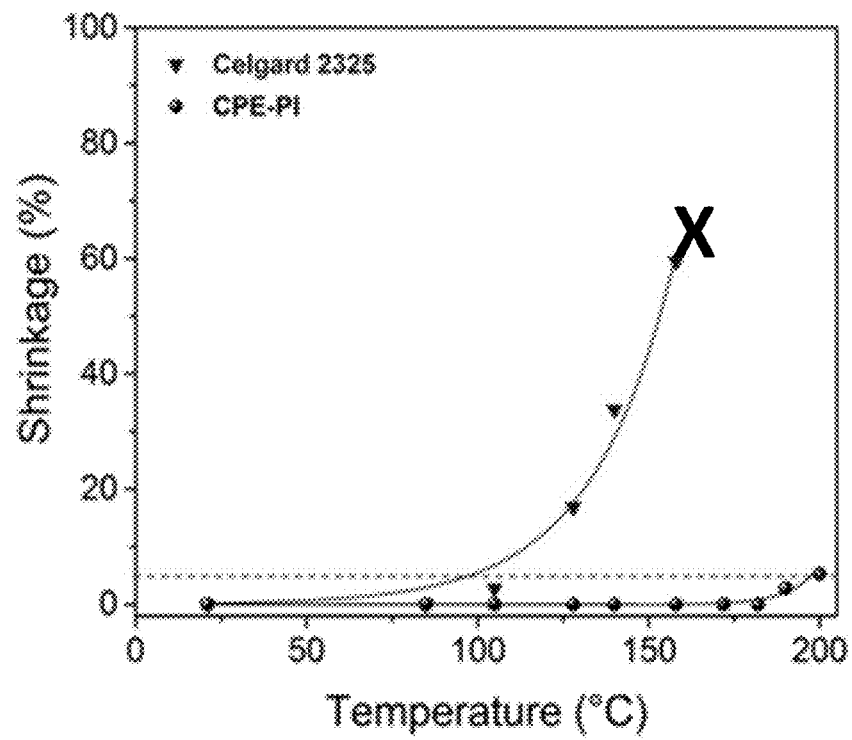
FIG. 72 is a graphical representation comparing thermal properties of a composite electrolyte membrane prepared in accordance with embodiments of the present invention to a corresponding membrane comprising commercially-available CELGARD 2325.

The thermal properties of the composite electrolyte membranes were also evaluated. The composite electrolyte membranes comprising CPE-PI and commercially-available CELGARD 2325 were subjected to identical thermal treatments. As shown in FIG. 72, the latter showed 3% shrinkage at 105° C. and 34% shrinkage at 140° C. The commercially-available material continued to shrink until catastrophic failure occurred (large X on graph), which is likely due to melting of its constituent polyethylene and PP layers (133° C. and 158° C. respectively). The large shrinkage before reaching the polymer melting points may be explained by shape recovery behavior resulting from a stretching process used to induce adequate porosity during manufacturing. In contrast, the CPE-PI electrolyte membrane displayed excellent thermal stability due to the high ceramic loading. The shape was retained until temperatures ranging from 190° C. to 200° C., at which point only 3% to 5% dimensional shrinkage was observed. This characteristic satisfies the US Advanced Battery Consortium's ("USABC") goal for thermal shrinkage of battery separators (less than 5% at 200° C.).

Figure 73:
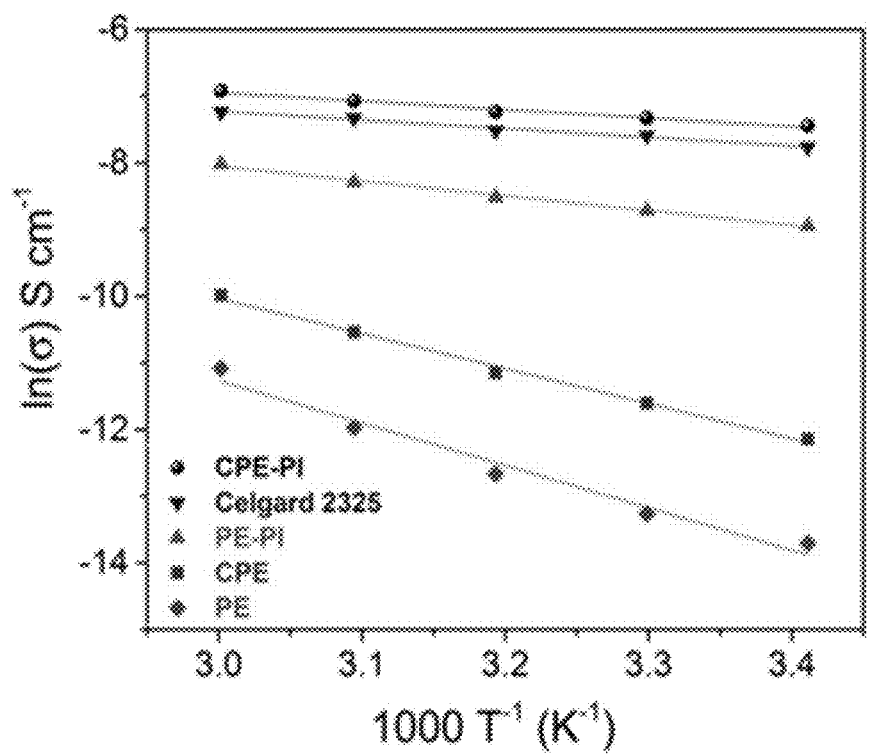
FIG. 73 is a graphical representation comparing temperature-dependence of ionic conductivity for electrolyte membranes prepared in accordance with embodiments of the present invention to a corresponding membrane comprising commercially-available CELGARD 2325.

FIG. 73 graphically illustrates the temperature-dependence of ionic conductivity for the electrolyte membranes and the commercially-available CELGARD 2325. The activation energy for composite electrolyte membrane comprising CPE-PI was similar to that of CELGARD 2325 (10.6 kJ/mol vs. 10.8 kJ/mol, respectively), which corroborates with how well the composite electrolyte performed over the range of C-rates tested (refer to Example 18, below). As such, the mechanism of ionic conduction may involve the diffusion of solvated ions in the liquid electrolyte and may be the same for the CELGARD 2325 and CPE-PI. Electrolyte membranes comprising PE or CPE demonstrated the highest activation energies (52.9 kJ/mol and 43.7 kJ/mol, respectively) and lowest ionic conductivity. The low ionic conductivity may be attributed to an ionic conduction mechanism in which ions migrate via the structural relaxation of polymer chains Finally, the activation energy achieved by electrolyte membranes comprising PE-PI fell between the aforementioned membranes. Given the bimodal pore structure of the electrolyte membrane comprising PE-PI, consisting of both large and small, cellular pores (see, FIG. 66B), it is probable that both ionic conduction mechanisms were invoked.

EXAMPLE 18

Half-cells having composite electrode or electrolyte membranes comprising $LiFePO_4$ or $Li_4Ti_5O_{12}$ were cycled using a Maccor series 4000 battery test system for investigating cycling stability at a constant C/5 current rate between 2.0 V to 4.3 V and 1.0 V to 2.1 V vs. $Li/Li^+$, respectively. The rate studies were carried out in a similar manner, with each half-cell tested for five cycles at C/5, C/2, 1C, 2C, 5C, and repeat of C/5. All C-rates were calculated with 1C being defined as 170 mA/g and 175 mA/g for $LiFePO_4$ and $Li_4Ti_5O_{12}$, respectively.

The conductivity cells consisted of two parallel, stainless steel blocking electrodes and a membrane (A=2.85 cm$^2$) soaked with liquid electrolyte. Cells were allowed to age for at least 8 hr in order to activate the membrane before measurements were recorded. Temperature was controlled by a Tenney environmental chamber and recorded with a k-type thermocouple. The ionic conductivity was measured every 10° C. from 20° C. to 60° C. The conductivity cells were allowed to equilibrate for 1 hr at each temperature before the next measurement was recorded. Measurements were performed with a Gamry Reference 3000 at open circuit potential by applying an AC-amplitude of 5 mV over a frequency range from 1 Hz to 1 MHz. The ionic conductivity was calculated according to Equation 3:

$$\sigma = \frac{t}{R_b \times A} \quad \text{EQUATION 3}$$

where t, $R_b$, and A are thickness (cm), bulk resistance (Ω), and area (cm$^2$) of the sample, respectively. Symmetric Li/electrolyte/Li cells for dendritic failure testing were prepared in 2325 coin cells. Electrolyte membranes (12.7 mm diameter) were saturated with liquid electrolyte (1 M $LiPF_6$ in 1/1 EC/DEC by wt.) and placed between 10.0 mm diameter Li foil discs. After aging for 8 hr, lithium metal plating/stripping was achieved by alternating a +0.15 mA/cm$^2$ current density (about C/5 rate) for 4.5 hr with a 30 min rest between.

Figure 74:
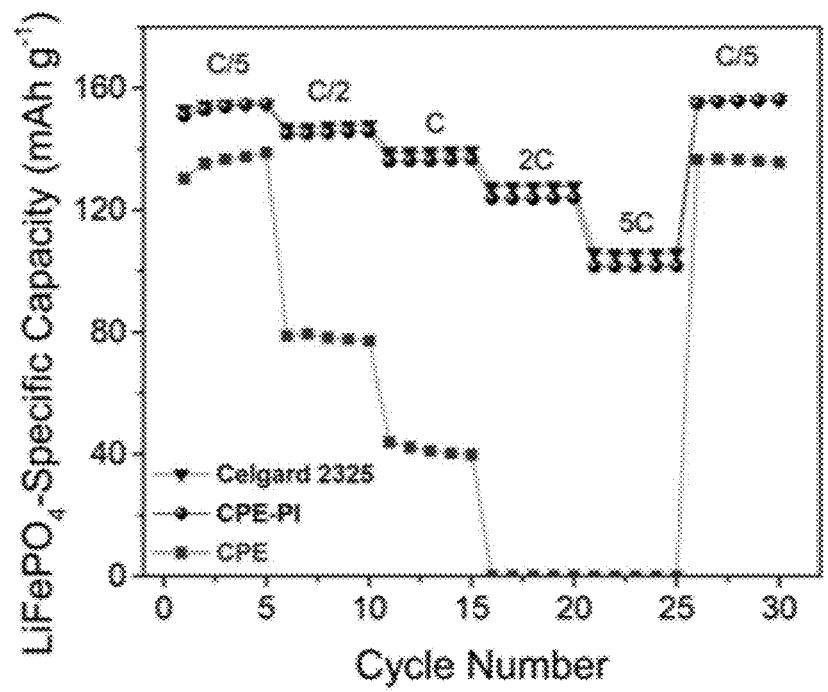
FIGS. 74 and 75 are graphical representations of rate performance and corresponding voltage profiles for composite electrolyte membranes prepared in accordance with embodiments of the present invention as compared to commercially-available CELGARD 2325.
Figure 75:
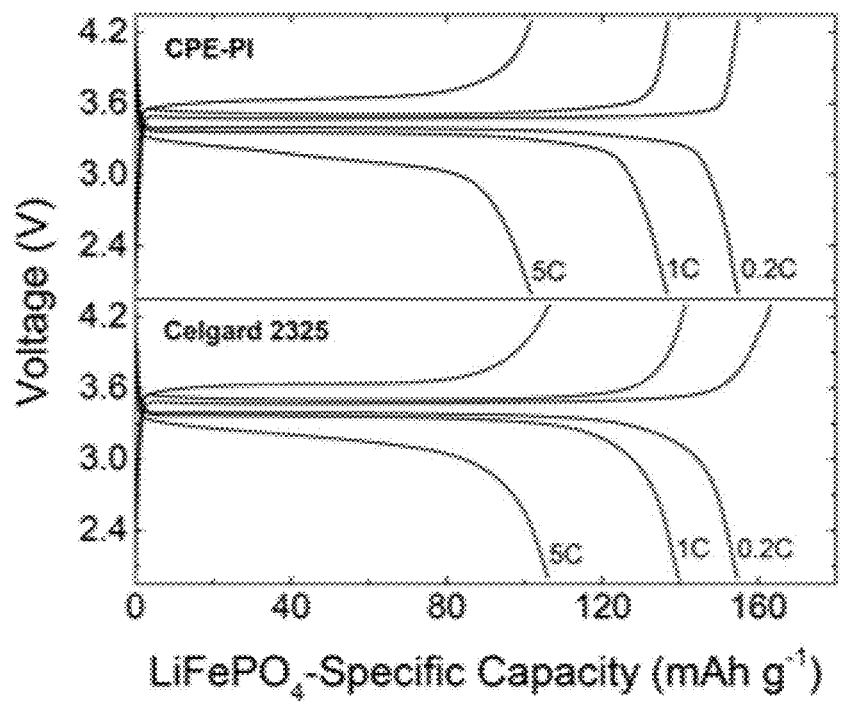

The electrochemical performances of the electrolyte membranes prepared in Example 16 in half-cell configurations using a CC-embedded 40/40/20 $LiFePO_4$/CNF/PVDF electrode (Example 8) were evaluated. The rate performances and corresponding voltage profiles (FIGS. 74 and 75) suggest that electrolyte membranes comprising CPE-PI promoted $Li^+$ diffusion kinetics to the same extent as the commercially-available CELGARD 2325. Both displayed very stable capacities at each C-rate (e.g., 156 mAh/g and 102 mAh/g at C/5 and 5C, respectively, for CPE-PI), as well as flat voltage profiles. This excellent performance directly supports the hypothesis that $Li^+$ diffusion may readily occur through the voids between neighboring $Al_2O_3$ particles. In contrast, half-cells with electrolyte membranes comprising CPE exhibited severely limited rate performance and, in fact, zero capacity at 2C and 5C. This shortfall in rate performance was attributed to PVDF occupying voids and coating the $Al_2O_3$ particles, therefore inhibiting transport.

Figure 76A:
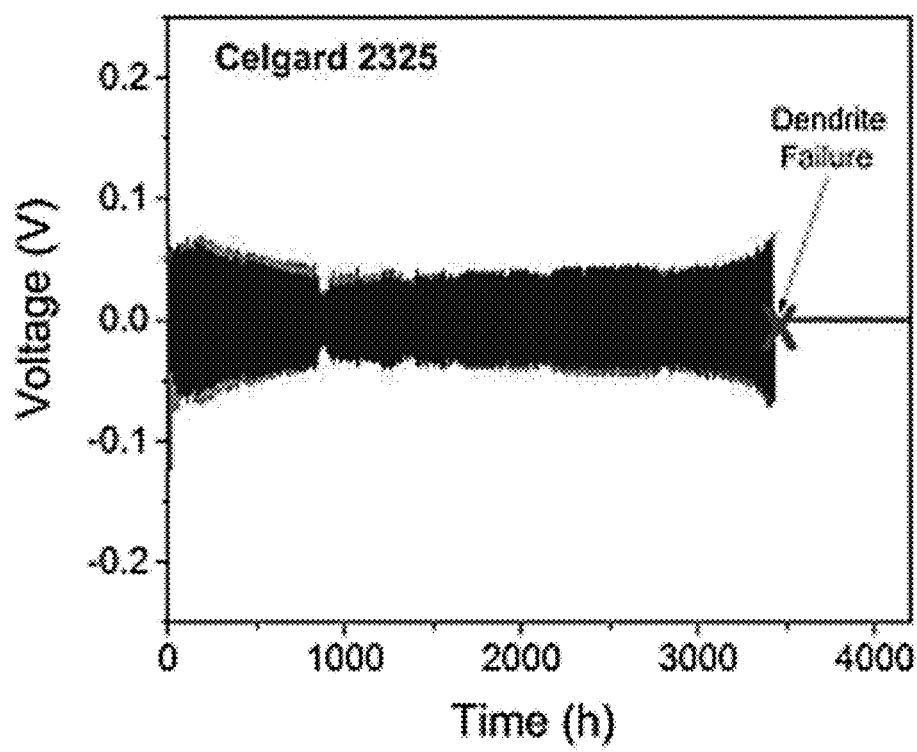
FIGS. 76A-76E are a graphical representation comparing electrical performance and dendritic failure of electrolyte membranes prepared in accordance with embodiments of the present invention as compared to commercially-available CELGARD 2325.
Figure 76B:
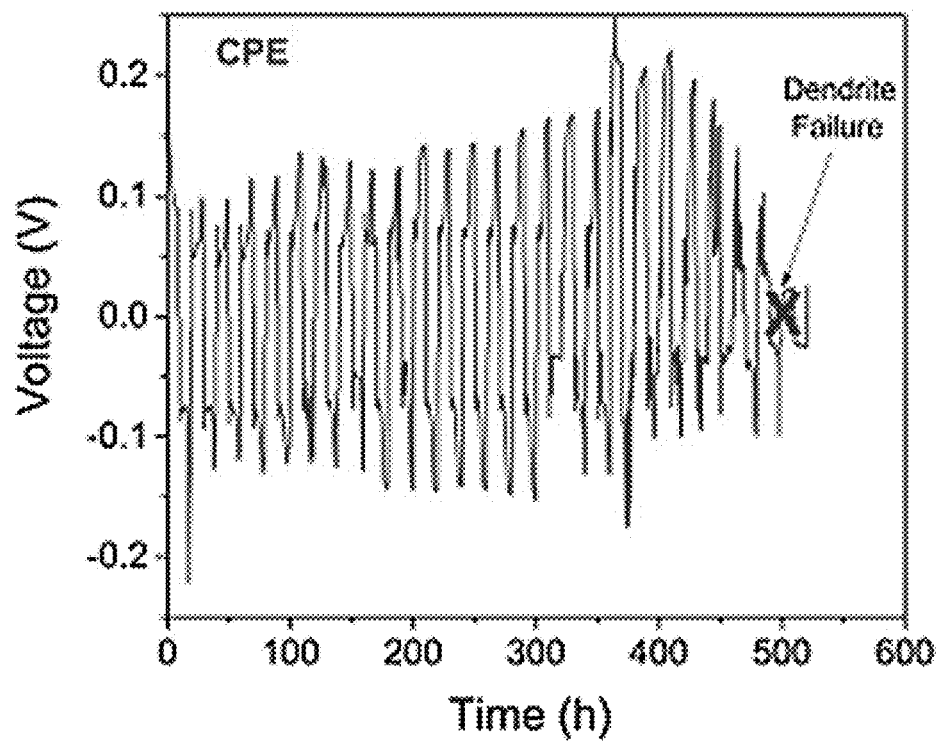
Figure 76C:
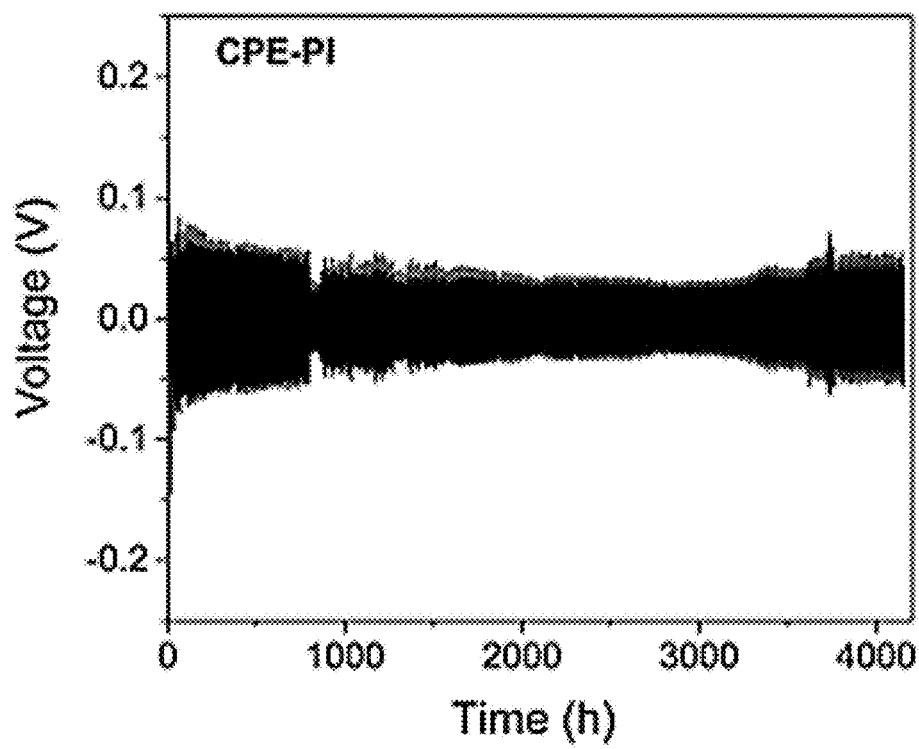
Figure 76D:
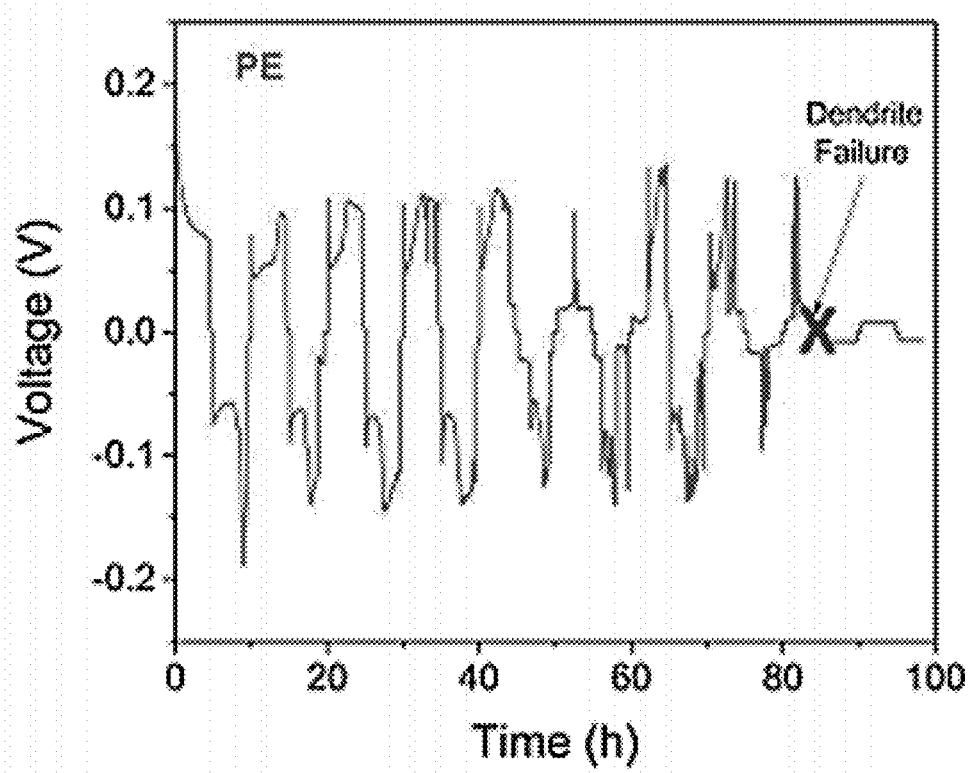
Figure 76E:
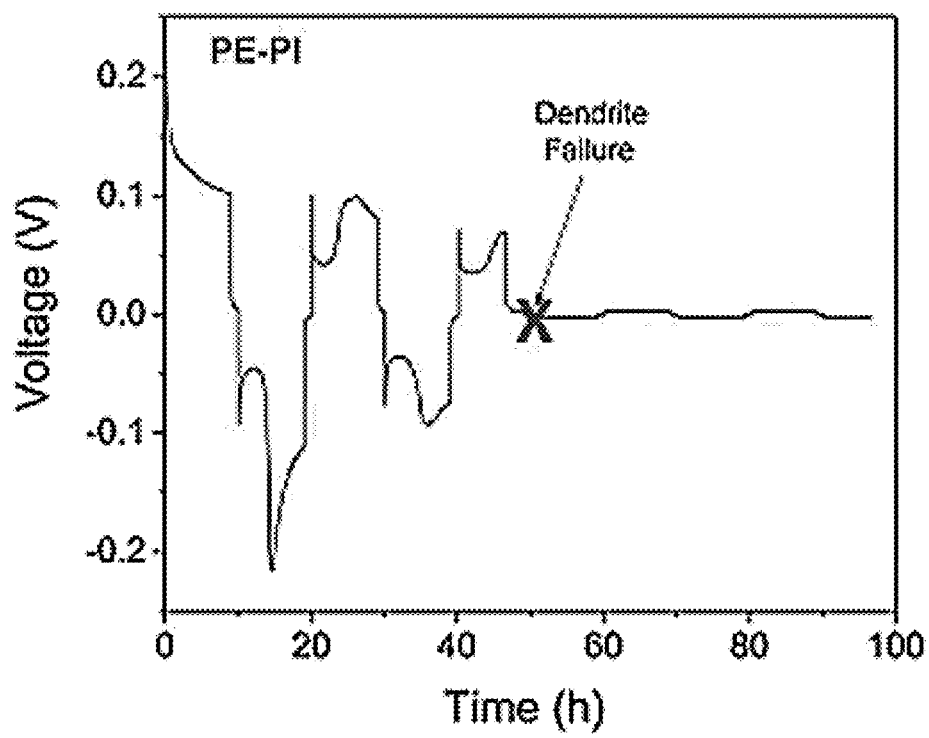

FIGS. 76A-76E illustrate functionality of various electrolyte membranes. In particular, electrolyte membranes comprising PE-PI (FIG. 76E) did not function properly as a battery electrolyte. Although highly porous, the electrolyte membranes comprising PE-PI often failed as a result of electrical shorting, likely due to dendritic lithium growth through the large pores. To better assess the risk of dendrite formation through each of the electrolytes prepared, symmetric Li/electrolyte/Li cells were prepared and subjected to constant lithium metal plating/stripping test using an alternating ±0.15 mA/cm$^2$ current density (about C/5 rate). During the test, PVDF films (PE and PE-PI, FIGS. 76D and 76E, respectively) failed within 85 hr. The addition of $Al_2O_3$ impeded dendritic failure in both CPE and CPE-PI, but the former failed at 500 hr (FIG. 76B), whereas the latter functioned without failure throughout a duration of the test (more than 4000 hr, FIG. 76C). One potential explanation for the better dendrite suppression and safety of CPE-PI over CPE may be enhanced $Al_2O_3$ dispersion leading to better tortuosity and more uniform current flow. CELGARD 2325 exhibited failure after about 3400 hr (FIG. 76A).

Figure 77:
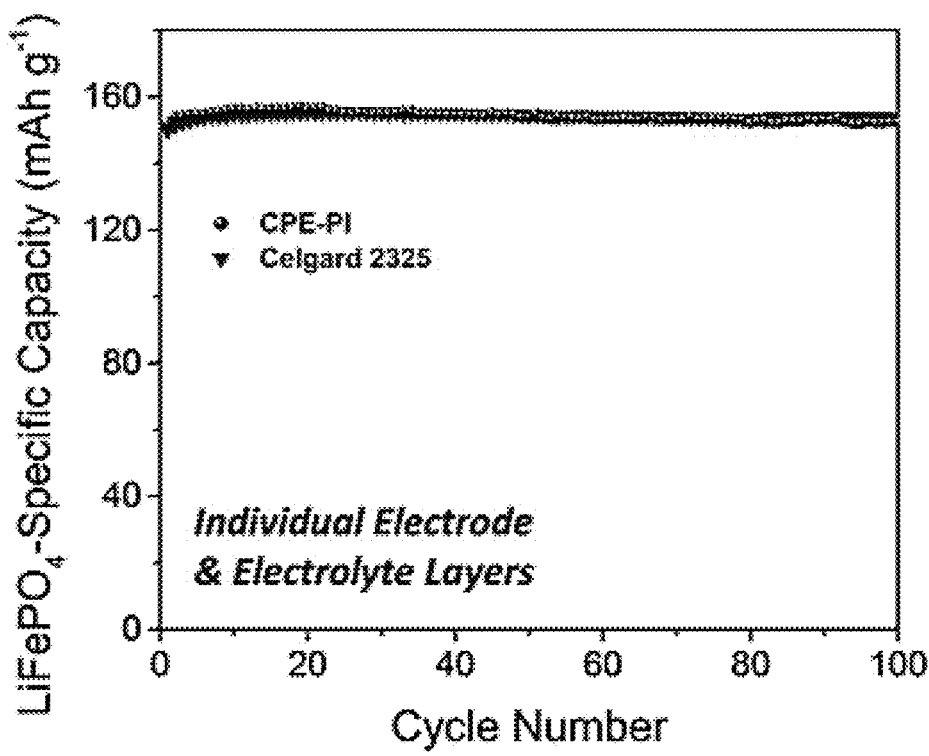
FIG. 77 is a graphical representation comparing electrochemical performance of composite electrolyte membranes prepared in accordance with embodiments of the present invention to a corresponding membrane comprising CELGARD 2325 over 100 cycles at a C/5 current rate.

The electrolyte membranes comprising CPE-PI were tested for 100 cycles at a C/5 current rate, which is graphically illustrated in FIG. 77. This electrolyte membrane maintained comparable performance to the commercially-available separator throughout the duration of the test, highlighting its excellent stability as a potential high performance printable electrolyte.

Wettability of electrolyte membranes comprising CPE-PI and a commercially-available separator were compared by applying the same amount of liquid electrolyte thereon. The electrolyte membrane showed near complete wet-out within 30 min; the commercially-available separator did not wet beyond the initial application site. From a commercial point-of-view, good wettability may shorten the electrolyte filling step during assembly and extend the battery's lifetime, whereas poor wettability may do the exact opposite by increasing the internal ionic resistance.

EXAMPLE 19

Printed electrode membrane assembly ("PEMAs") were prepared by printing a composite electrolyte (Example 8), surrounding the printed composite electrode with a collar of the composite electrolyte (Example 14), and covering the collared electrode-electrolyte with at least one layer of the composite electrolyte (Example 14). Challenges in PEMA fabrication arose from the inherent roughness of the dried electrode ink, which had a surface roughness of over 10 μm. This required the composite electrode ink to be dispensed above the highest feature, causing an uneven surface-to-nozzle distance. However, the higher boiling point solvent and the moderate viscosity of the composite electrolyte ink permitted leveling prior to drying. Printed electrolytes and PEMAs were fully dried under vacuum at 120° C., overnight, before use.

Figure 78:
FIG. 78 is a scanning electron microscopy image of a composite electrolyte membrane comprising CPE-PI over a composite cathode comprising $LiFePO_4$.
Figure 79:
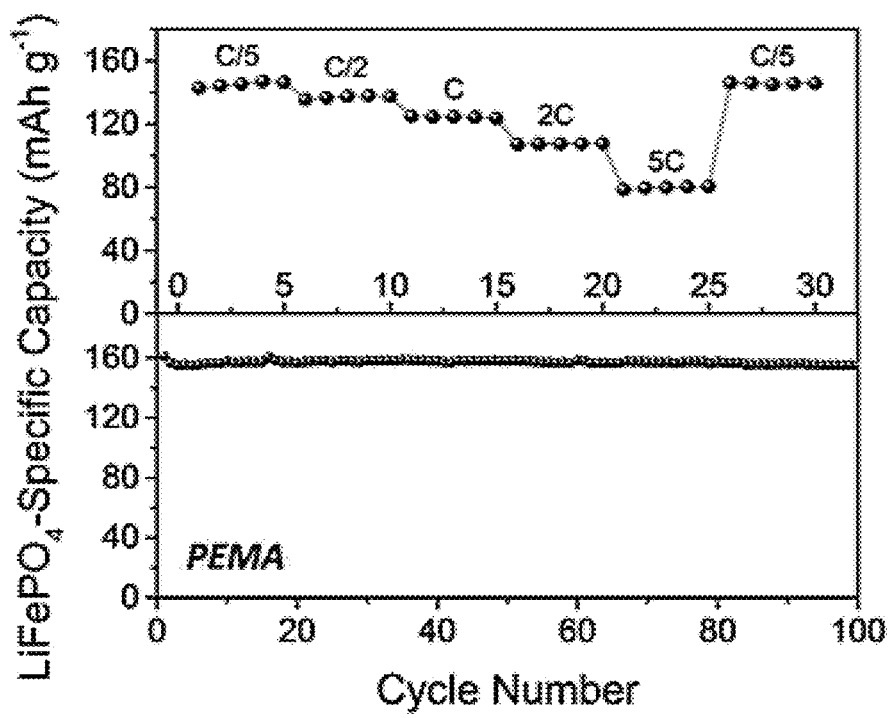
FIG. 79 is a graphical representation of electrochemical performance of composite electrolyte comprising PEMA as it conforms to a porous, composite electrode.

In route to batteries fabricated exclusively by an additive manufacturing process, a PEMA was prepared by depositing a composite electrolyte membrane comprising CPE-PI directly over a composite cathode comprising $LiFePO_4$. From SEM images (exemplary image provided in FIG. 78), it was clear that sequential printing gave rise to a tight and continuous interface between the composite electrode and the composite electrolyte membrane. The printing process allowed some of the composite electrolyte ink to diffuse into the porous, composite electrode, leading to excellent interfacial adhesion. This finding is highly desirable because interlayer contact is the key for discharge voltage stability under mechanical abuse, such as bending or creasing. The phase inversion process used to develop the composite electrolyte membrane is imperative in achieving a high performance PEMA. When the composite electrolyte membrane conforms to the porous, composite electrode (specifically here, the cathode), the porosity of the underlying layer is maintained and the electrochemical performance, as shown in FIG. 79, is similar to when each layer (composite electrode versus composite electrolyte membrane) was used separately (see FIGS. 75 and 77). On the contrary, the PEMA performance suffers when the composite electrolyte membrane is printed from good solvent alone. For example, when a composite electrolyte membrane comprising pure poly(vinylidene fluoride-co-hexafluoropropylene) (PVDF-HFP) was printed directly over a composite electrode comprising PVDF-HFP, the assembly only achieved expected capacity at very low current rates (about C/20).

Figure 80:
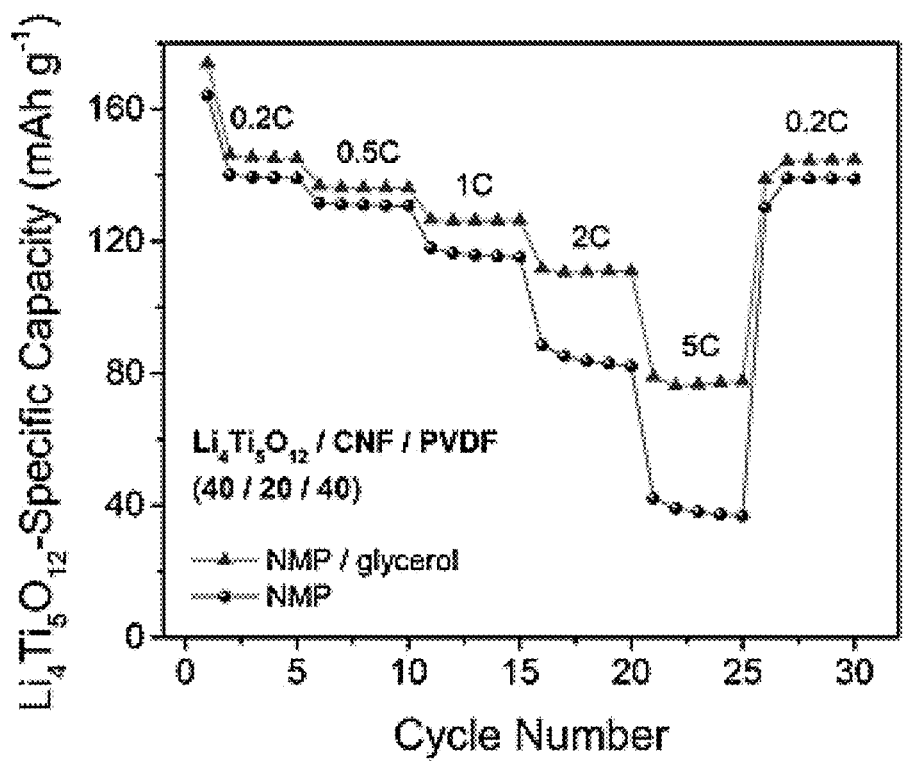
FIGS. 80 and 81 are graphical representations illustrating changes in capacity and mechanical properties of composite electrodes prepared in accordance with embodiments of the present invention with the addition of glycerol.
Figure 81:
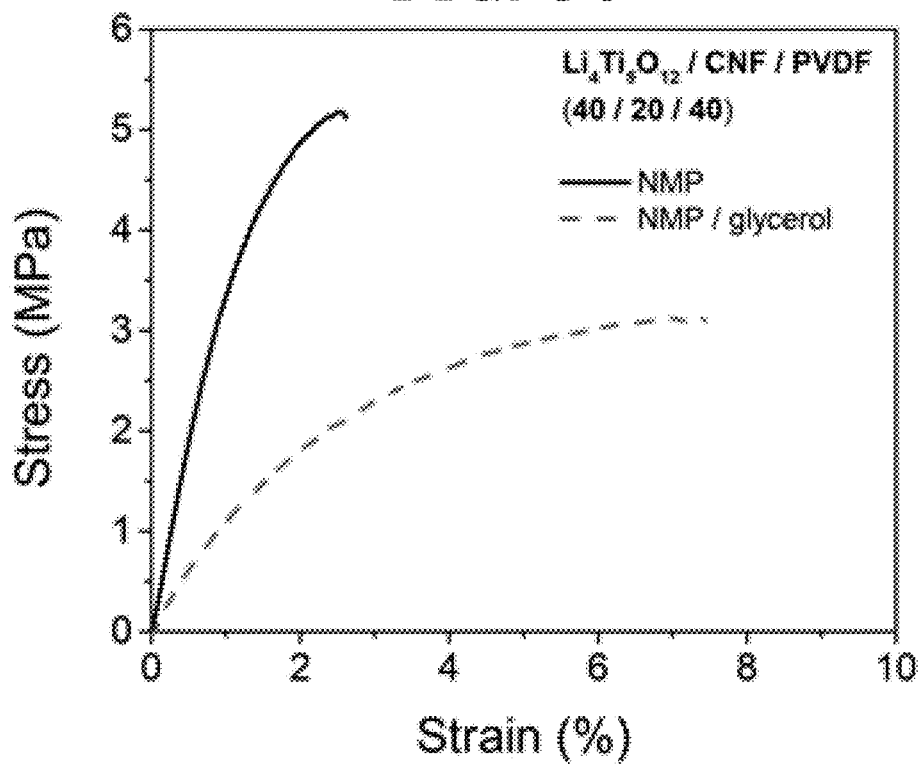
Figure 82:
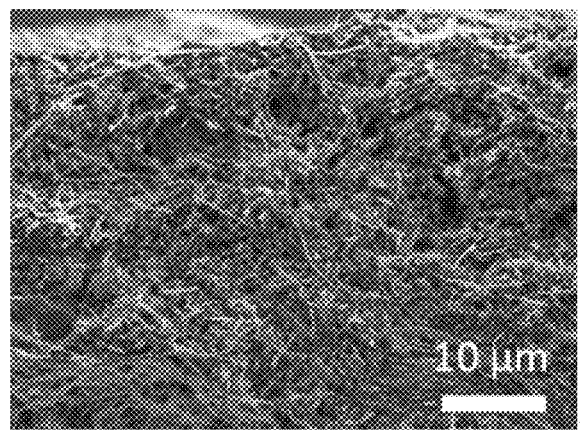
FIGS. 82 and 83 are cross-sectional scanning electron microscopy images of composite electrodes, with and without the addition of glycerol, prepared in accordance with embodiments of the present invention.
Figure 83:
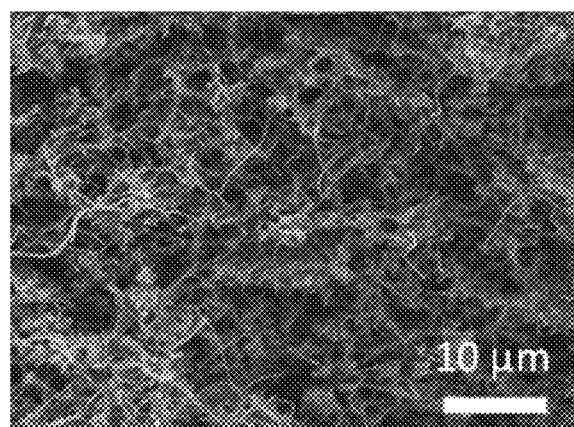

The dry phase inversion approach used to prepare high performance electrolytes in Example 14 was also directly amenable to printable electrode inks. When only NMP was used, a composite electrode comprising 40/20/40 $Li_4Ti_5O_{12}$/CNF/PVDF displayed a sharp drop off in both 2C and 5C performances. FIG. 80 graphically illustrates that the addition of 5 wt % glycerol led to increased capacity at all C-rates tested and significantly improved high rate performance. Additionally, FIG. 81 graphically illustrates that the phase inversion process had a significant impact on mechanical properties. The composite electrode prepared from only NMP was relatively stiff with a low strain-to-failure. Composite electrodes comprising $Li_4Ti_5O_{12}$ prepared via the phase inversion process displayed a decrease in tensile strength but exhibited a 3-times increase in ductility over its NMP only counterpart. The increased ductility for these composite electrodes led to a higher degree of flexibility without failure, making them more suitable for applications in flexible electronics. Both the improved electrochemical performance and enhanced ductility can be explained by the increased porosity afforded by the phase inversion process. When using only good solvent, a dense cross-section with limited visible pores was observed in the SEM image (FIG. 82). This dense morphology blocks active material and potential $Li^+$ diffusion pathways, which can explain the poor high rate performance. Conversely, when the same composites included 5 wt % glycerol, noticeable voids formed throughout, which that facilitated $Li^+$ diffusion and allowed better access to the active material (FIG. 83).

EXAMPLE 20

High-temperature Li-ion batteries, according to embodiments of the present invention, were prepared and investigated. $LiFePO_4$ was purchased from either MTI Corp. or BASF. $Li_4Ti_5O_{12}$ and commercially-available graphite electrodes on copper foil were purchased from MTI Corp. CNFs, commercially-available as PYROGRAF-III (PR-19-HT), were supplied by Applied Sciences, Inc., and graphite was purchased from Asbury Graphite Mills (Ashbury, N.J.) (HPM 850 powder). KYNAR HSV 900 PVDF was supplied by Arkema, Inc. $Al_2O_3$ powder (diameters ranging from 40 nm to 50 nm) were purchased from NanoDur through Alfa Aesar. LiTFSI, NMP, glycerol, PC, and EC were purchased from Sigma Aldrich Co. 1-methyl-1-propylpyrrolidinium TFSI ("[MPPyr][TFSI]") was purchased from IoLiTec, Inc. Conventional liquid electrolyte (LP40, 1 M $LiPF_6$ in 1/1 EC/DEC by wt.), LiBOB, and VC were purchased through BASF.

CPE-PI ink was prepared by dissolving 0.863 g PVDF in 15 mL NMP and 0.64 mL glycerol (95/5 w/w). 2.015 g $Al_2O_3$ (70/30 $Al_2O_3$/PVDF w/w) was added and bath sonicated for 3 hr using a Branson 22510 bath sonicator. The ink was then suitable for casting or printing. CPE-PI membranes were prepared by doctor blading 3 mL of ink on glass using an adjustable film applicator (MTI Corp.) with an 800 μm height and dried, overnight, at 90° C. under nitrogen. The CPE-PI membranes were then dried, under vacuum, at 120° C. overnight.

Composite electrodes constructed from 40/40/20 active material/CNF/PVDF by wt % were prepared by dissolving 50 mg PVDF in 5 mL NMP. 100 mg CNFs were added and probe sonicated for 1 min at 17% amplitude using a Sonics Vibra-Cell VCX 750 Probe Sonicator with a 0.25 in microtip. 100 mg active material was added and the mixture sonicated for 10 min. The mixtures were shaken by hand throughout sonication. Finally, the mixtures were transferred to a 6 cm diameter PTFE dish and dried at 90° C. Once NMP was evaporated, the samples were dried, overnight, under vacuum at 120° C.

$LiFePO_4$ cathodes with active loading (ranging from 13 $mg/cm^2$ to 15 $mg/cm^2$) were prepared on aluminum foil using a ratio of 75/20/5 $LiFePO_4$/graphite/PVDF by wt %. 56.7 mg PVDF (dissolved in NMP) was combined with 226.7 mg graphite and ground using a mortar and pestle. 850 mg $LiFePO_4$ was added and the mixture was again ground using a mortar and pestle for 10 min. The slurry was transferred to an 8×8 $cm^2$ area on aluminum foil. The coating was dried under vacuum at 90° C. until NMP evaporated, and then under vacuum at 120° C. overnight.

Electrolyte membrane samples (19 mm diameter discs) were punched from the doctor bladed CPE-PI membranes; thicknesses of the electrolyte samples ranged from 50 μm to 90 μm. Composite electrode samples (9.5 mm diameter discs) were punched from the cast mixtures; weights of $Li_4Ti_5O_{12}$ and $LiFePO_4$ of samples ranged from 1.5 mg to 3.0 mg, corresponding to sample thicknesses ranging from 100 μm to 200 μm as measured by a Mitutoyo digital micrometer. Foil-based graphite/Cu or $LiFePO_4$/Al electrodes were punched to 12.7 mm diameter discs with active loading ranging from 5.5 mg/cm$^2$ to 5.8 mg/cm$^2$ for graphite and from 13 mg/cm$^2$ to 15 mg/cm$^2$ for $LiFePO_4$.

Liquid electrolyte solutions comprising 1 M LiTFSI solutions were prepared by adding 0.4 g LiTFSI to 1.09 mL PC or RTIL and stirring overnight at 50° C. under argon. 1 M LiBOB in 1/1 EC/PC (v/v) was prepared by adding 0.252 g LiBOB to 0.545 mL of EC and 0.545 mL of PC under argon. The mixture was stirred at 120° C. until dissolved. Optionally, 5 wt % VC relative to EC and PC (0.053 mL) was added, which may aid in SEI formation and cell reliability.

Figure 84:
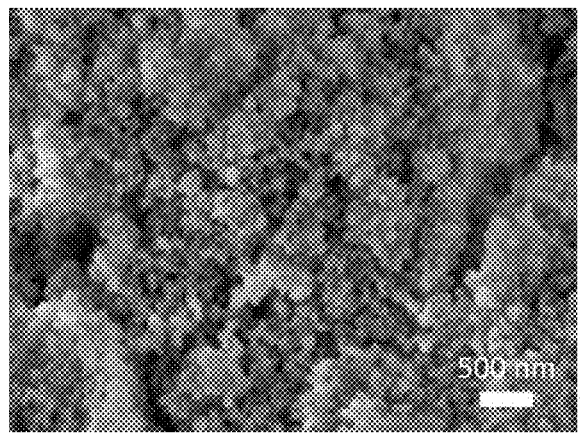
FIG. 84 is a cross-sectional scanning electron microscopy image of an electrolyte after cryo-fracturing samples while immersed in liquid nitrogen.

FIG. 84 is a cross-sectional SEM image of the electrolyte acquired using an FEI Quanta 600F SEM after cryo-fracturing samples while immersed in liquid nitrogen. The sample was coated with a conductive 10 nm iridium coating to avoid charging artifacts and imaged using a 5 kV accelerating voltage.

Cells for electrochemical cycling were prepared under argon environment (less than 1 ppm $H_2O$ and $O_2$) in 2325 coin cell configurations. CPE-PI or CELGARD 2325 films were infiltrated with either 1 M LiTFSI in PC, 1 M LiTFSI in [MPPyr][TFSI], or 1 M LiBOB in 1/1 EC/PC and used as the separator. After fabrication, the coin cells were allowed to age for at least 8 hr before electrochemical cycling, so as to allow for homogeneous electrolyte wetting.

Coin cells prepared from component described in Example 20 were cycled using a Maccor series 4000 battery test system. Half-cells based on composite electrodes were assembled vs. lithium and cycled for 5 cycles at 0.17C, 0.33C, 1C, and 3C, and then for 30 cycles at 0.33C. All C-rates were calculated with 1C being defined as 170 mA/g and 175 mA/g for $LiFePO_4$ and $Li_4Ti_5O_{12}$, respectively. $LiFePO_4$ was cycled between 2.5 V and 4.0 V versus Li/Li+ at all temperatures except 120° C., where a 1.35 V to 1.8 V window was used. Foil-based electrode half-cells were assembled vs. lithium and cycled at 0.17C and 0.33C using a voltage window ranging from 2.5 V to 4.0 V for $LiFePO_4$ and from 0.01 V to 1.0 V for graphite. Foil-based graphite// $LiFePO_4$ full-cells were cycled between 2.5 V and 4.0 V at rates of 0.17C, 0.33C, and 1C. All C-rates for foil-based cells were calculated using observed capacities with 1C being defined as 330 mA/g for graphite and 150 mA/g for $LiFePO_4$. An anode/cathode ratio of 1.10 was desired to avoid lithium plating on a surface of the graphite. Elevated temperature cycling was done using the Maccor battery test system with battery holders extended into an oven (Memmert Beschickung loading model 100-800) using PTFE-coated wires. For tests using the same cells at different temperatures, cycling was paused to change the temperature and the cells were permitted to equilibrate for 1 hr at the new temperature before cycling was resumed.

EXAMPLE 21

Undesirable reactions between LiTFSI and aluminum were avoided by using a CC-embedded composite electrode, such as those having 40/40/20 ratio of active material/CNF/ PVDF. While cycling at high temperatures, SEI on lithium decomposes and results in constant SEI reformation, consumption of liquid electrolyte, and increased likelihood of dendritic lithium deposition.

Figure 85A:
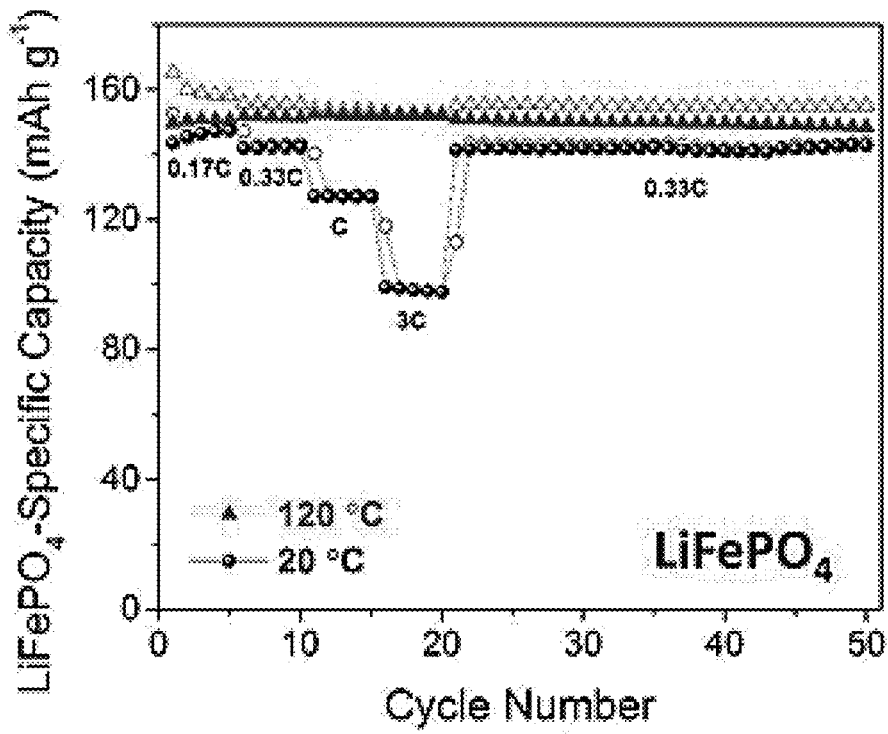
FIGS. 85A and 86A are graphical representations of electrochemical performance of $LiFePO_4$ and $Li_4Ti_5O_{12}$ composite half-cells, respectively, prepared in accordance with embodiments of the present invention at 20° C. and 120° C. using 1 M LiTFSI in PC electrolyte.
Figure 85B:
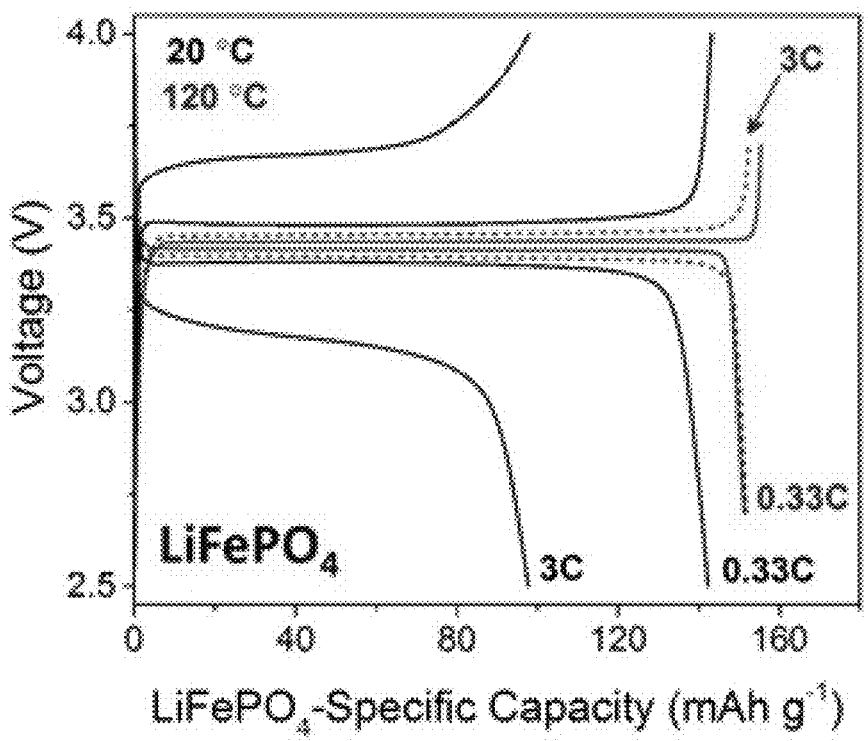
FIGS. 85B and 86B are graphical representations of charge/discharge profiles of the composite half-cells of FIGS. 85A and 86A, respectively.
Figure 86A:
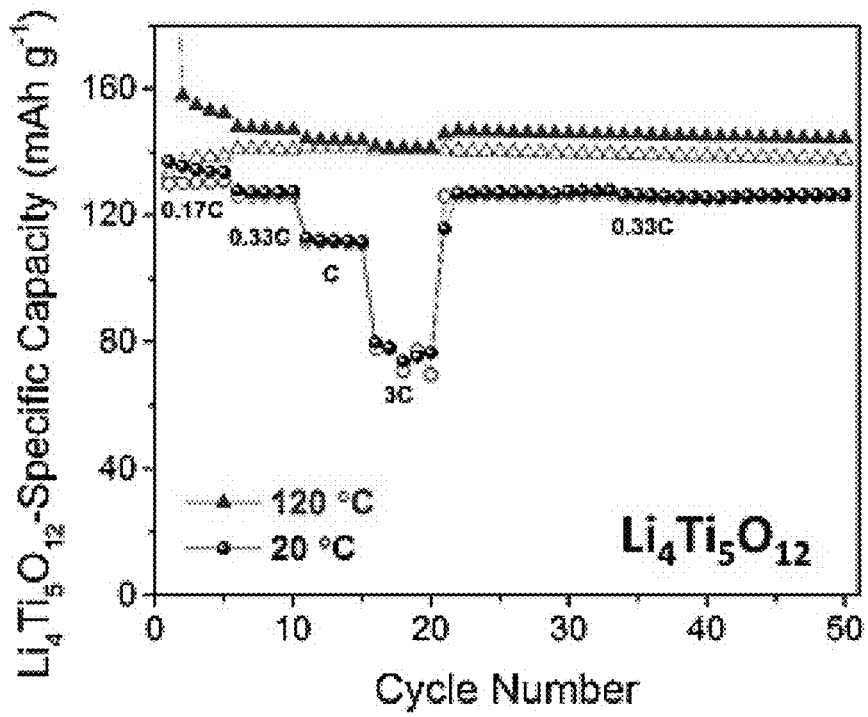
Figure 86B:
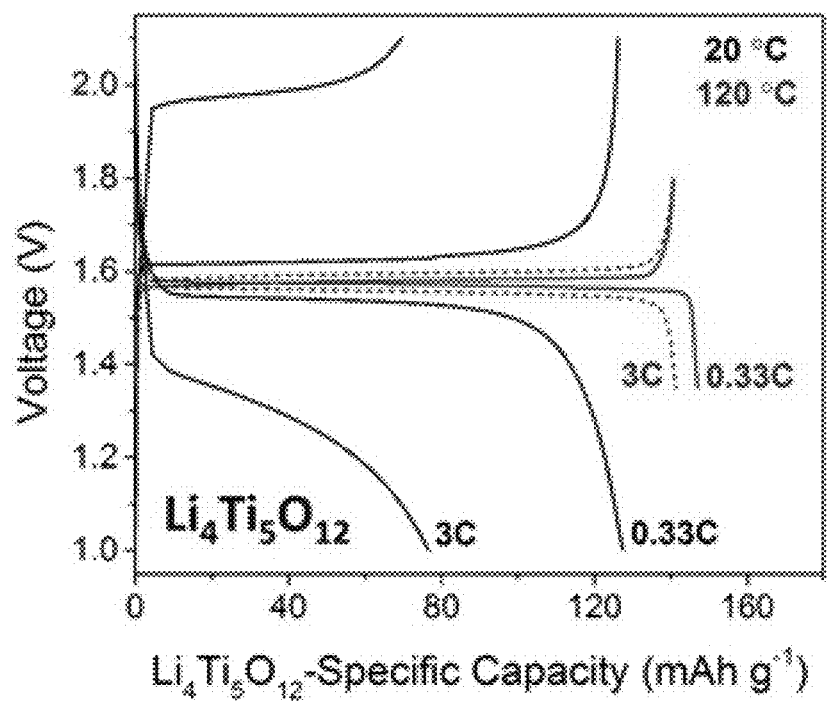

$LiFePO_4$ (FIGS. 85A and 85B) and $Li_4Ti_5O_{12}$ (FIGS. 86A and 86B) composite half-cells displayed excellent electrochemical performance at both 20° C. and 120° C. for the duration of a 50 cycle test. At 120° C., both half-cells displayed stable capacities (about 150 mAh/g) and flat voltage profiles with minimal voltage hysteresis (less than 0.06 V) at C-rates ranging from 0.17C to 3C. A difference in charge and discharge capacity at 0.33C (96% coulombic efficiency) at 120° C. may be attributed to reformation of the SEI on the lithium metal anode.

Referring still to FIGS. 85A-86B, at room temperature $LiFePO_4$ achieved 142 mAh/g and 98 mAh/g at 0.33C and 3C, respectively; $Li_4Ti_5O_{12}$ achieved 128 mAh/g and 77 mAh/g at 0.33C and 3C, respectively. Such room temperature performance greatly exceeds other Li-ion battery designs that offer operation at both room temperature and above 100° C.

Figure 87:
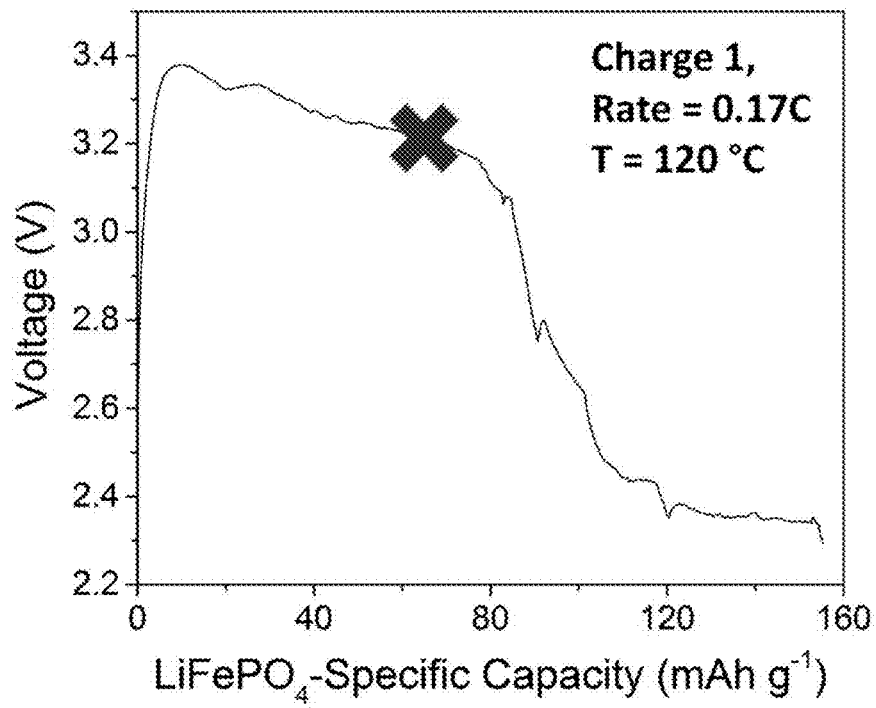
FIG. 87 is a graphical representation of the electrochemical performance of a half-cell comprising a commercially-available separator at 120° C.

Improved functionality of the composite electrolyte membrane for high temperature cycling is easily appreciated when comparing the results of FIGS. 85A-86B with data (FIG. 87) from a $LiFePO_4$ half-cell with 1 M LiTFSI in PC using a CELGARD 2325 separator. The half-cell failed on the first charge at 120° C., likely due to thermal shutdown of the pores.

EXAMPLE 22

The CPE-PI electrolyte membrane of Example 19 matrix was infiltrated with 1 M LiTFSI in [MPPyr][TFSI]. This room temperature ionic liquid ("RTIL") possesses low viscosity, high ionic conductivity, and has been shown to have potential as a high temperature Li$^+$ transport medium. $LiFePO_4$ composite electrode half-cells were then prepared with this RTIL electrolyte and electrochemically cycled from room temperature to 120° C.

Figure 88A:
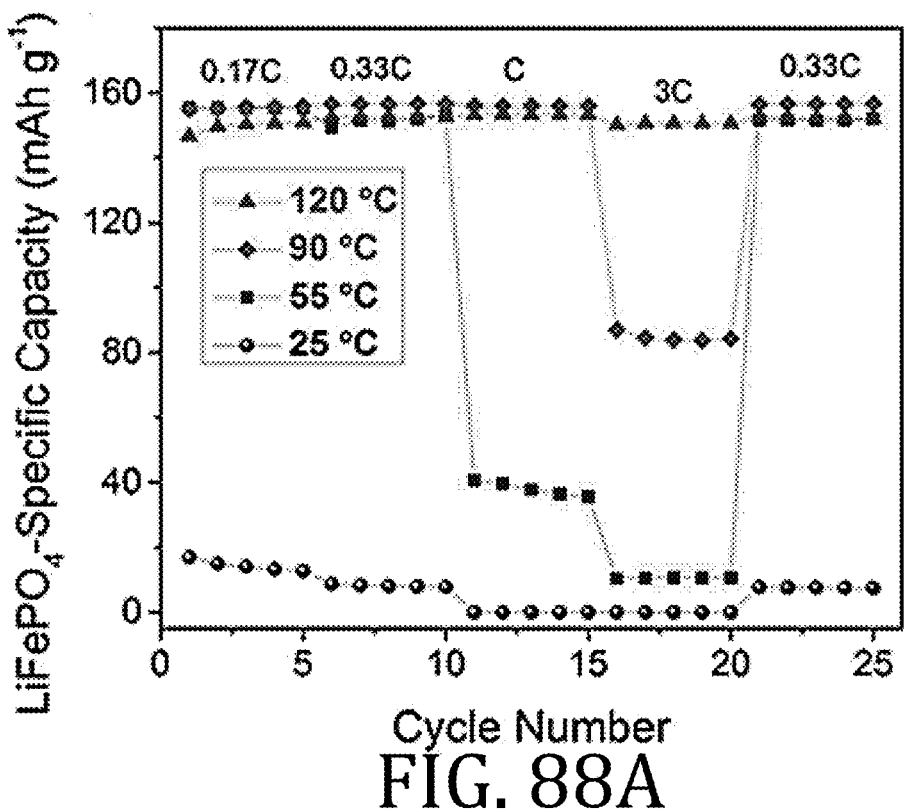
FIGS. 88A and 88B are graphical representations of electrochemical performance of $LiFePO_4$ half-cells prepared in accordance with embodiments of the present invention, operating at temperatures ranging from 25° C. to 120° C., using a room temperature ionic liquid electrolyte.
Figure 88B:
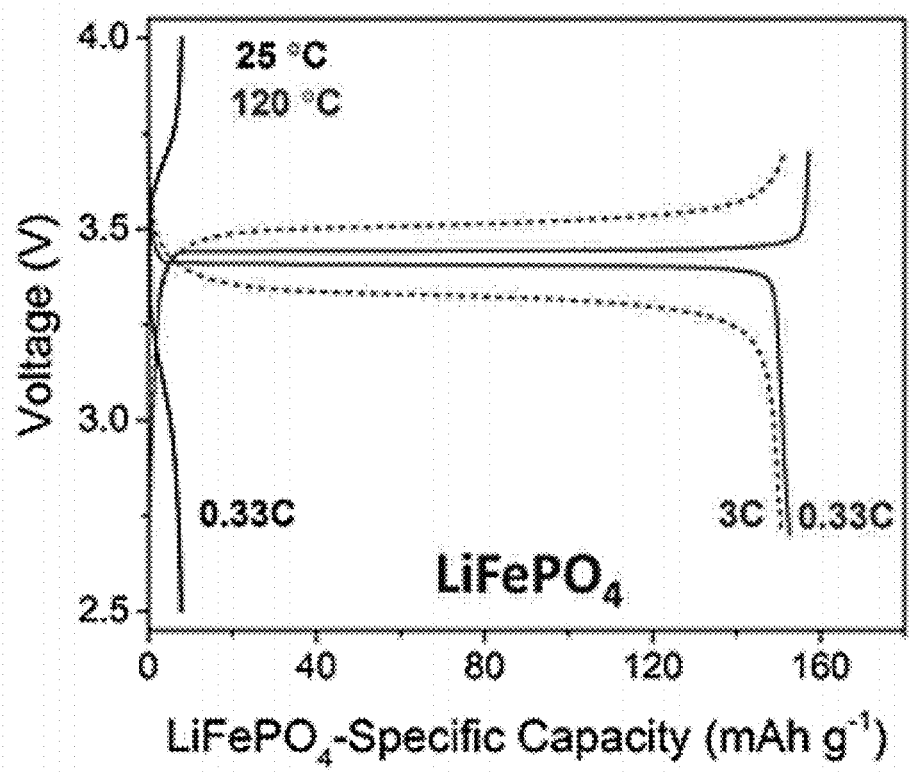

FIGS. 88A and 88B illustrates the electrochemical performance of the half-cells. At 25° C., the half-cell displayed very poor capacity (less than 20 mAh/g) at all rates tested. When the temperature increased to 55° C., the capacity increased to about 150 mAh/g at low rate (0.33C), but quickly dropped to less than 40 mAh/g at higher current rates. The half-cell exhibited excellent rate performance at 90° C. and 120° C. with 3C capacities of 84 mAh/g and 151 mAh/g, respectively. Thus, when the CPE-PI matrix was infiltrated with an RTIL Li$^+$ transport medium, good low rate performance was achieved at temperatures slightly above room temperature and excellent high rate performance was achieved at temperatures above 90° C.

EXAMPLE 23

Because full-cells prepared using LiTFSI in PC were unable to achieve one full charge (such as the $LiFePO_4$// $Li_4Ti_5O_{12}$ cells), alternative electrode and electrolyte formulations were evaluated. As to electrolyte, a similar cell (using a commercial graphite anode on copper) was prepared with 1 M LiBOB in PC/EC 1/1 v/v and 5% VC as the electrolyte. Both EC and PC have boiling points over 240° C., are thermally stable at the elevated temperatures tested. LiBOB, EC, and VC help to form a stable SEI on graphite anodes and the low melting point of PC (about −50° C.) keeps the electrolyte solution liquid at room temperature.

Figure 89A:
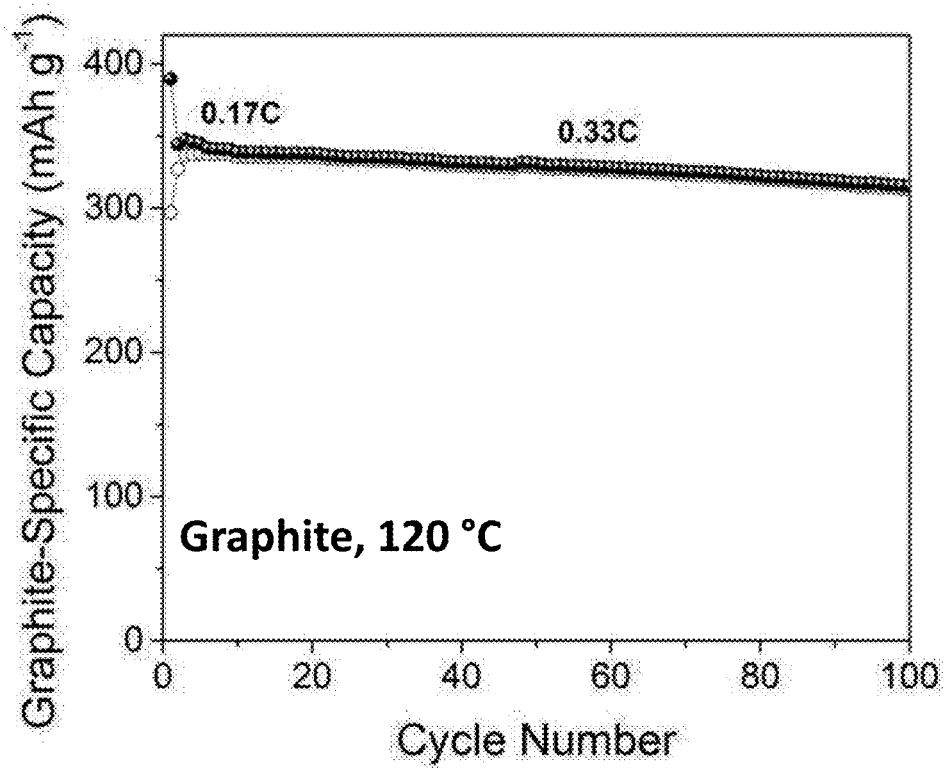
FIGS. 89A and 89B are graphical representations of electrochemical performance of a commercially-available graphite anode on copper foil anode half-cell and LiBOB-based electrolyte, according to embodiments of the present invention, at 120° C.
Figure 89B:
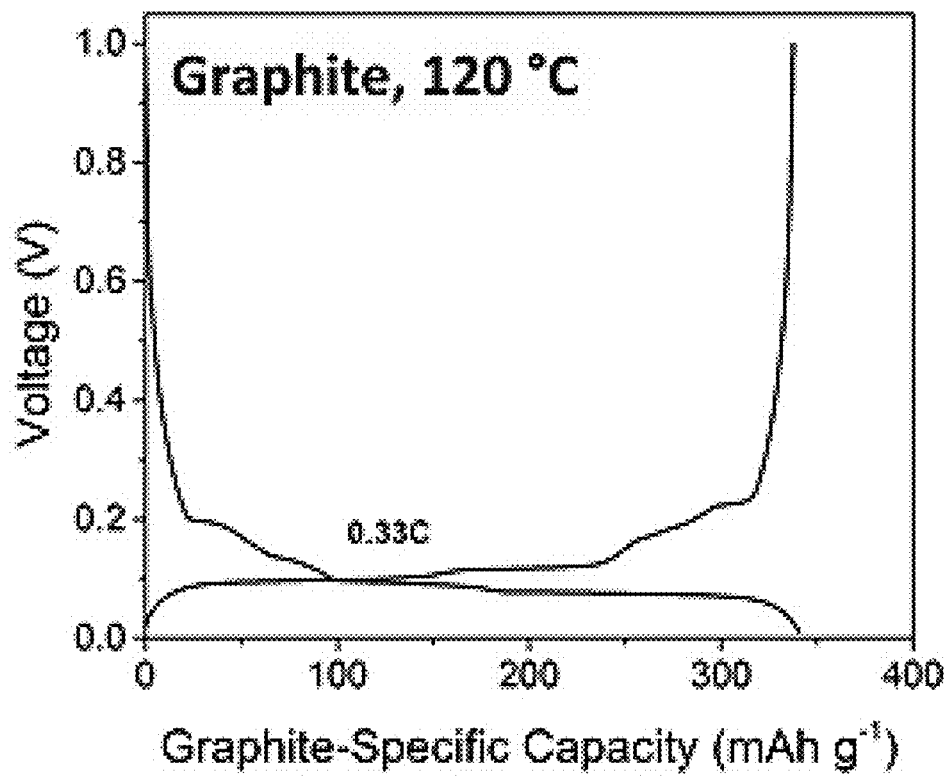

As shown in FIGS. 89A and 89B, the graphite anode half-cells displayed a reversible capacity of 340 mAh/g with excellent cyclability, which suggests that LiBOB and EC are capable of preventing graphite exfoliation (a well know problem when using PC-based electrolytes).

Figure 90A:
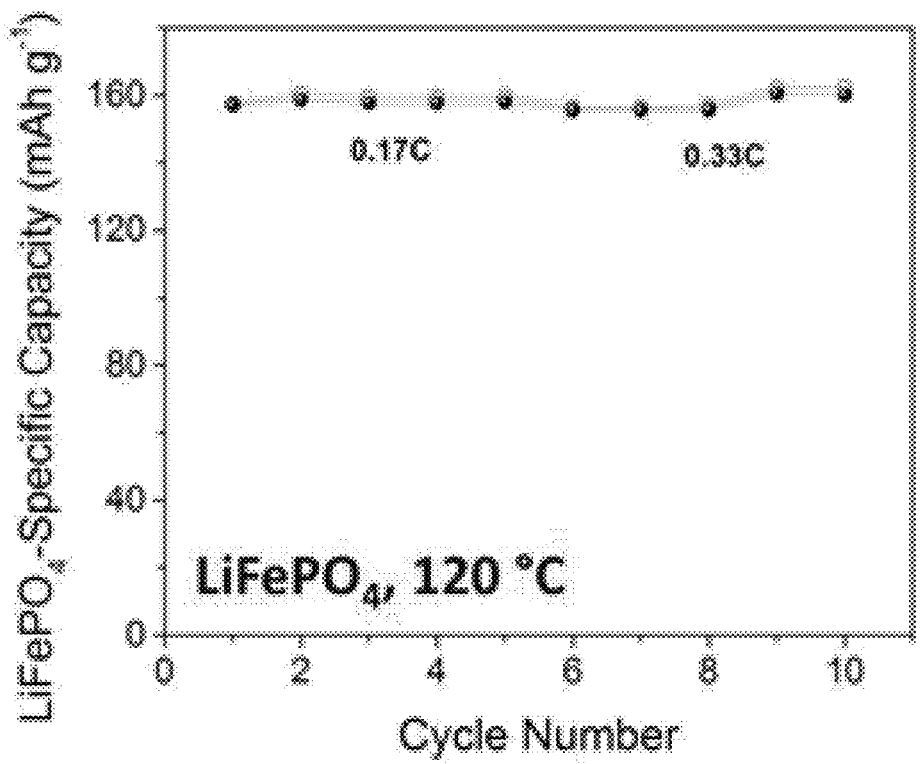
FIGS. 90A and 90B are graphical representations of electrochemical performance of a $LiFePO_4$/graphite/PVDF cathode on aluminum half-cell with the LiBOB-based electrolyte, according to embodiments of the present invention, at 120° C.
Figure 90B:
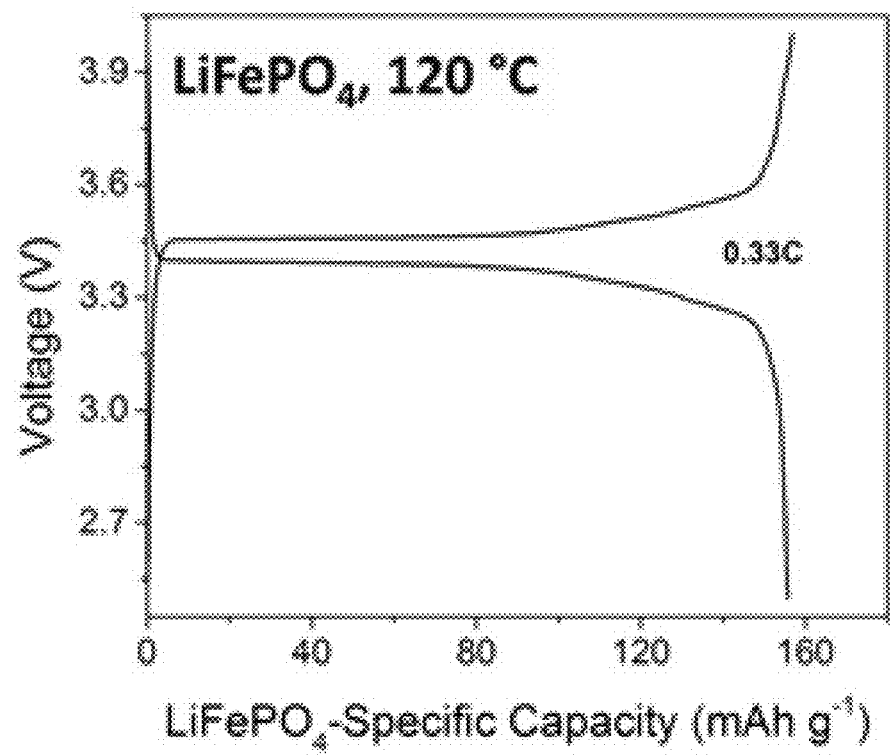

FIGS. 90A and 90B illustrate performance of the electrolyte formulation when evaluated using a 75/20/5 $LiFePO_4$/ graphite/PVDF cathode half-cell on aluminum with an active material loading on par with commercial standards. At 120° C., LiFePO$_4$ displayed very stable capacities (about 150 mAh/g) and flat voltage profiles at 0.17C and 0.33C. Graphite was used as the conductive additive for these cathodes instead of conventional carbon black due to its better compatibility with the electrolyte formulation. LiBOB salt reacts strongly with carbon black (as well as other high surface area carbons) and, thereby, electrochemically reduces onto surfaces between 1.5 and 2.2 V. Such a process results in a thick SEI layer that diminishes the electrical conductivity within the electrode, consumes Li$^+$, and destructively degrades performance.

When compared previously discussed electrolyte formulations according to other embodiments of the present invention (such as 1 M LiTFSI in PC), the LiBOB electrolyte gives rise to exceptional coulombic efficiencies (greater than 99%) for both graphite and LiFePO$_4$ half-cells, which may indicate the formation of a more stable SEI on both graphite and lithium.

Figure 91C:
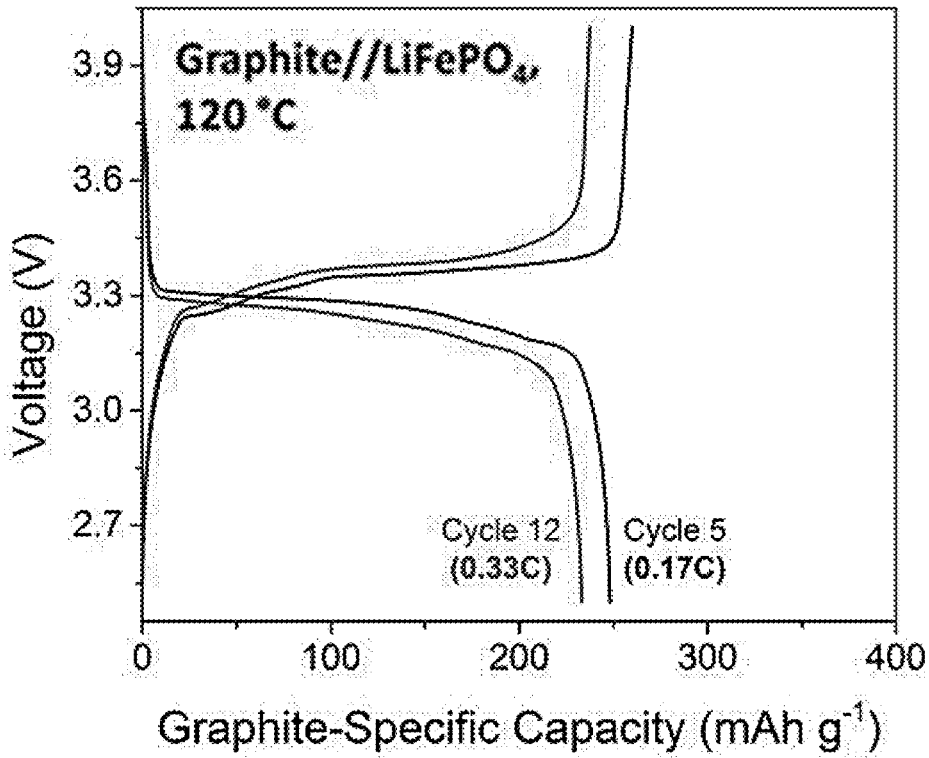
FIG. 91A-91C are graphical representations of electrochemical performance of a graphite//$LiFePO_4$ full-cell with the LiBOB-based electrolyte, according to embodiments of the present invention, at room temperature and at 120° C.
Figure 91A:
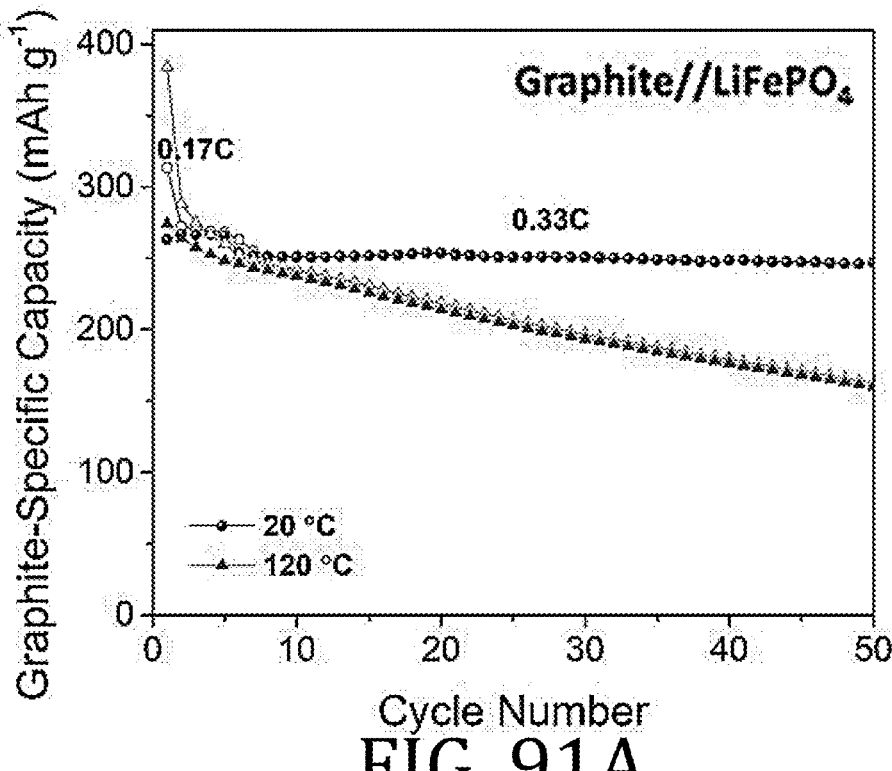
Figure 91B:
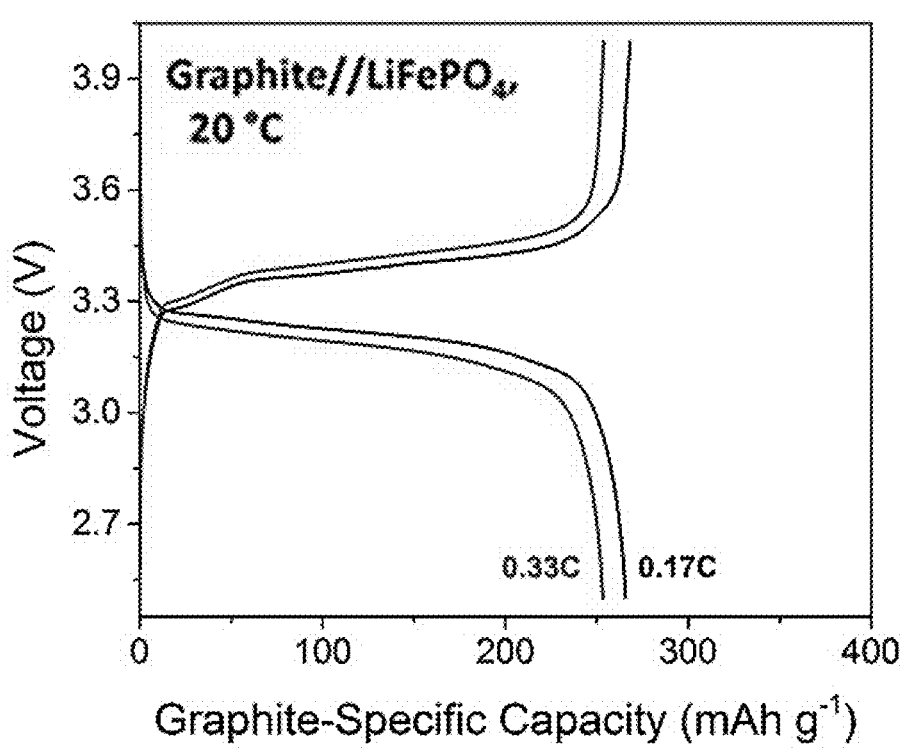

FIGS. 91A-91C show graphite//LiFePO$_4$ full-cells prepared using 1 M LiBOB in 1/1 PC/EC and 5% VC electrolyte and cycled at room temperature and 120° C. These cells were able to achieve commercially-viable, areal capacities ranging from 1.5 mAh/cm$^2$ to 2 mAh/cm$^2$. At room temperature, excellent cyclability and voltage profiles were observed 99.8% coulombic efficiency and little-to-no capacity fade at 0.33C (FIGS. 91A and 91B). At 120° C., the cells displayed stable and flat voltage profiles at 0.17C and 0.33C with a 98% coulombic efficiency. Yet, while cycling at 120° C., capacity faded linearly over time, which limited long term cyclability of the full-cells. From the evolution of the voltage profiles, there appears to be a loss of available Li$^+$, which decreases the cell capacity without affecting the overall properties of charge/discharge curves.

Figure 92A:
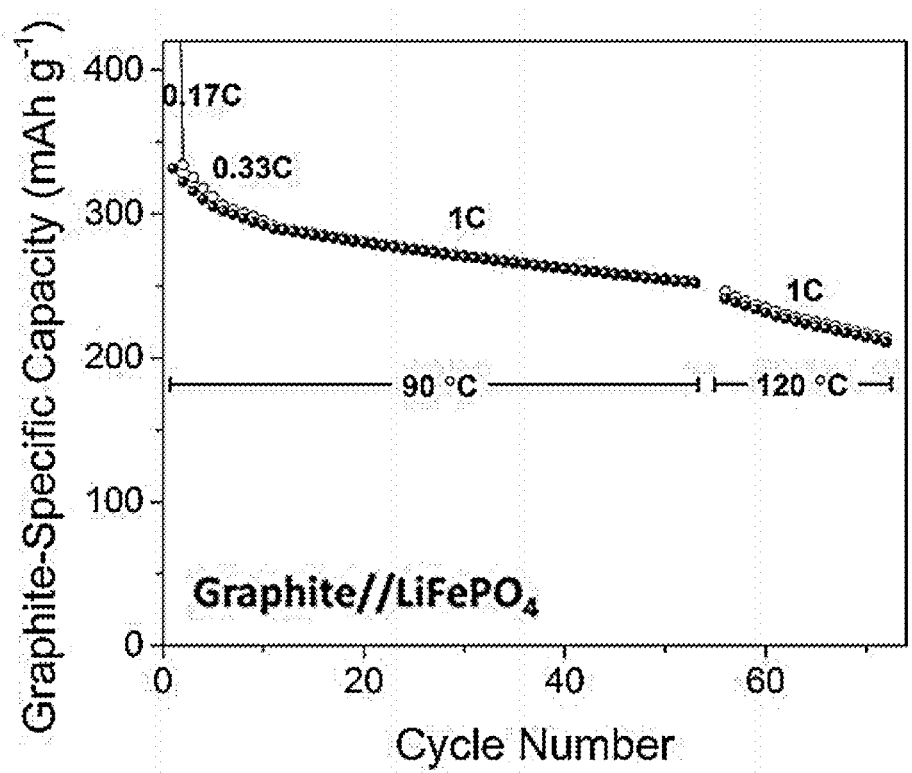
FIGS. 92A and 92B are graphical representations of electrochemical performance of a graphite//$LiFePO_4$ cell with 1 M LiBOB in 1/1 EC/PC and 5% VC.
Figure 92B:
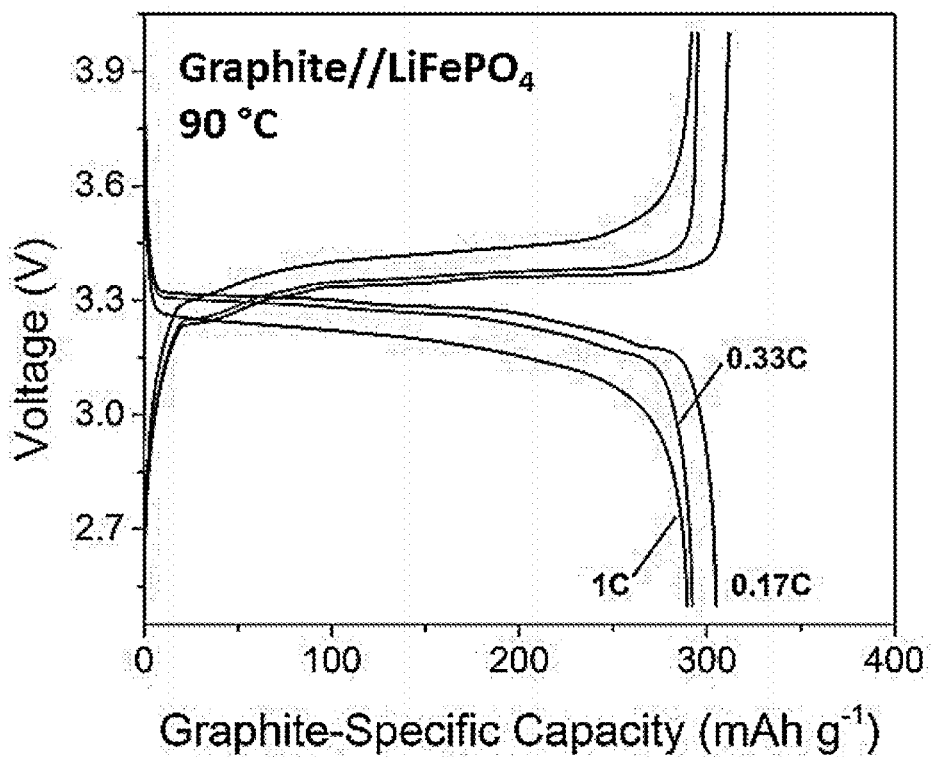

FIGS. 92A and 92B are graphical representations of electrochemical performance of a graphite//LiFePO$_4$ cell with 1 M LiBOB in 1/1 EC/PC and 5% VC at 90° C. and 120° C. showing the high rate capability (1C) of the system. As shown in FIG. 92B, at 90° C., the full-cell displayed stable and flat voltage profiles at rates ranging from 0.17C to 1C.

Figure 93A:
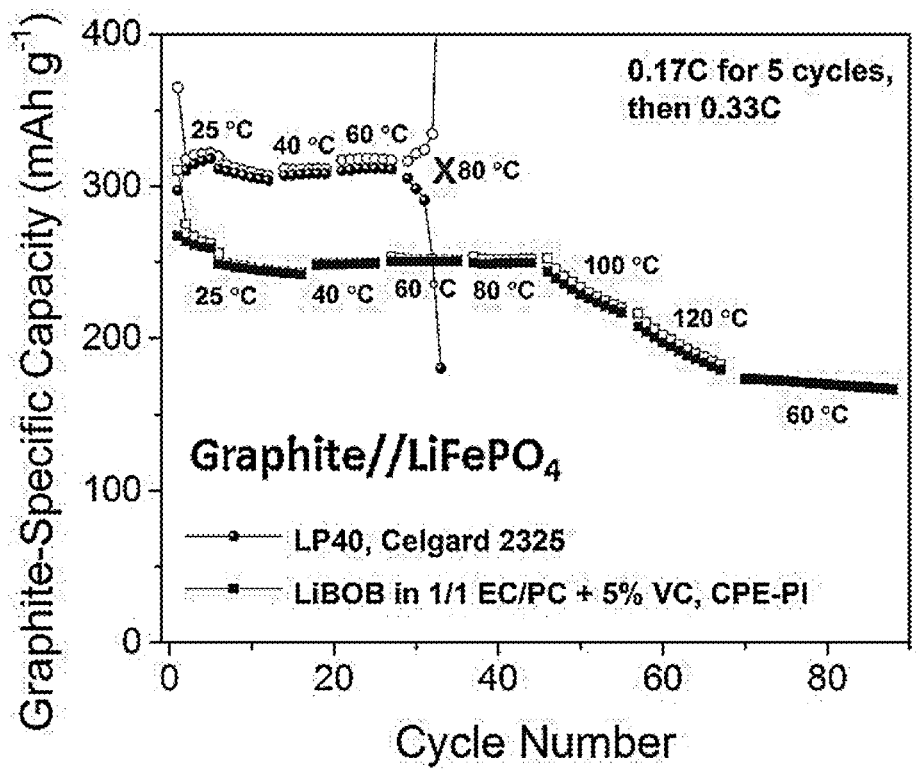
FIGS. 93A-93D are graphical representations of variable temperature electrochemical performance of a graphite//$LiFePO_4$ full-cell with the LiBOB-based electrolyte according to embodiments of the present invention, compared to a graphite//$LiFePO_4$ full-cell with a commercially-available LP40 (1 M $LiPF_6$ in 1/1 EC/DEC by wt.) and CELGARD 2325.
Figure 93B:
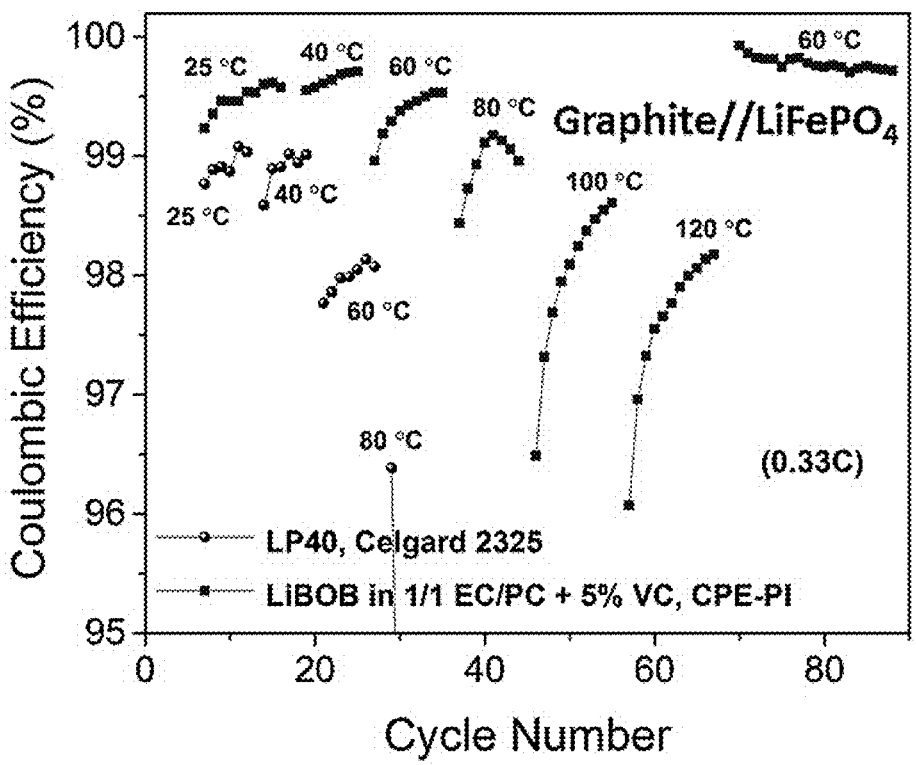
Figure 93C:
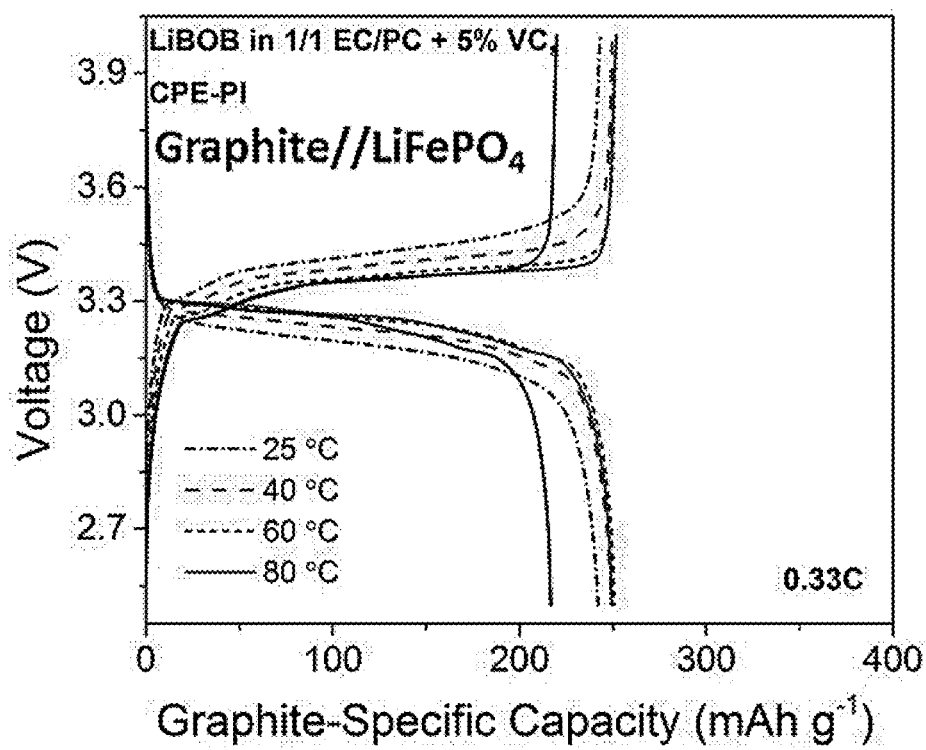
Figure 93D:
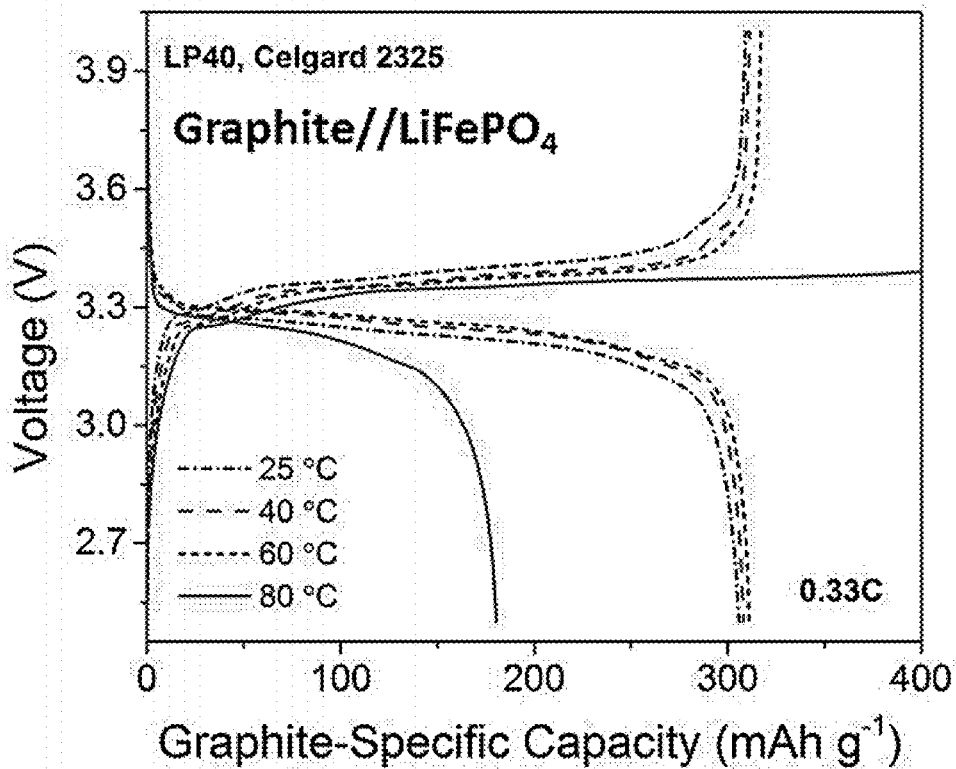

FIGS. 93A-93D are graphical representations of variable temperature cycling of graphite//LiFePO$_4$ cells with CPE-PI containing 1 M LiBOB in 1/1 EC/PC and 5% VC and CELGARD 2325 containing LP40 (1 M LiPF$_6$ in 1/1 EC/DEC by wt.). Both systems show demonstrated stable performance from room temperature up to 60° C., although the full-cell with LP40-based electrolyte begins to show signs of overcharge and low coulombic efficiency at 60° C. (FIG. 93A). Further increasing the temperature to 80° C. lead to failure in the LP40-based electrolyte cell after only four cycles. The LiBOB-based cell, on the other hand, maintained performance at 80° C. and began to show signs of fading only when the temperature was increased to 100° C. and 120° C. When the LiBOB-based cell was cooled to 60° C., a stable capacity with minimal fade was achieved with excellent coulombic efficiency (greater than 99.7%). The coulombic efficiency (FIG. 93B) of the LiBOB-based cell was better than the LP40-based cell at all comparable temperatures, which may indicate better cell performance and better long-term cyclability of the LiBOB-based cell. The voltage profiles of both cells are displayed in FIGS. 93C and 93D. The LiBOB-based cell (FIG. 93C) shows similar charge-discharge behavior (shape, hysteresis, and so forth) compared to the cell prepared with commercially-available components (FIG. 93D) at all temperatures studied. This suggests that the liquid electrolyte of the present embodiment may be a suitable replacement for electrolytes used in commercial full-cells.

EXAMPLE 24

Figure 94A:
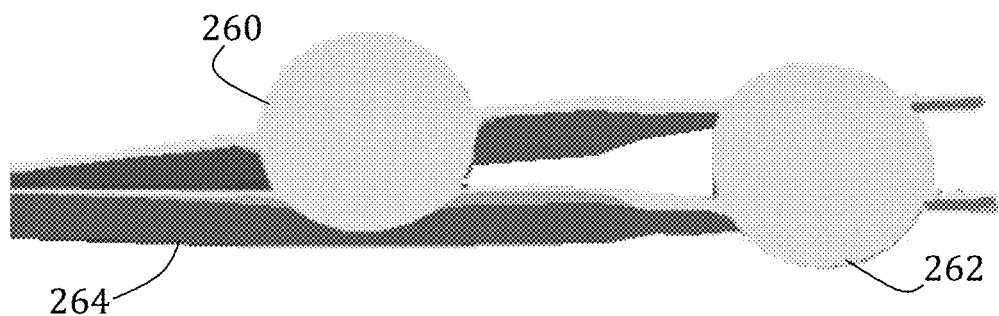
FIGS. 94A and 94B illustrate a conventional CELGARD 2325 separator with 1 M $LiPF_6$ in 1/1 EC/DEC and a CPE-PI separator with 1 M LiBOB in 1/1 PC/EC and 5% VC, according to embodiments of the present invention, before and after exposing each separator to a flame.
Figure 94B:
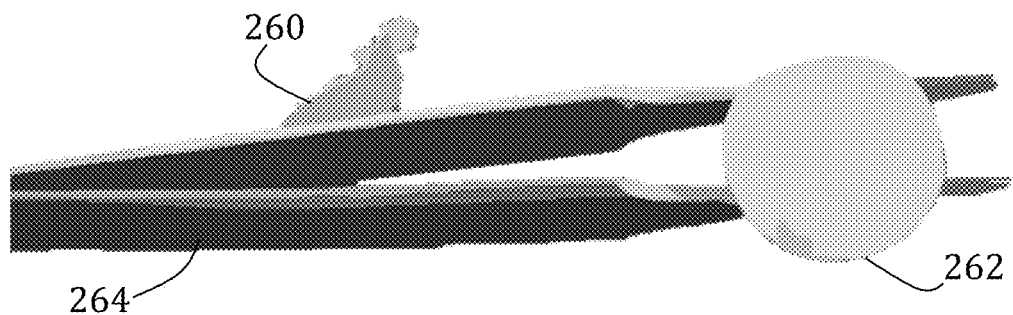

Flammability of conventional separators (such as CELGARD 2325) and separators prepared in accordance with embodiments of the present invention was evaluated. In FIG. 94A, a conventional separator 260 with 1 M LiPF$_6$ in 1/1 EC/DEC and a separator 262 comprising CPE-PI, prepared according to an embodiment of the present invention, with 1 M LiBOB in 1/1 PC/EC and 5% VC are supported on a conventional set of tweezers 264. Each separator 260, 262 was lightly touched with a flame (not shown) from a commercially-available, handheld lighter (not shown) for less than 1 sec. As shown in FIG. 94B, after flame exposure, the conventional separator 260 ignited and shrank behind the tweezers 264. The CPE-PI separator 262 did not ignite nor shrink, but did warp slightly.

Figure 95A:
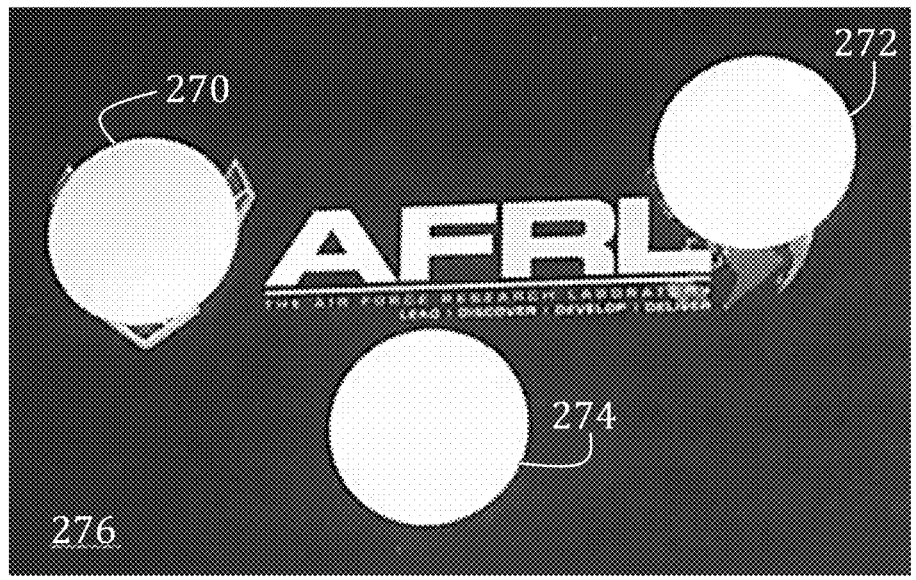
Figure 95B:
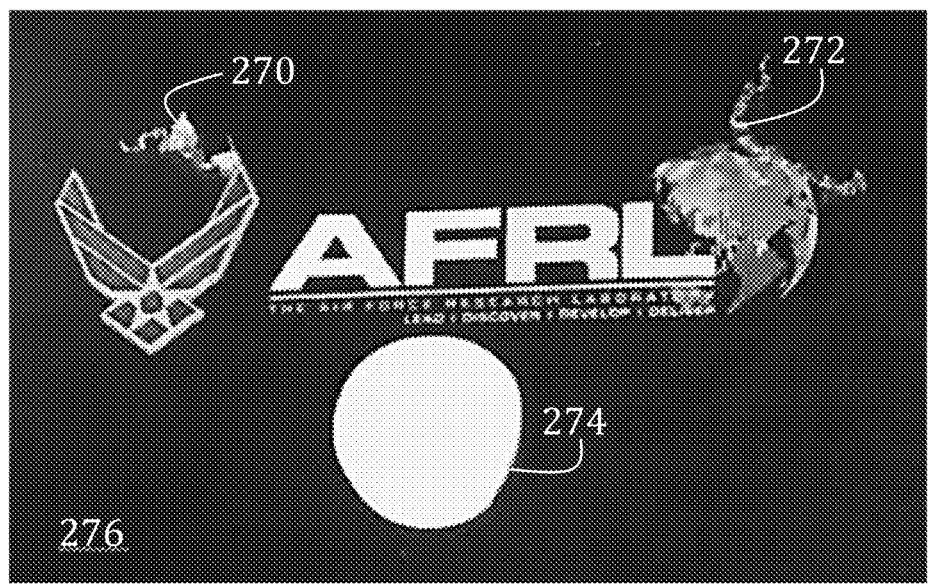

In FIG. 95A, two dry CELGARD 2325 separators 270, 272 and a dry CPE-PI separator 274 (according to an embodiment of the present invention) are arranged on a surface 276. Again, each separator 270, 272, 274 was lightly touched with the flame (not shown) from the commercially-available, handheld lighter (not shown) for less than 1 sec. Both CELGARD 2325 separators 270, 272 shrivel and shrink; the CPE-PI separator 274 warps slightly but remains intact.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A composite electrolyte comprising:
   a binder comprising 20 wt % to 50 wt % of a total weight of the composite electrolyte, the binder being selected from the group consisting of PVDF, PVDF-HFP, PTFE, PEO, PMMA, PAN, CNC, SBR, and combinations thereof; and
   a ceramic filler comprising 50 wt % to 80 wt % of the total weight of the composite electrolyte, the ceramic filler having a cross-sectional diameter ranging from 50 nm to 150 nm and being selected from the group consisting of Al$_2$O$_3$, SiO$_2$, TiO$_2$, MgO, Li$_2$O, LiAlO$_2$, BaTiO$_3$, LAGP, LATP, LLTO, and combinations thereof,
   wherein the composite electrolyte has a porosity greater than 50% comprising a plurality of submicron pores.

2. The composite electrolyte of claim 1, wherein the ceramic filler comprises particles having a maximum dimension that ranges from 10 nm to 100 μm.

3. The composite electrolyte of claim 1, wherein a thickness of the composite electrolyte ranges from about 50 μm to about 60 μm.

4. A battery comprising:
a cathode;
an anode;
a separator comprising the composite electrolyte of claim 1; and
an electrolyte.

5. The battery of claim 4, wherein the electrolyte is $LiPF_6$ in a carbonate.

6. The battery of claim 4, wherein the carbonate is selected from the group consisting of EC, DEC, DMC, EMC, PC, and combinations thereof.

7. The battery of claim 4, wherein the cathode, the anode, or both comprise a composite electrode, the composite electrode comprising:
an active material;
a conductive additive;
an electrode binder; and
an electrode solvent.

* * * * *